United States Patent [19]

Aoyama

[11] Patent Number: 5,454,072
[45] Date of Patent: Sep. 26, 1995

[54] IMAGE PROCESSING SYSTEM WITH EDITING AREA CORRECTING FUNCTION

[75] Inventor: Teruyuki Aoyama, Ebina, Japan

[73] Assignee: Fuji Xerox Co., Ltd., Tokyo, Japan

[21] Appl. No.: 96,979

[22] Filed: Jul. 27, 1993

Related U.S. Application Data

[63] Continuation-in-part of Ser. No. 858,418, Mar. 27, 1992, Pat. No. 5,388,195.

[30] Foreign Application Priority Data

Mar. 28, 1991 [JP] Japan ................................. 3-64441

[51] Int. Cl.$^6$ .................................................. G06F 15/00
[52] U.S. Cl. .............................................................. 395/146
[58] Field of Search ........................ 395/146, 145, 395/155, 161; 345/115, 116, 144; 364/419.19, 419.2

[56] References Cited

U.S. PATENT DOCUMENTS 5,113,251   5/1992   Ichiyanagi et al. .................. 358/75

*Primary Examiner*—Phu K. Nguyen
*Attorney, Agent, or Firm*—Finnegan, Henderson, Farabow, Garrett & Dunner

[57] ABSTRACT

An image processing system for editing and outputting image information obtained by reading a manuscript. An input unit inputs editing instructions including editing area and editing content. A display unit displays an area for editing instruction, and an edit processing unit processes the inputted editing instructions and sends editing instructions to an image processing unit, whereby editing content of said area is displayed on the display unit as the editing instruction, and the editing area is changed according to inputted correction of the editing area. Editing content of the editing area and the correction of the editing instruction can be confirmed on a display screen. The correction amount is displayed in numerical values by a bit map display overlapping and displaying the manuscript image information on the display unit or overlapping and displaying the manuscript image information on the editing area. A character display displays numerical values and characters. As the result, the correction amount can be quantitatively confirmed, and the position on the manuscript can be confirmed.

8 Claims, 48 Drawing Sheets

Area correction

A — Area correction No. inputted. What is the inputting order of the area?

| 1 | 2 | 3 | 4 | 5 |
| 6 | 7 | 8 | 9 | C |

Dimension correction

B —

Corrected by about 1mm when pressed once.

```
┌─────────────────────────────────────┐
│ ┌────────────┐┌────────────┐        │
│ │Copying mode││Editing mode│        │
│ └────────────┘└────────────┘────────│
│  Set number of copies.              │
│                                     │
│  ☐ Number of copies  1              │
│  ☐ Paper size      A4  A3  B5  B4   │
│  ☐ Magnifying factor(%) 71 83 100 115 141 │
│  ☐ Application   Sorting, autmatic  │
│    function      manuscript feed    │
└─────────────────────────────────────┘
```

FIG. 10(a)

```
┌─────────────────────────────────────┐
│ ┌────────────┐┌────────────┐        │
│ │Copying mode││Editing mode│        │
│ └────────────┘└────────────┘────────│
│  Select the item.                   │
│                                     │
│  [1] Call (To call registration mode)│
│  [2] Correction (To correct registration mode)│
│  [3] New  (To register a new mode)  │
│                                     │
│  [↑] Return to the preceding step.  │
└─────────────────────────────────────┘
```

FIG. 10(b)

```
┌─────────────────────────────────────┐
│ ┌────────────┐┌────────────┐        │
│ │Copying mode││Editing mode│        │
│ └────────────┘└────────────┘────────│
│              New registration       │
│  ┌────────┐  Select manuscript size │
│  │        │                         │
│  │        │  [1] A4 ▯  [10] Other   │
│  │        │  [2] A4 ▭  [11] Auto    │
│  │        │  [3] A3 ▯  [12] Manuscript│
│  │        │  [4] A3 ▭       reading │
│  │        │  ....                   │
│  └────────┘  [✎] Setting            │
│              [↑] Return to the preceding│
│                  step.              │
└─────────────────────────────────────┘
```

FIG. 10(c)

IMAGE PROCESSING SYSTEM WITH EDITING AREA CORRECTING FUNCTION

The present application is continuation-in-part of U.S. patent application Ser. No. 07/858,418 filed Mar. 27, 1992 in the name of Teruyuki AOYAMA now U.S. Pat. No. 5,388,195 issued Feb. 7, 1995.

BACKGROUND OF THE INVENTION

The present invention relates to an image processing system, which is provided with editing functions and edits and outputs image information obtained by reading a manuscript.

A digital copying machine comprises an image input terminal (IIT) for reading a manuscript, an image processing system (IPS) for processing the image data thus read, and an image output terminal (IOT) for driving, for example, a laser printer by the image data and outputs a copy. In the image input terminal, image information of the manuscript is picked up as analog electric signal corresponding to reflectivity of light using a CCD sensor and converts this to multi-gradation digital image data. In the image processing system, the image data obtained at the image input terminal are processed, thus carrying out various processings such as amending, conversion, editing, etc. In the image output terminal, laser of the laser printer is turned on and off by the image data processed in the image processing system, and halftone image is outputted.

In such digital copying machine, multi-gradation image data can be outputted according to the types through processings by the image processing system, e.g. a binary image such as characters can be outputted as sharp image with enhanced edge, while middle tone image such as photographs can be outputted as a smoothed image or as a color image with high reproducibility and sharp definition. Further, it is also possible to output an image, which has been processed from the manuscript by painting, color conversion, trimming, shift, synthesizing, scaling up and down and other edit processings. To this image processing system, the image input terminal outputs image data by reading the manuscript with signals through color separation into 3 primary colors of R (red), G (green) and B (blue). The image output terminal processes the image to halftone image for each toner of Y (yellow), M (magenta), C (cyan) and K (black), overlapps them and outputs. Thus, a color digital copying machine is provided.

Next, description will be given on a color digital copying machine as described above and already proposed (i.e. Japanese Laid-Open Patent Publication No. 2-223275), referring to FIG. 1.

In FIG. 1, IIT (image input terminal) 100 reads a color manuscript through color separation to 3 primary colors of B, G and R using a CCD line sensor and converts this to digital image data. IOT (image output terminal) 115 reproduces color image through exposure and development by laser beam. The components between IIT 100 and IOT 115, i.e. from END conversion circuit 101 to IOT interface 110, constitute an edit processing system of the image data (IPS: image processing system). The edit processing system converts the image data of B, G and R to toner signals of each toner of Y, M and C, and K, and the toner signal corresponding to the developed color is outputted to IOT 115 for each developing cycle.

IIT 100 reads one pixel in size of 16 dots/mm for each of B, G and R using a CCD sensor, and the data are outputted in 24 bits (3 colors×8 bits; 256 gradations). The CCD sensor is provided with filters of B, G and R on its upper surface, and it is 300 mm in length with density of 16 dots/mm. IIT 100 scans 16 lines/mm at a process speed of 190.5 mm/sec. using this CCD sensor, and reading data are outputted at a speed of approximately 15M pixels/sec. for each color. IIT converts to density information from reflectivity information through log conversion of analog data of pixels of B, G and R, and the data are further converted to digital data.

In IPS, color separation signals of B, G and R are inputted from IIT 100, and various data processings are performed in order to increase color reproducibility, gradation reproducibility and definition reproducibility. After converting to toner signals of Y, M, C, and K, toner signals of the developed process color are converted to ON/OFF signals and are outputted to IOT 115. An END (equivalent neutral density) conversion module 101 is to adjust (convert) to color signal with gray balance. A color masking module 102 converts the signals of B, G and R to signals corresponding to toner quantity of Y, M and C through matrix computation. A manuscript size detecting module 103 detects manuscript size in pre-scanning and performs erasing (frame erasing) of platen color in manuscript reading scanning. A color conversion module 104 converts colors specified in a specific area according to an area signal inputted from an area image control module. UCR (under-color removal) and black generation module 105 generates adequate quantity of black in order to prevent color turbidity, reduces quantity of Y, M and C depending on the above quantity, and gates K signal and the signals after under-color removal of Y, M and C according to each signal of mono-color mode and 4 full-color mode. A space filter 106 is a non-linear digital filter provided with blur restoring function and moiré removing function. A TRC (tone reproduction control) module 107 is to perform density adjustment, contrast adjustment, negative-positive conversion, color balance adjustment, etc. to improve reproducibility. A scaling up/down module 108 is to scale up or down in fast scanning direction. The scaling up and down in slow scanning direction is performed by adjusting scanning speed of the manuscript. A screen generator 109 converts gradation toner signal of process color to binarized toner signal of ON/OFF and outputs it. This binarized toner signal is outputted to IOT 115 through an IOT interface module 110. An area image control module 111 comprises an area generation circuit and a switch matrix. Edit control module consists of an area command memory 112, a color pallet video switch circuit 113, a font buffer 114, etc. and performs various editing controls.

The area image control module 111 comprises 7 rectangular areas, and priority can be set in an area generation circuit. Area control information is set in switch matrix corresponding to each area. As the control information, there are color conversion, color mode such as mono-color or full-color, modulation select information such as photograph, characters, etc., TRC select information, screen generator select information, etc., and these are used for control of color masking module 012, color conversion module 104, UCR module 105, space filter 106 and TRC module 107. The switch matrix can be set by software.

The edit control module reads a manuscript of circular graph and not rectangle, and performs edit processing such as painting for painting a specified area of indefinite shape with a specified color, or netting, trimming, masking, etc. For this purpose, 4-bit area command is written in 4 plane memories, and editing command for each dot of the manuscript is set up with 4 bits by 4 plane memories.

In a color digital copying machine with the above arrangement, it is often necessary to enlarge, reduce or move the editing area after editing instruction such as color conversion, netting, painting, etc. has been executed. In case the editing area is set in the editing instruction, e.g. when the manuscript is placed on a digitizer and an area is inputted and specified, its position is displayed. In case the specified editing area is to be corrected, selected screen and corrected screen are used.

To correct the editing area, a plurality of editing areas and forward/backward keys are displayed, and the selected area in the displayed screen is inverted in display. By the forward/backward keys, the selected area is moved forward or backward on the selected screen according to the order of the setting to select an area. Then, it is switched over to an amended screen, and correction keys such as arrow or triangle are displayed for rectangle and its sides (upper, lower, left and right). Each time this correction key is operated, correction processing of enlargement/reduction of 1 mm is performed in the direction of the arrow or the triangle.

In the example shown in FIG. 2, a selection sheet where the numbers of correction areas shown in A are given as selection keys, and a dimension correction sheet where scaling up/down designation keys are given on a rectangle and its upper, lower, left and right sides shown in B are attached on an edit pad, and edit instructions and subsequent area correction are carried out on the edit pad. In this case, the copy is placed on the edit pad to set an area in the setting mode. In correction mode, it is selected to which area it has been inputted by the number of the selection key on the selection sheet of the area, and the area is corrected by the scaling up/down instruction keys on the dimension correction sheet. To correct the area in this case, correction of 1 mm can be performed by a single operation.

However, in the conventional area correction system as described above where there are the selected screen and the corrected screen, each setting area is displayed on the selected screen, while it is impossible to match each area with the manuscript. For this reason, it is impossible to confirm accurate position on the manuscript. In the amended screen, the rectangle is displayed only to give the relationship with the correction key, and it neither changes the size nor moves in response to the set edit area and to the correction. Accordingly, even when a correction key is used, the content of the correction corresponding to it cannot be concretely confirmed.

In a system where a selection sheet as in the latter case is used, the area must be selected by the number on the selection sheet on the edit pad to correct the area. Thus, the operator must memorize the number of the selection key and contents of area and editing. This often leads to erroneous specifying due to erroneous memorizing. The area is corrected by the scaling up/down designation key on the dimension correction sheet as in the former case in the above, and the content to be corrected cannot be concretely confirmed.

SUMMARY OF THE INVENTION

It is an object of the present invention to provide a method, by which positional relationship with a manuscript can be confirmed in correcting an editing area. It is another object of the invention to provide a method, by which a content can be confirmed by correction operation.

To attain the above objects, the image processing system according to the present invention has editing functions and performs edit processing and outputs image information obtained by reading a manuscript, and it is characterized in that there are provided image processing means for performing said edit processing and for outputting said image information based on editing instruction as said editing instructions for areas and contents for performing said edit processing are set, input means for inputting the setting of said editing instruction and correction information, display means for displaying said areas and contents of said editing instruction on said image information as well as setting and correction screens, and edit processing means for setting said editing instructions to said image processing means by processing the setting of said editing instructions and correction information inputted from said input means and by controlling a display screen of said display means.

Also, the image processing system of the present invention is characterized in that there are provided image input means for picking up image information by reading said manuscript, image processing means for performing said edit processing by inputting said image information from said image input means, image output means for outputting image information processed by said edit processing by inputting it from said image processing means, editing content input means for inputting contents and correction of said edit processing, editing area input means for inputting areas of said edit processing, edit memorizing means for memorizing editing information including said contents and said areas of said edit processing, display memorizing means for memorizing by developing said editing information in said image information on a bit map, display means for displaying said bit map of said display memorizing means, and edit processing means for newly setting said contents and said areas of said edit processing based on the input of each of said input means, for performing correction processing of editing information read from said edit memorizing means, for memorizing said editing information in said edit memorizing means, for memorizing by developing said bit map in said display memorizing means, and for setting said editing information memorized in said edit memorizing means to said image processing means.

According to the above arrangement, when editing instruction is inputted from the input means, containing editing areas and editing contents, the editing contents of said area is displayed by instruction of the editing area. In correcting the editing area, the editing area to be corrected is changed according to the correction, and editing instruction inputted by the edit processing means is processed and editing instruction is set to the image processing means. Thus, it is possible to confirm the editing content or the corrected content of the area on a displayed screen. Further, overlapped display of the manuscript on the display means ensures easier position confirmation on the manuscript, and the errors in specifying can be reduced. By displaying correction amount by the use of bit map display and display, by which editing area can be displayed by overlapping over the image of the manuscript, it is possible to quantitatively confirm the correction amount.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF PREFERRED EMBODIMENTS

Figure 1:
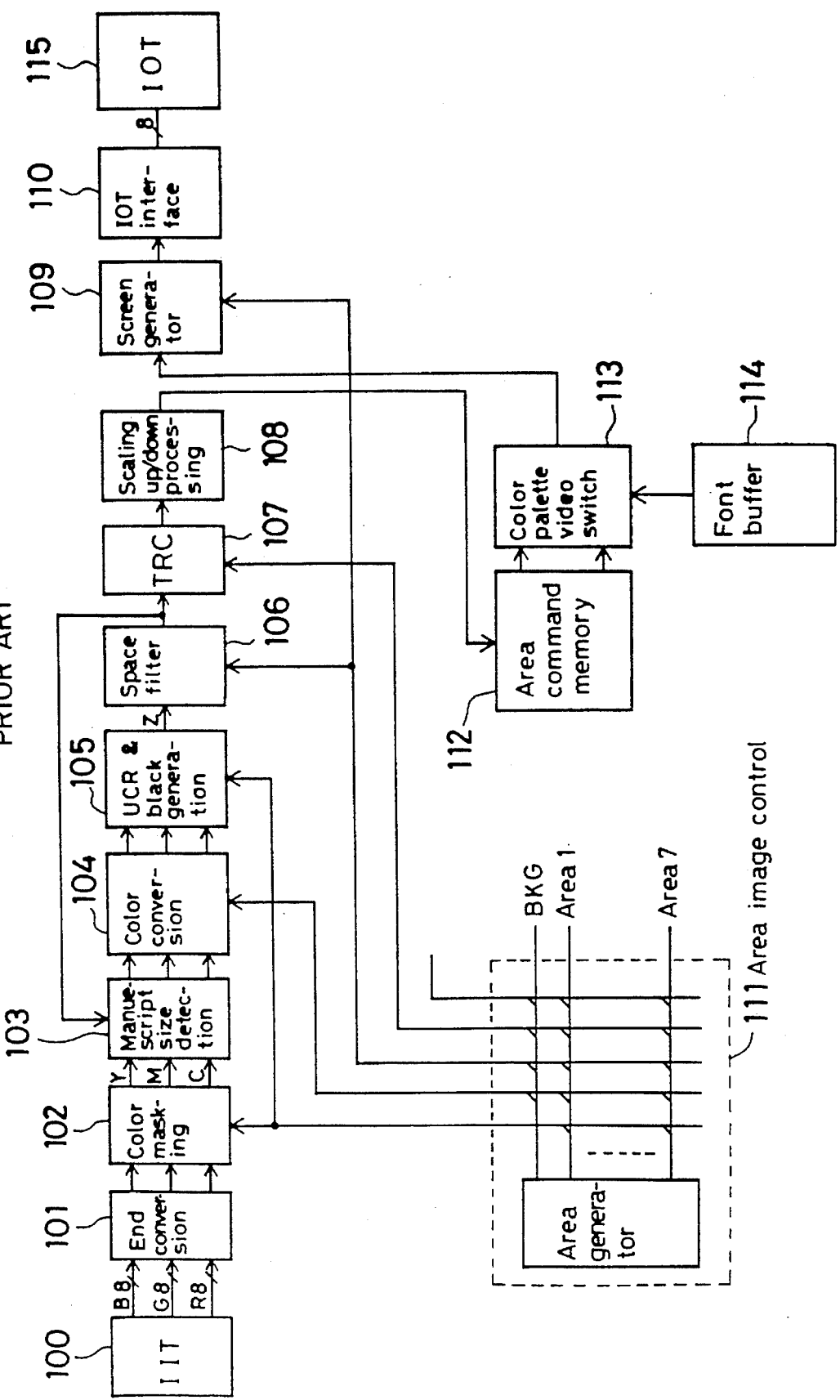
FIG. 1 is a block diagram showing an arrangement of a color digital copying machine provided with conventional editing functions.
Figure 2:
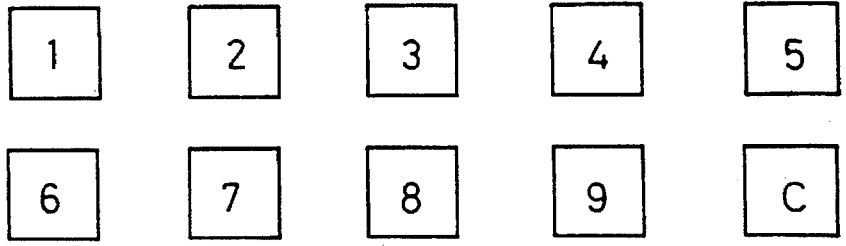
FIG. 2 is an example of another method for area correction.
Figure 2:
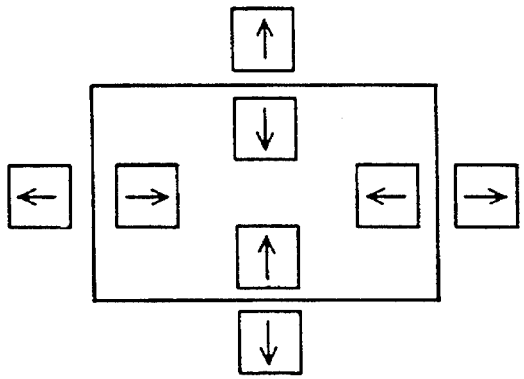
Figure 3:
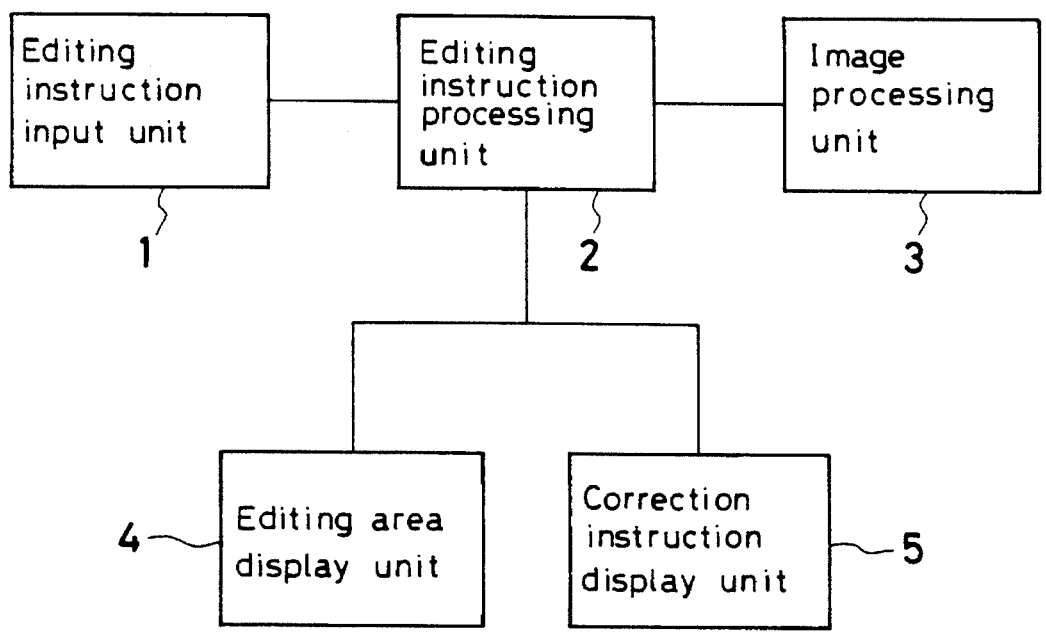
FIG. 3 is a diagram showing an embodiment of an image processing system according to the present invention.

In FIG. 3, an editing instruction input unit 1 selects and specifies editing functions such as painting, color conversion, trimming, rotation, etc. using an edit pad, a console panel, a keyboard, and a touch panel attached to display, and it instructs the content and corrects the editing area. An editing area display unit 4 displays the editing area specified and inputted from the editing instruction input unit 1 on a manuscript image, and a correction instruction display unit 5 displays information relating to correction when the editing area is corrected, and further displays the editing content. An editing instruction processing unit 2 picks up image data of the manuscript from an image processing unit 3 and displays on the editing area display unit 4, and displays the editing instruction and correction content inputted from the editing instruction input unit 1 on the editing area display unit 4 and the correction instruction display unit 4. It also sets the editing content to the image processing unit 3. The image processing unit 3 is, for example, a digital copying machine, which consists of an image processing system provided with various editing functions and is connected to an image input terminal (IIT) and an image output terminal (IOT). Further, an example of hardware arrangement of the entire image processing system is given in FIG. 4.

Figure 4:
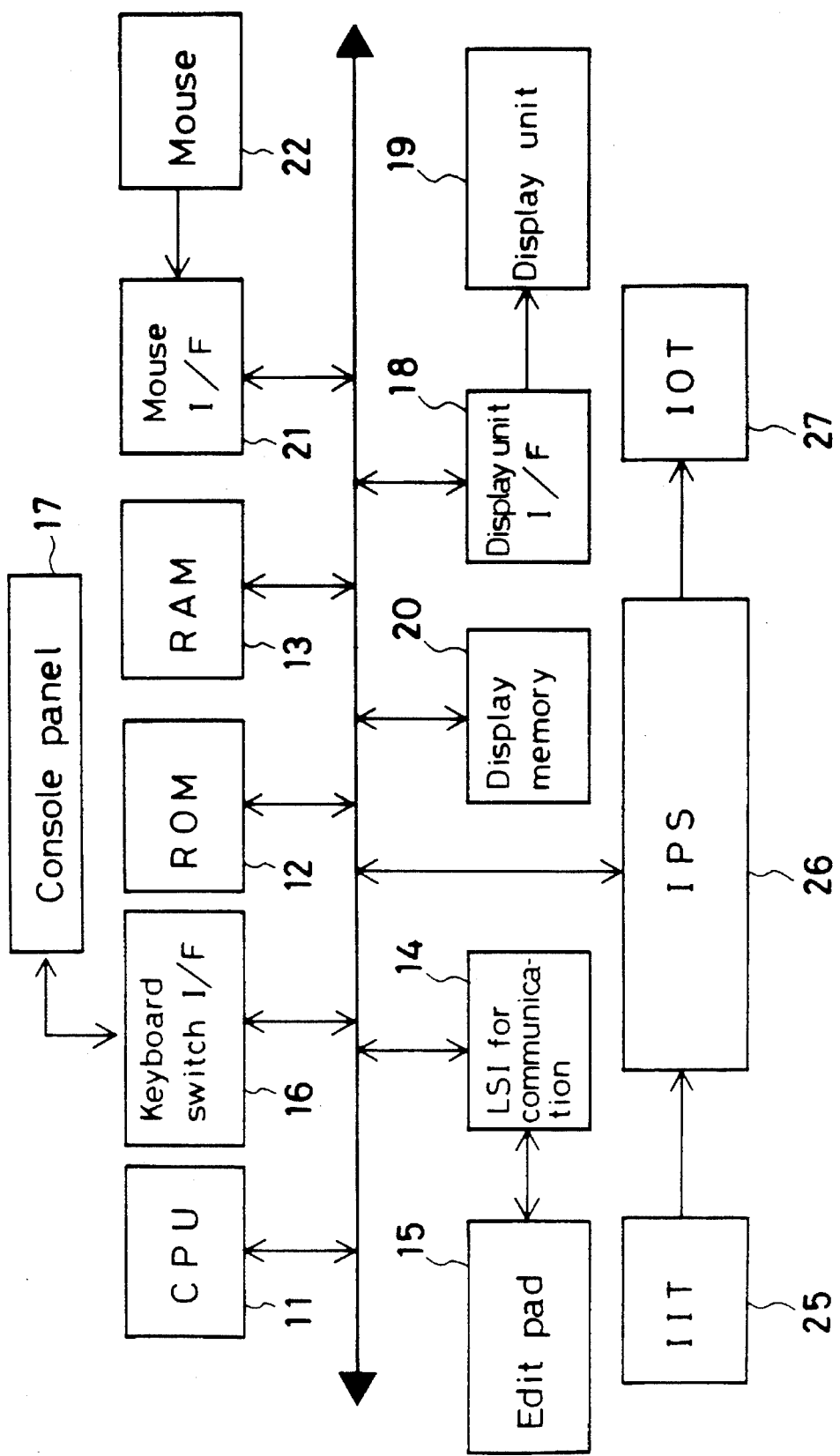
FIG. 4 is a system block diagram of an entire image processing system.

In FIG. 4, IIT 25 is an image input terminal for reading the manuscript by a CCD sensor, and IPS 26 is an image processing system for performing editing and other processings to the image data. IOT 27 is an image output terminal for outputting a copy by driving, for example, a laser printer by the image data. These components make up a conventional type digital copying machine as already described.

An edit pad 15 is to specify an input editing area when various editing functions (contents) are used. A console panel 17 performs key input such as function selection and confirmation in case various editing functions are used, and confirms and displays numerical values using a display (character display). A display unit 19 displays manuscript or editing area, editing content and correction content depending upon the editing area specified and inputted from the edit pad 15. For example, it is a bit map display. A display memory 20 develops and stores display data such as a manuscript or an editing area to be displayed on the display unit 19. A mouse 22 is to move a cursor on the screen of the display unit 19.

CPU 11 processes input of the console panel 17, the edit pad 15 and the mouse 22, develops the display memory 20 and processes display output of the display unit 19. It also checks the selected editing content, and sets editing instruction to IPS 22. ROM 12 stores programs and data necessary for this purpose, and RAM 13 is used as a working area for processing and executing programs and maintains the data under processings or other necessary data.

The setting of the editing instruction and area correction are carried out as follows:

The editing content is selected by key selection on the console panel 17, and the selection information is transferred from keyboard switch I/F 16 to CPU 11. When the editing content is selected, CPU 11 switches over the processing mode to input mode of the editing area and waits until the editing area is specified and inputted from the edit pad 15. The input data of the editing area are sent to LSI 14 for serial communication through a communication line from the edit pad 15. CPU 11 writes the input data to RAM 13 on CPU bus and develops display data of the area to the display memory 20. On the display memory 20, image data of the manuscript is developed by CPU 11. Therefore, the editing area is overlapped and developed on the manuscript images, and these images are displayed on the display unit 19 through a display unit I/F 18. In this case, the display unit 19 may have lower resolution because it will suffice if positional relationship between the manuscript and the editing area can be confirmed. When the editing area is confirmed by the display unit 19 and the editing instruction is confirmed by the console panel 17, CPU 11 sets editing instruction to IPS 26.

To correct the editing area already set, correction instruction is given from the console panel 17. CPU 11 displays the manuscript and each editing area to the display unit 19, and the selected area is displayed in a display mode different from that of the other areas such as flashing or inverted display. When the cursor is moved and clicked by the mouse 22 operated by the operator, display mode of the area is changed as a newly selected area, and the editing content of this area is displayed at a corner of the screen for a certain period of time. For example, the screen is divided to upper and lower sections or left and right sections. If the selected area is in upper section, the editing content is displayed in lower section, and it is erased after a certain period of time elapsed.

It will suffice that the editing content can be confirmed when the area is selected, and it is no more needed thereafter. Therefore, such information should be erased after a certain period of time from the screen of the display unit 19. By erasing useless display information, complications on screen can be avoided.

After the area is selected and the content is confirmed, area correction is performed by operation of the mouse 22 by the operator. In this correction, CPU 11 selects the content according to the position and the mode of clicking of the cursor. In case clicking position of the cursor is at the center of a side of the selected area, the side is moved outwardly or inwardly. In case it is at a corner, the corner, i.e. two sides are moved. In case it is at the center, the entire area is moved to correct the content. After this selection, the display area is moved by moving the cursor, and the area is corrected. At the same time, correction amount of the area is displayed in numerical value on the display (character display) on the console panel 17. Accordingly, the operator can confirm the area after correction by the change of the area overlapped on the manuscript and displayed on the screen of the display unit 19 and by numerical value of correction amount displayed on the display of the console panel 17.

In case the cursor is clicked twice, the area is copied at another position. In case it is clicked three times, the area may be erased. This can be used not only for the area correction but for the setting.

Next, description will be given on the operation by editing area correction function of the image processing system.

Figure 5A:
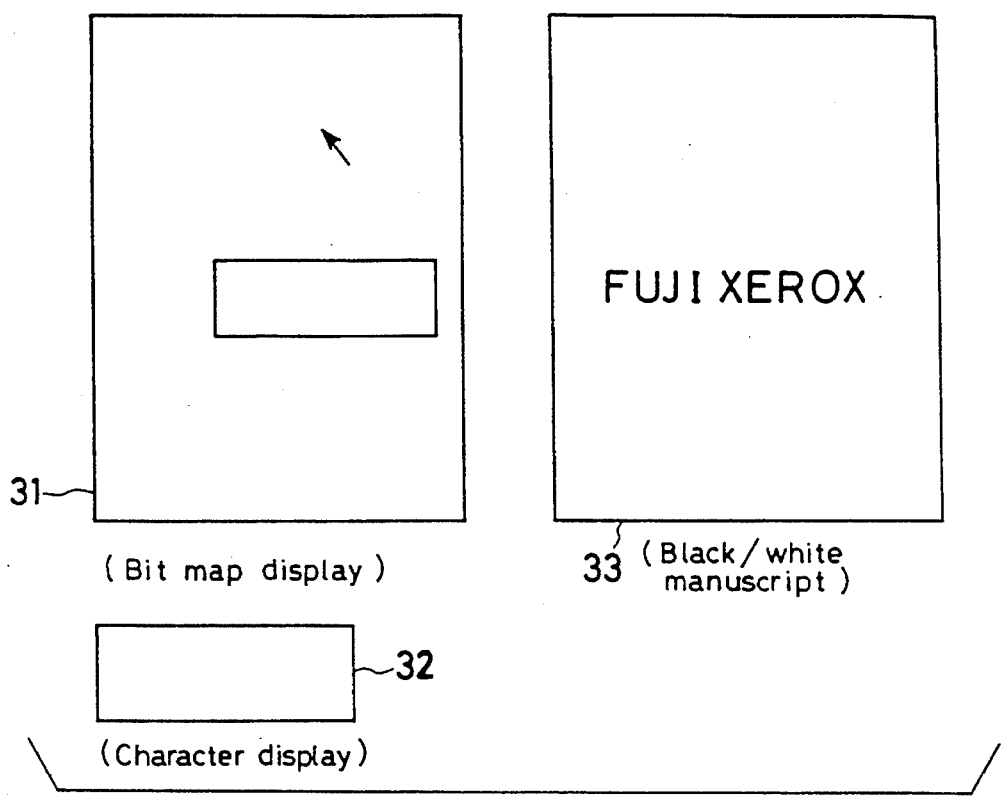
FIGS. 5(a) to 5(d) show examples of operation by the image processing system of the present invention.

First, the manuscript 33 shown in FIG. 5A is placed on the edit pad and the editing of "black→blue conversion" is performed to the letters of "XEROX". When editing instruction is given, editing position is displayed on the bit map display 31. The marking ↑ is a cursor indicating the instructed position of the mouse.

Figure 5B:
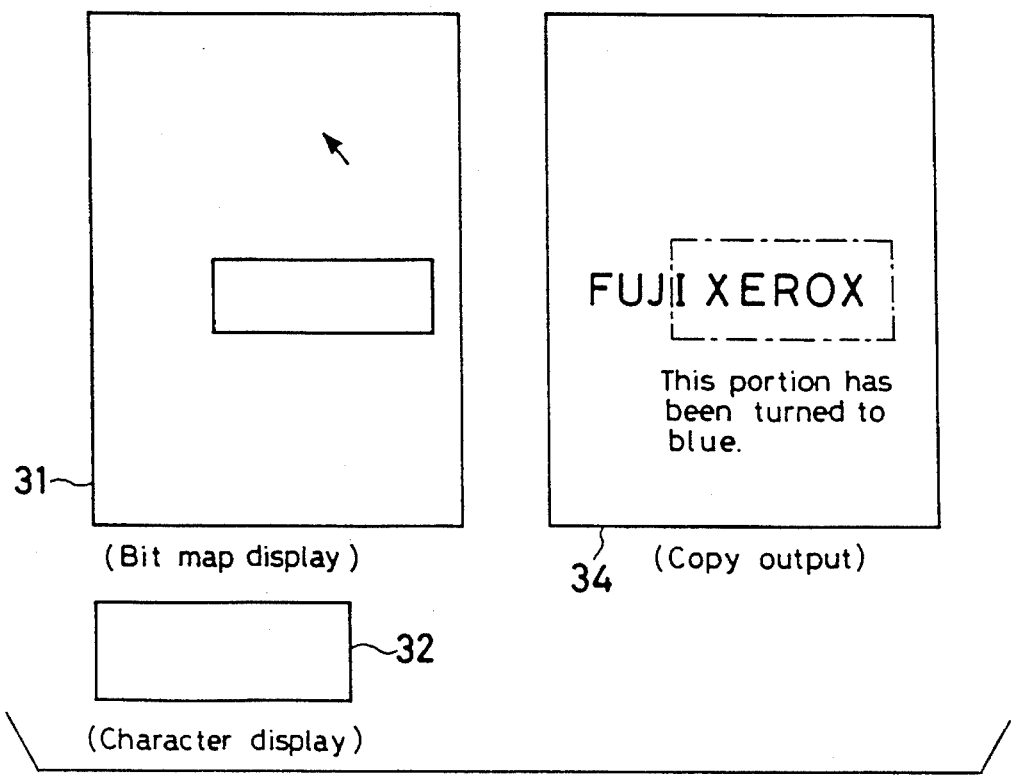

When copying is made by the above editing instruction, it is necessary to correct the editing position in case "black→blue conversion" has been performed up to a part of the letters "JI" as shown in FIG. 5B. That is, the area shown by one dot chain line of copy output 34 corresponds to a rectangular area on the bit map display 31 and shows the area of "black→blue conversion".

Figure 5C:
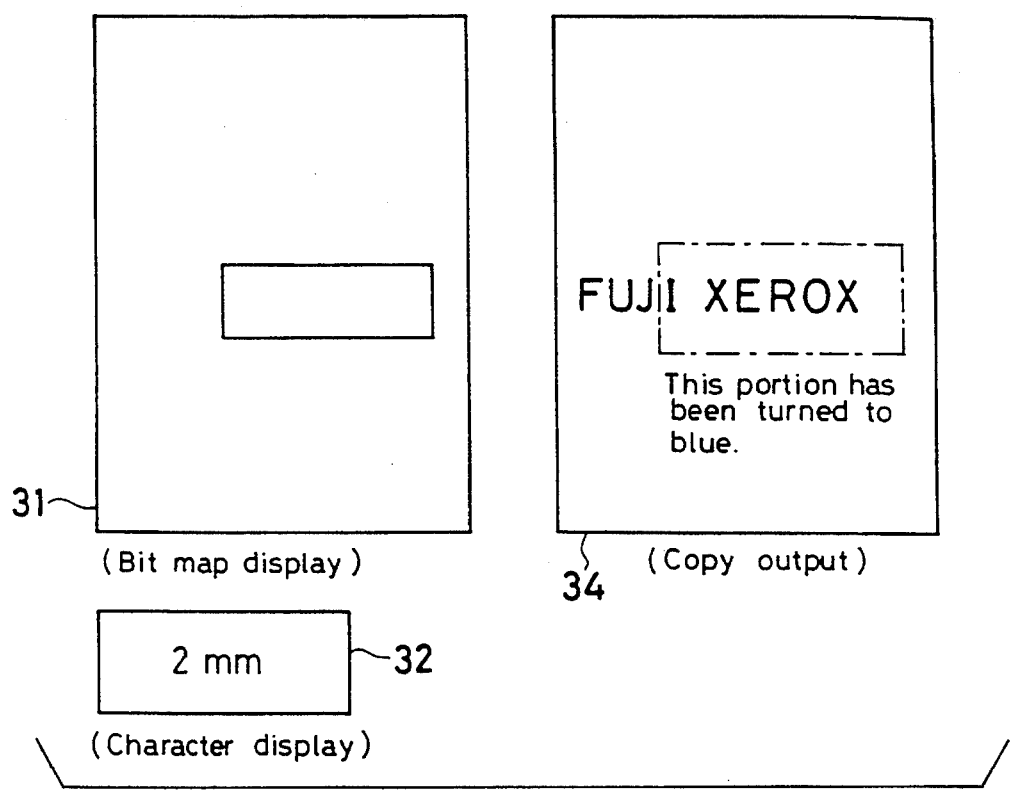
Figure 5D:
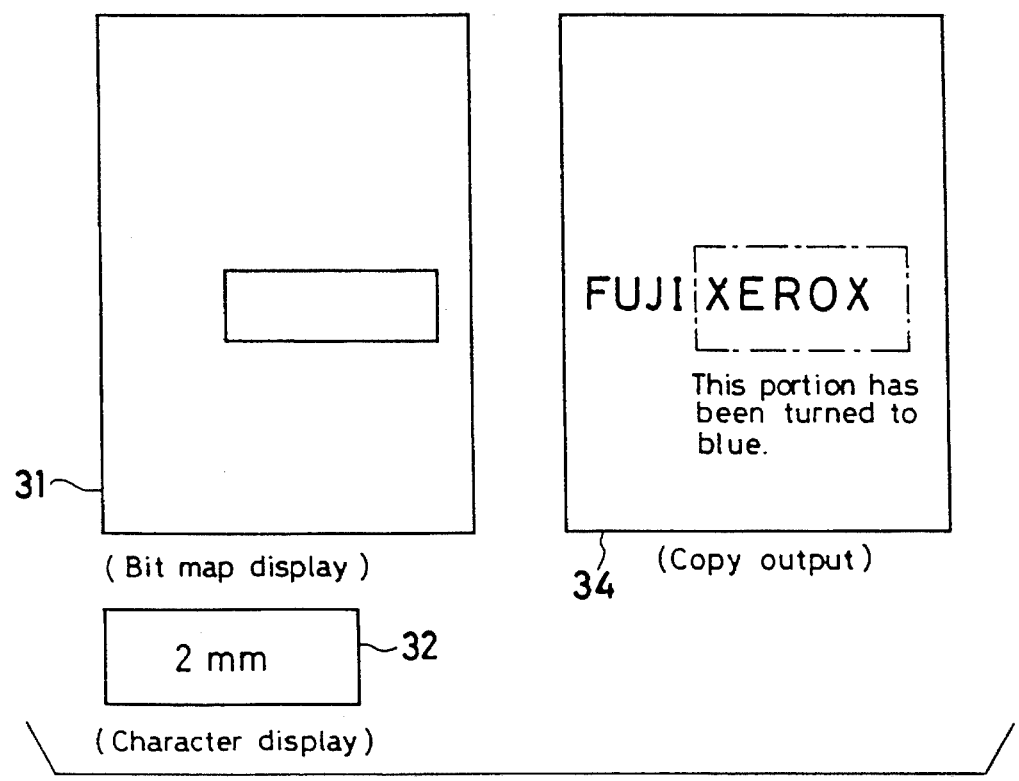

If it is supposed that an adequate position is obtained if it is moved to the right by 2 mm, the operator operates the mouse as shown in FIG. 5C, and after clicking the cursor shown by the marking ↑ at the center of the left side of the editing area on the bit map display 31, it is moved to the right. To cope with this movement, CPU moves the left side of the rectangular editing area on the bit map display 31 and displays the moving distance on the character display 32. Because the moving distance on the bit map display 31 does not correspond to the manuscript by 1:1, the content of the area correction is visually displayed on the bit map display 31. By displaying the correction amount in numerical values on the character display 32, the content of correction can be confirmed visually and in numerical values. The operator confirms the moving distance by these displays and completes the movement by clicking the button of the mouse again. As shown in FIG. 5D, a copy 34 can be outputted by editing "black→blue conversion" to the letters "XEROX".

Further, description will be given on embodiments of the image processing system of the present invention.

Figure 6:
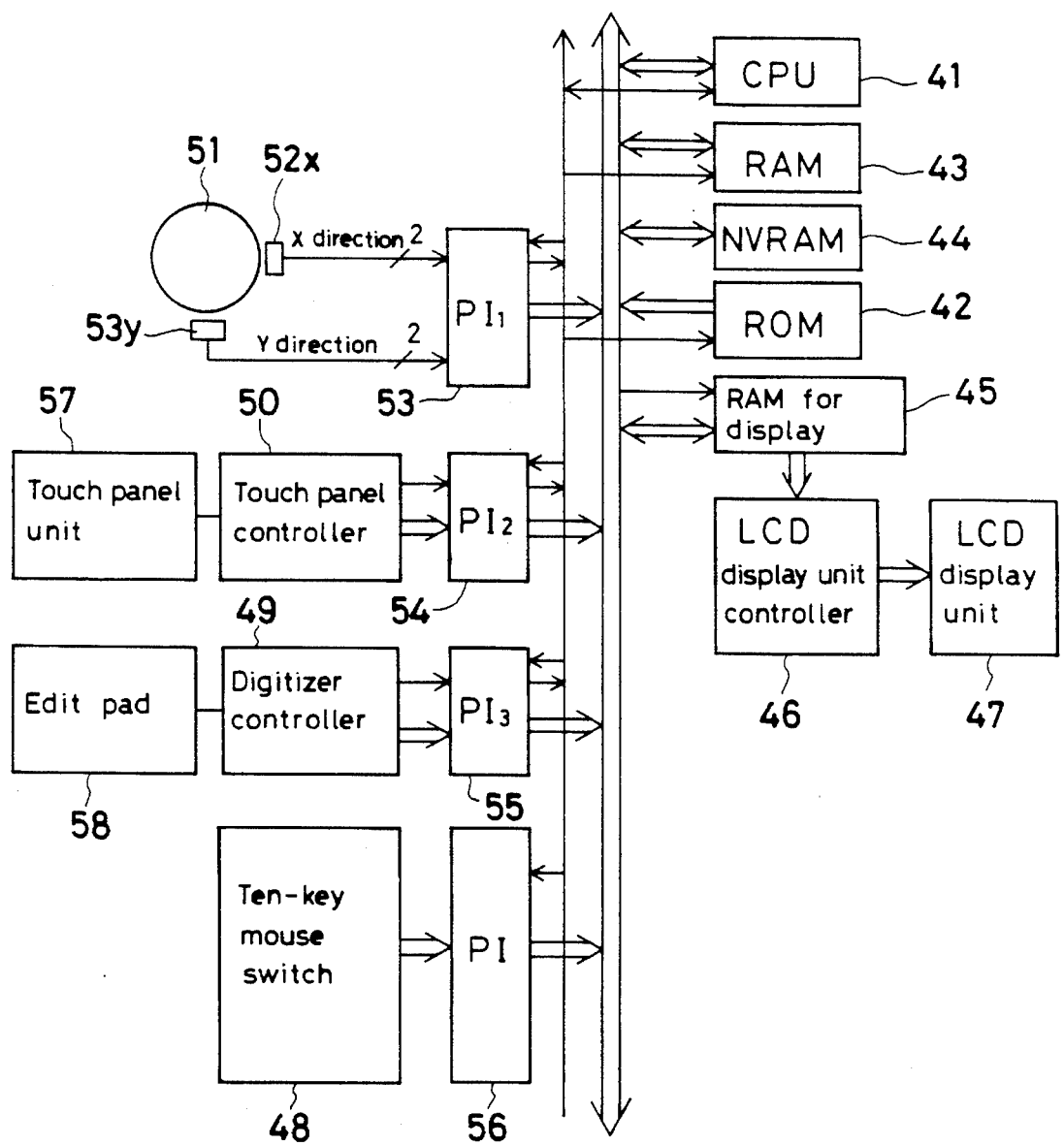
FIG. 6 is a block diagram of an editing area control unit.
Figure 8:
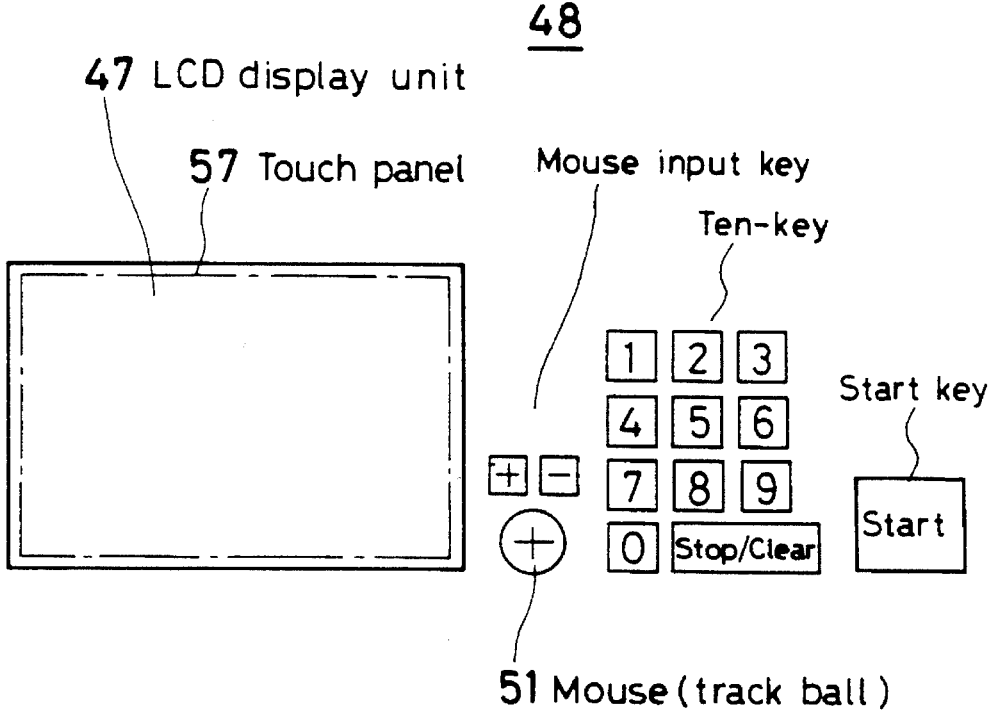
FIG. 8 shows an example of a console panel, which comprises an LCD display unit, a ten-key pad and a mouse switch.
Figure 9:
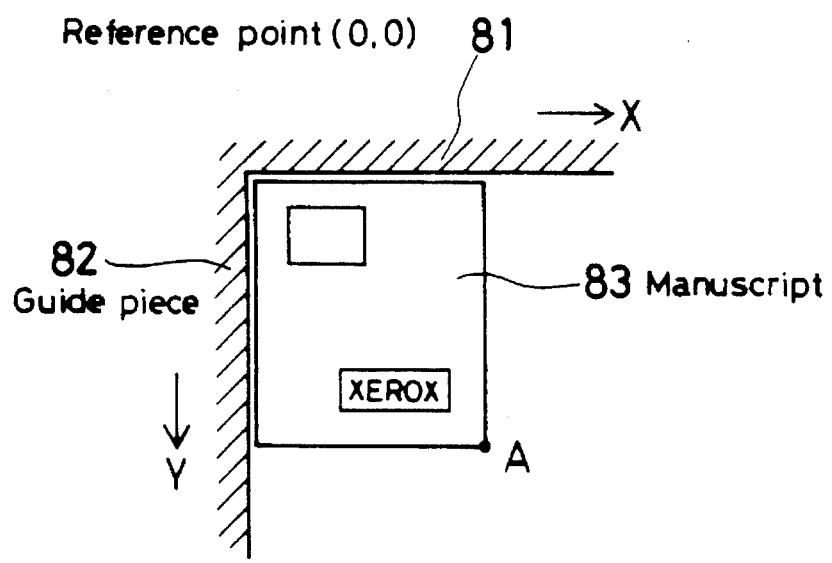
FIG. 9 shows a coordinate system on an edit pad.

In FIG. 6, ROM 42 is a memory for storing a program for control and message data for display, RAM 43 is a memory for temporary storage of data during control used as a program working area, and NVRAM 44 is a memory for storage of an editing program. CPU 41 executes the program for control stored in ROM 42 or the editing program stored in NVRAM 44 using the working area of RAM 43. RAM 45 for display is a video RAM to store bit map data. LCD display unit 47 is a liquid crystal display unit of 100×140 mm in size and 4 dots/mm in resolution. LCD display controller 46 displays the bit map data developed on RAM 45 for display on LCD display unit 47. Ten-key mouse switch 48 reads the status of numeric keys of 0 to 9, control keys for stop, clear, start, etc., and mouse switch, and returns the status signal by access from CPU 41. Mouse 51 has encoders 52x and 52y for detecting X-direction rotation amount and Y-direction rotation amount of a track ball, interrupts CPU 41 according to the rotation of the track ball, and sends pulse train of UP/DOWN. LCD display unit 47, ten-key mouse switch 48 and mouse 51 make up a console panel as shown in FIG. 8. When coordinates are inputted from the edit pad 58, a digitizer interrupts CPU 41 and controller 49 sends XY coordinate data. A touch panel controller 50 interrupts CPU 41 and sends out XY coordinate data when a touch panel unit 57 of 4 dots/mm in resolution on display surface of LCD display unit 47 is pressed. The edit pad 58 has guide pieces 81 and 82 at left and above as shown in FIG. 9 and specifies manuscript size when a manuscript 83 is placed with its surface upward and with reference point at left above and a right upper corner A of the manuscript is inputted. Parallel input ports 53 to 56 are ports for incorporating input signals of the mouse 51, the touch panel unit 57, the edit pad 58 and the ten-key mouse switch 48 into CPU bus.

Figure 7:
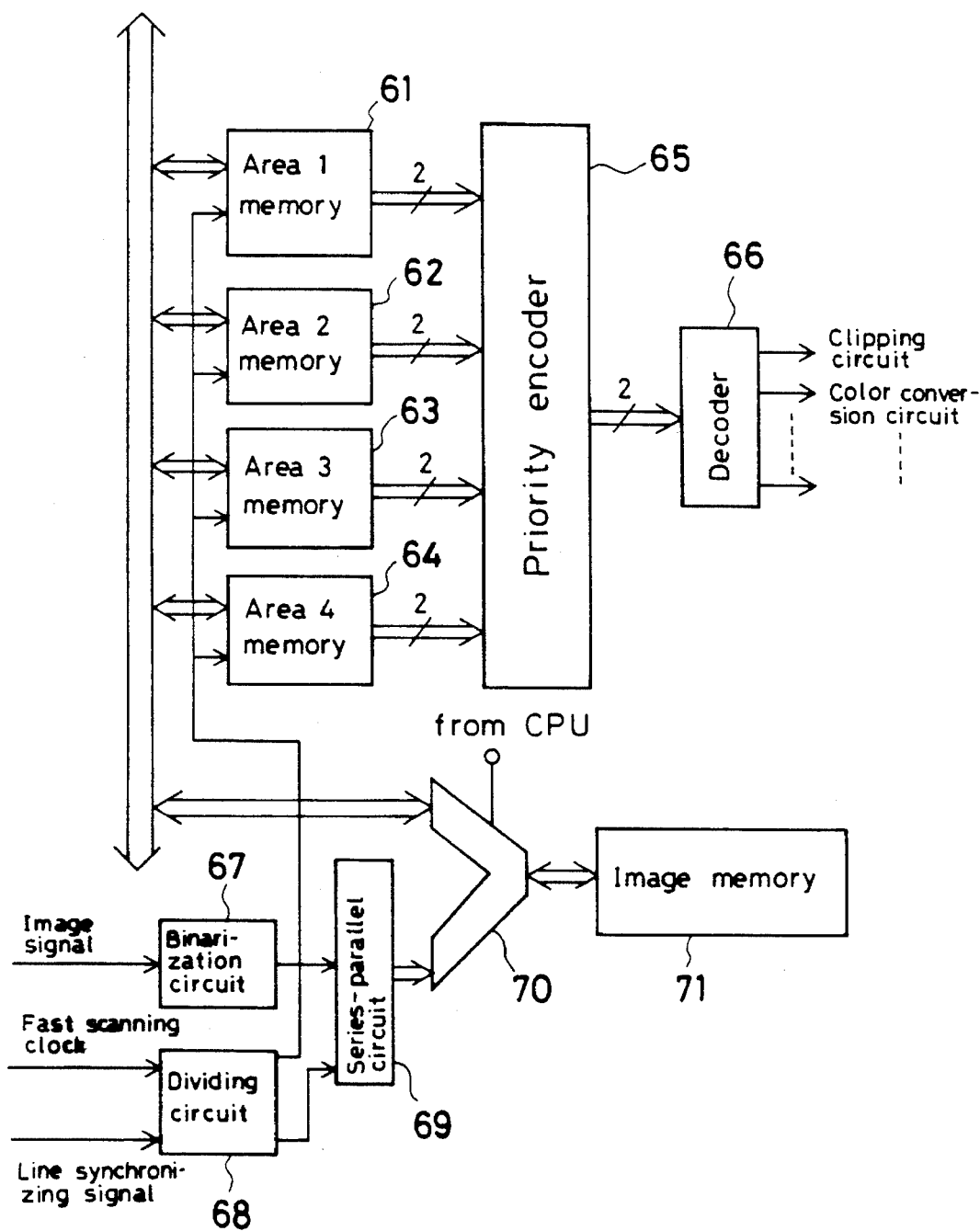
FIG. 7 is a block diagram of an image processing unit.

In FIG. 7, area memories 61–64 are dual port memories for storing each of editing areas and editing contents of areas (1)–(4) as 4-bit information with manuscript pixel of 4 dots×4 dots as one area unit. A priority encoder 65 sets priority of the areas (4), (3), (2) and (1) in this order, reads editing content for each editing area from the area memories 61–64 and outputs this to a decoder 66. For example, it is constituted by ROMs. The decoder 66 generates synchronizing control signal to a circuit, which edits image signals of a clipping circuit or a color conversion circuit based on 4-bit editing content outputted from the priority encoder 65. A binarization circuit 67 binarizes image signal of the manuscript. A dividing circuit 68 turns the image signal of the manuscript, for example, from 400 dpi to ¼ of 100 dpi in fast and slow scanning directions and generates synchronizing signal of 4 dots/mm. A series-parallel circuit 69 performs series-parallel conversion of binarized image signal of 100 dpi. Selector 70 receives control signal from CPU, stores image data of the manuscript in an image memory 71 and makes the image data readable from the image memory by CPU. The image memory 71 stores binarized image data of the manuscript with resolution of 4 dots/mm in fast and slow scanning directions.

Next, description will be given on general outline of the operation, referring a screen of LCD display unit 47.

In the present invention, input mode No. (IMD) is placed under control. When this input mode No. is rewritten according to the content of input, switching to each display screen of FIG. 10 and switching to processing mode can be carried out by this input mode No. On a screen of LCD display unit on the console panel, tags for copying mode and editing mode are displayed on upper portion of the screen as shown in FIG. 10. By touching the tags, the screen can be switched to that mode. On a screen of the editing mode, the screen is further switched over according to the content of the input. The input mode No. is set to "1" in the copy mode and to "2" in the editing mode. Further, it is set to "21", "22", "23", or "231" according to each mode branched off from the editing mode.

Figure 11:
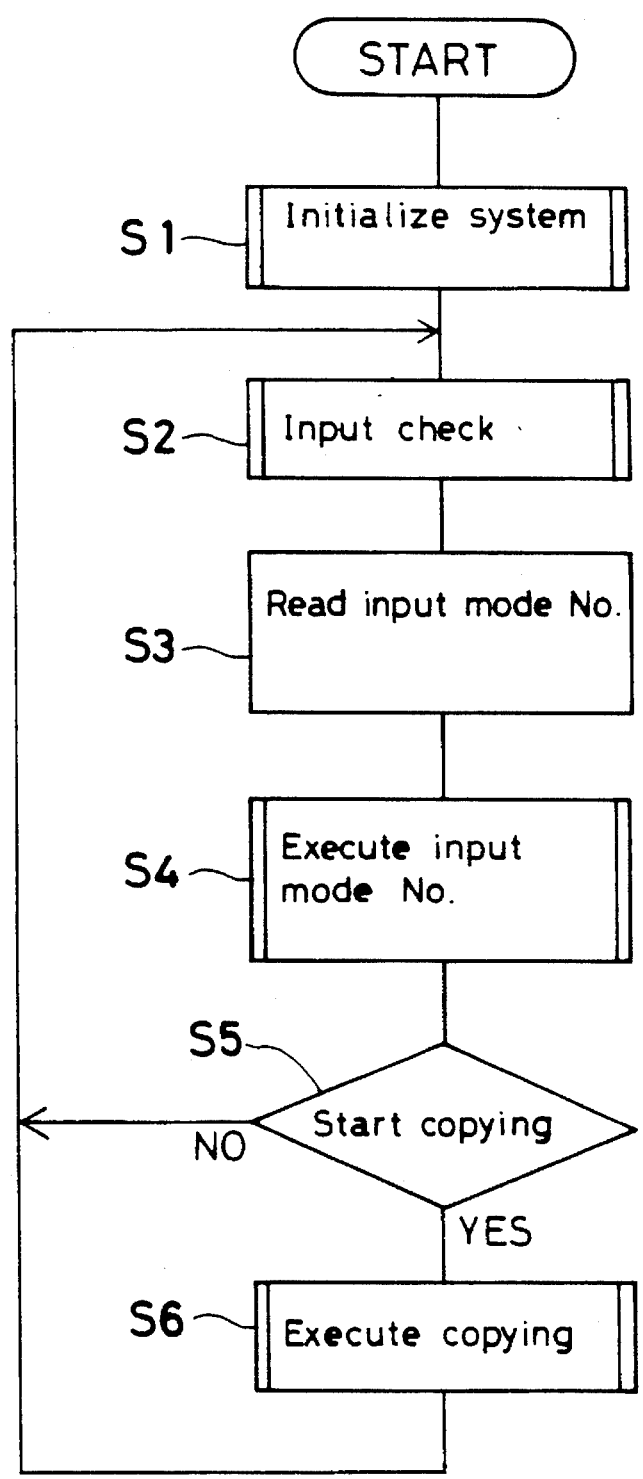
FIG. 11 is a chart for a main routine program.
Figure 12:
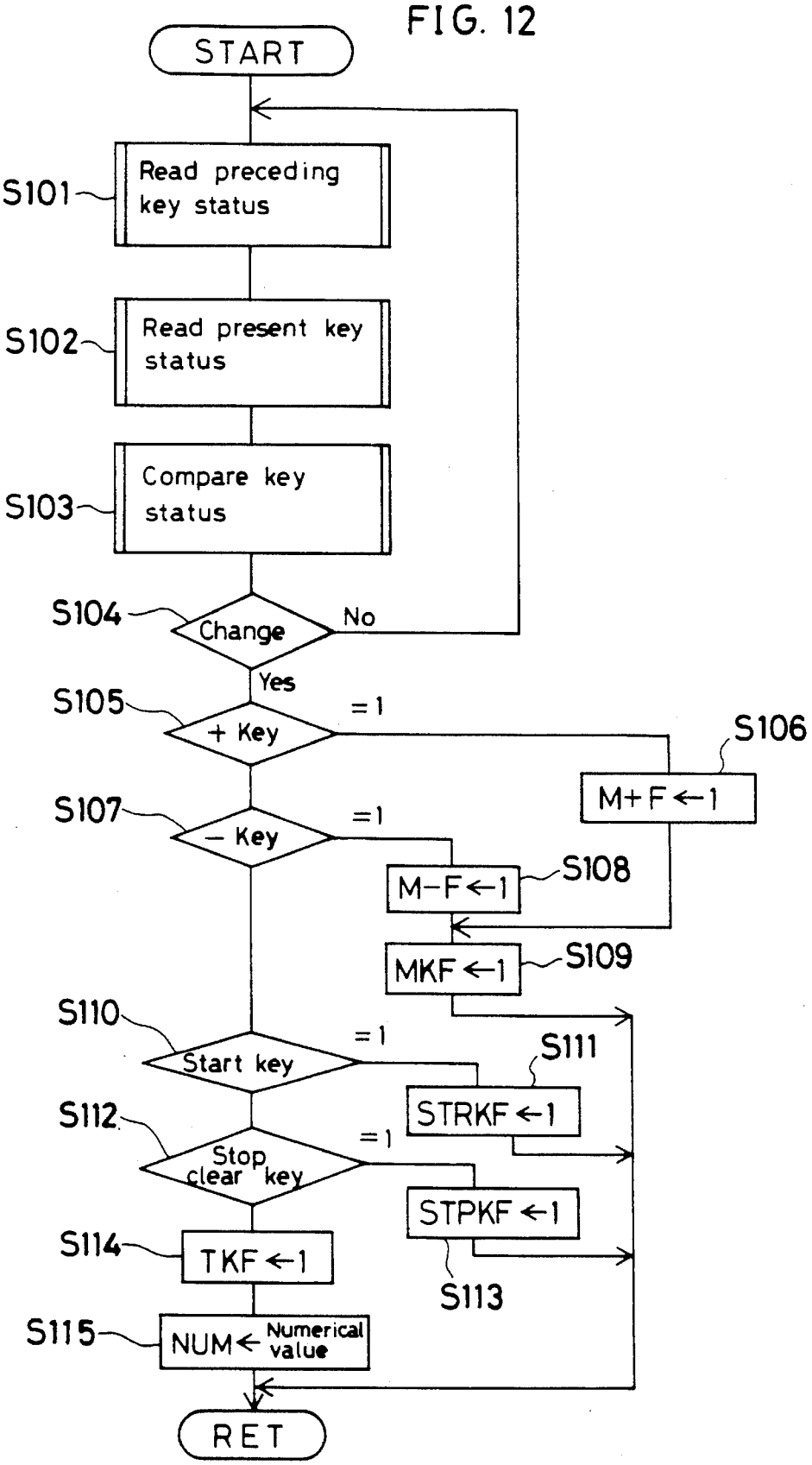
FIG. 12 is a chart for an input supervisory routine program of ten-key pad.

In a main routine, the system is first initialized (step S1) as shown in FIG. 11, and input check is performed (step S2). Then, an input mode No. (value of IMD) is read (step S3), and this input mode is executed (step S4). For input check, ten-key input supervisory routine is executed as shown in FIG. 12. If a new input is detected, a flag is set to 1 as described later. By checking whether the flag is 1 or 0 in a program of the input mode No. thus set, processing for the new input is executed, and copying is started. That is, if start key is pressed in the copying mode, copying is carried out (steps S5–S6). Otherwise, it is returned to the input check, and the same procedure is repeated.

In a ten-key input supervisory routine, a change of key status is detected as shown in FIG. 12 (steps S101–S104). If there is a change, the corresponding key flags M+F, M–F, MKF, etc. are set to 1 (steps S105–S114). In case of numeric keys, the numerical value is written in a numeric storage area NUM (step S115). Flag M+F is set to 1 when + mouse switch is pressed, and M–F is set to 1 when – mouse switch is pressed. MKF is set to 1 when either one of the mouse switches is pressed. Flag STRKF is set to 1 when start key is pressed. Flag STPKF is set to 1 when stop clear key is pressed. Flat TKF is set to 1 when ten-key is pressed.

Figure 13:
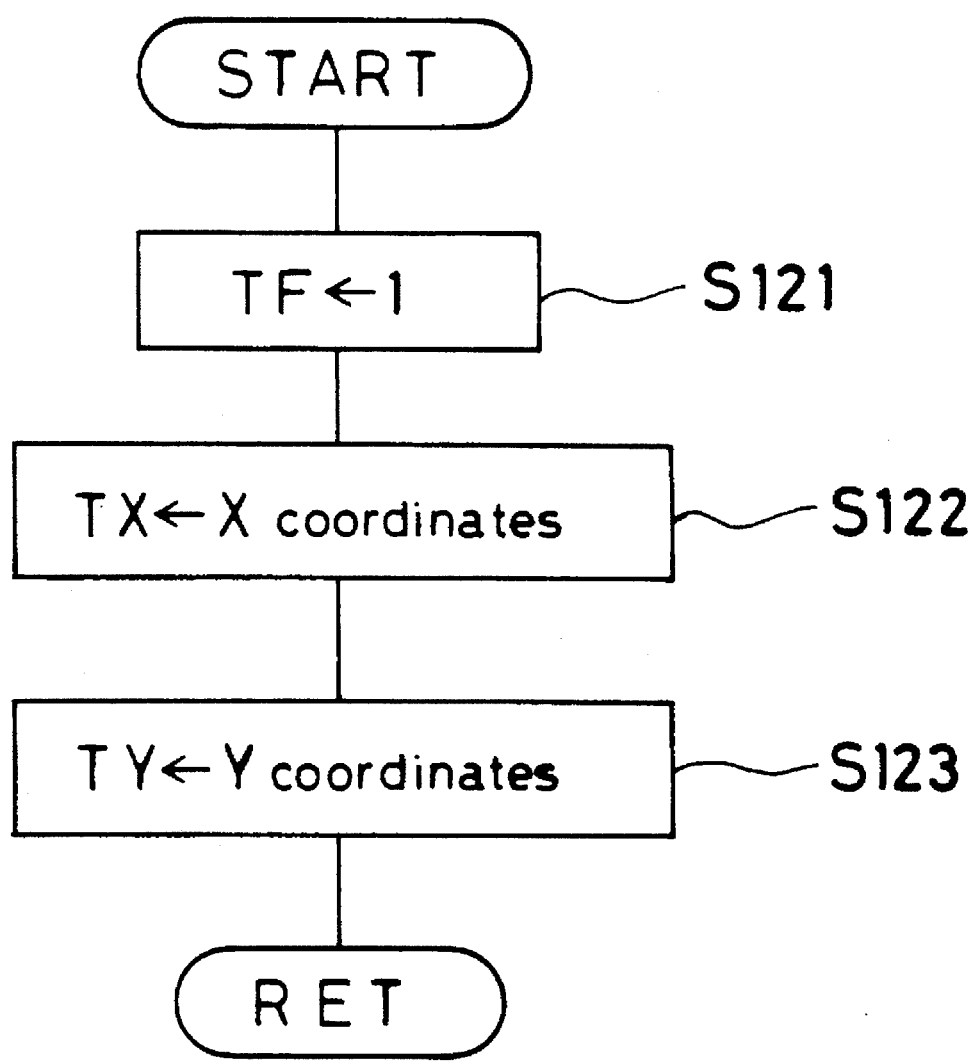
FIG. 13 is a chart for an input interrupt routine program of touch panel.

In a touch panel input interrupt routine, when touch input is issued as shown in FIG. 13, a touch input flag TF is set to 1 (step S121), and touch input coordinate values TX and TY are updated by the coordinates of the flag (steps S122–S123).

Figure 14:
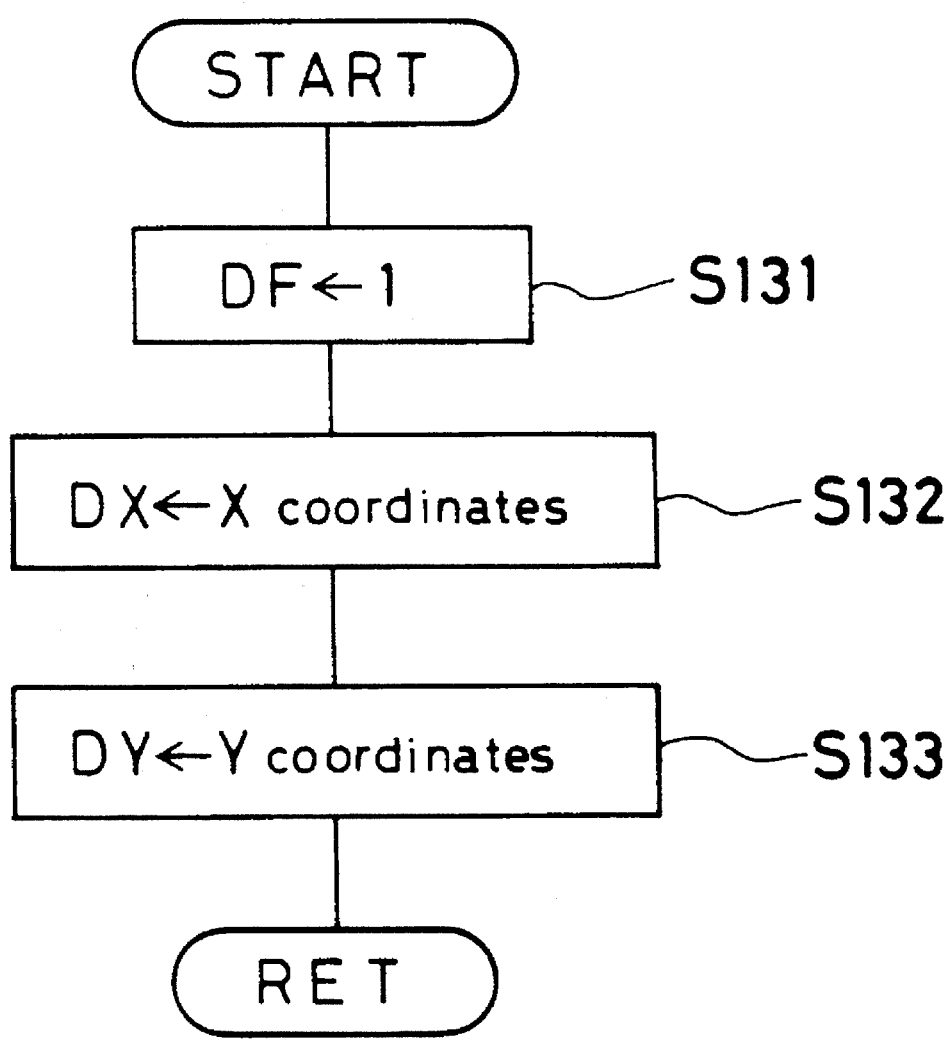
FIG. 14 is a chart for an input interrupt routine program of edit pad.

In an edit pad input interrupt routine, when edit pad input is issued as shown in FIG. 14, an edit pad input flag DF is set to 1 (step S131), and touch input coordinate values DX and DY are updated by the coordinates of the flag (steps S132–S133).

Figure 15:
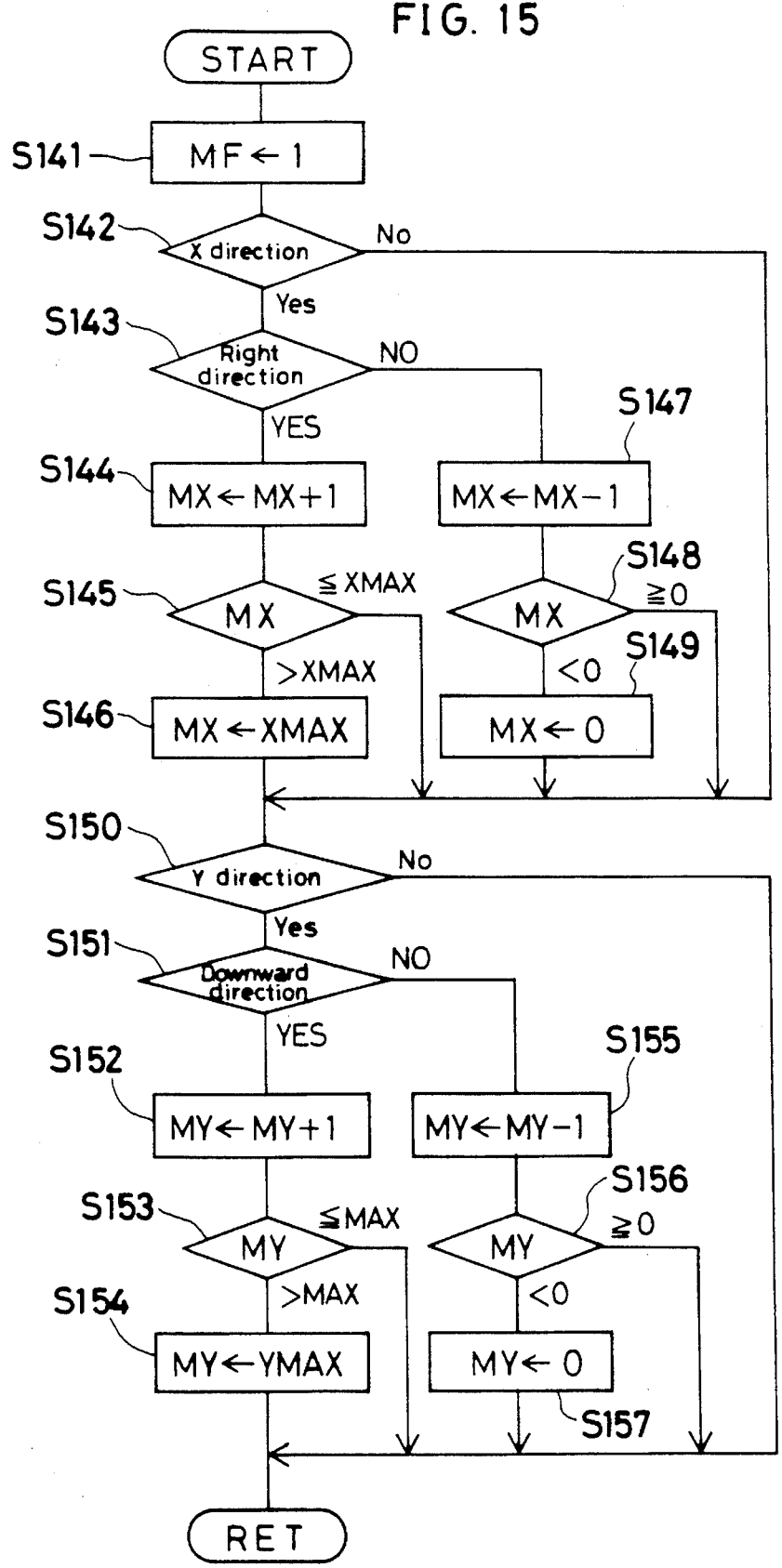
FIG. 15 is a chart for an input routine program of mouse.

In a mouse input interrupt routine, a mouse flag MF is set to 1 (step S141) when mouse input is issued as shown in FIG. 15, and the coordinate values MX and MY of the mouse are updated by increasing or decreasing within the range of 0–maximum values (XMAX, YMAX) depending upon whether it is right or left in X direction or up or down in Y direction (steps S142–S157).

Figure 16:
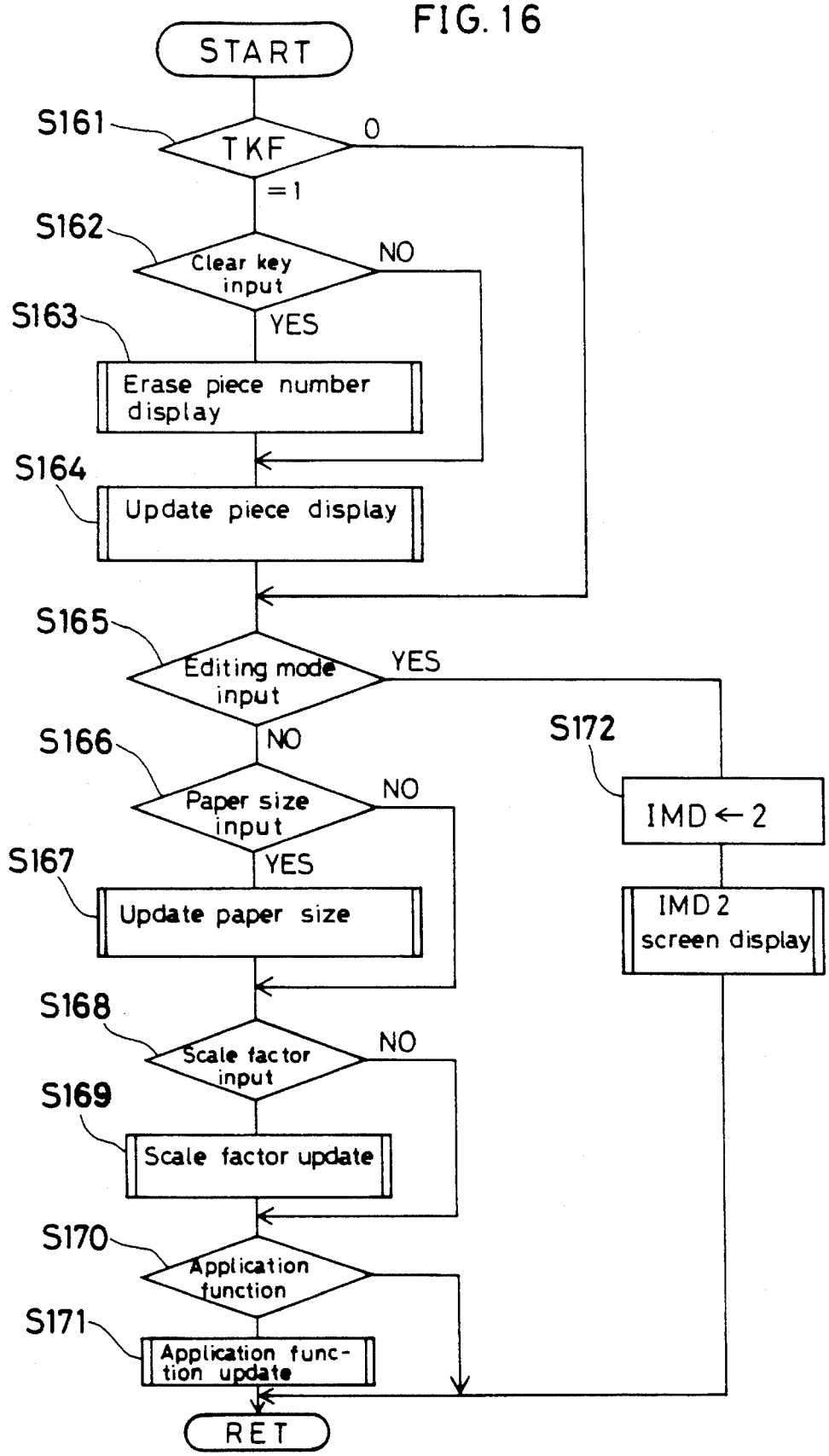
FIG. 16 is a chart for a processing routine program in a copying mode.

When power is turned on in the system, copying mode (IMD=1) is set, and a screen shown in FIG. 10(*a*) is displayed on LCD display unit 47. By a program of copying mode, it is checked whether ten-key flag TKF is 1 or not as shown in FIG. 16 (step S161). If it is 1, piece number display is erased or updated (steps S162–S164). In case an edit mode is selected, input mode No. is set to 2, and paper size, scale factor and application function are updated according to the input (steps S166–S171). The input for editing mode selection, paper size, scale factor, application function, etc. can be executed by touching tags displayed on the screen, selection button or displayed data on the screen.

If there is an input flag (TF) from the touch panel 57, its coordinates (TX, TY) are compared with display coordinates (X, Y) of each tag and selection button by a touch key input check program of FIG. 36 as described later. FIG. 10(*b*) shows a screen (IMD =2) when it is switched over to the editing mode by touching the tag for the editing mode.

Figure 17:
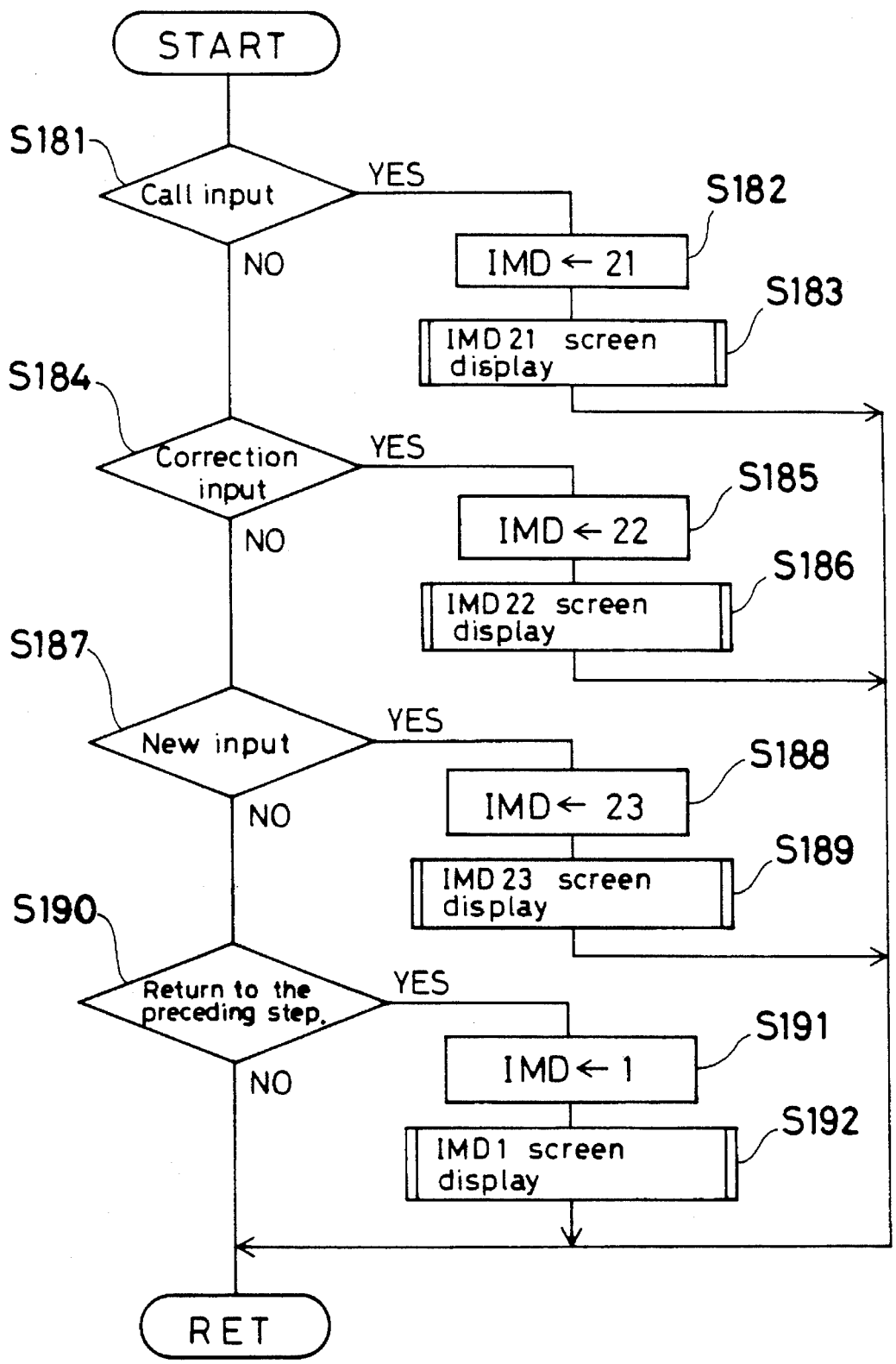
FIG. 17 is a chart for a processing routine program in an editing mode.

The screen of the editing mode gives 4 selection items: "call" for calling registration mode, "correction" for correcting registration mode, "new" for registering a new mode, and "return to the preceding step" for returning to the screen of copying mode. In the editing mode, input mode No. (IMD) is rewritten according to the selection and the screen is switched over as shown in FIG. 17 (steps S181–S192). On the screen of FIG. 10(*b*), it is indicated that "1"displayed at the head of the item "call" is inversely displayed to show that this item has been selected.

FIG. 10(*c*) shows the screen (IMD=23), which is switched over when "new" is selected on the screen of the editing mode of FIG. 10(*b*). The item to be inputted is selected on this screen. Normally, the manuscript size A4 is inversely displayed as default. Accordingly, if the setting key is pressed under this condition, the manuscript size is registered as A4, and the screen is switched over to the screen of FIG. 10(*d*) (IMD=231), and manuscript area is displayed on a part of LCD display unit 47 in size of 60×85 mm.

Figure 18:
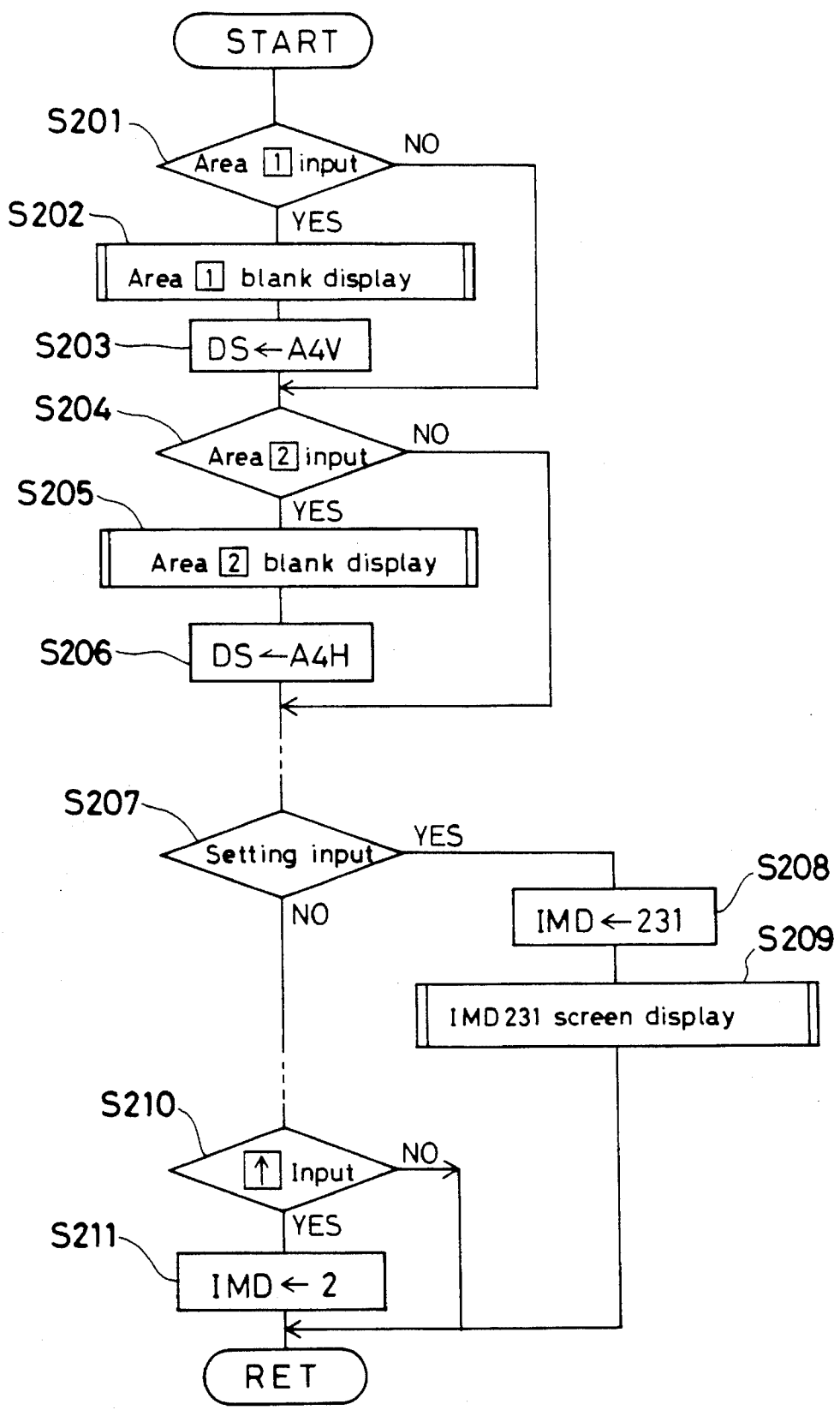
FIG. 18 is a chart for a manuscript size input program.

On the screen of FIG. 10(*c*), if manuscript reading key is specified, image data from scanner which has read the manuscript are stored in an image memory 71. CPU 41 judges manuscript size from a program (not shown) according to the information of the image memory 71 and inputs its value. FIG. 18 shows a manuscript size input program, and manuscript size information of the manuscript size selected by the touch panel is stored in manuscript size information DS (steps S201–S206). Similarly, for the other size, after input has been confirmed, it is judged whether there is setting instruction or not (step S207). If there is setting instruction, it is shifted to the screen of FIG. 10(*d*).

The screen (IMD=231) of FIG. 10(*d*) is an operation screen for area setting. Display data of FIG. 10(*d*) is read from ROM 42 and are written on RAM 45 for display. To display longitudinal and lateral size (DSX, DSY) of the manuscript to be displayed on a manuscript area of the display unit, scale-down ratios (RCX, RCY) in longitudinal and lateral directions are obtained by display scale factor computation program of FIG. 19. Then, display scale factor DRc is obtained (steps S221–S225), and a frame for the manuscript size is formed. If input type of XY coordinates of left upper point and right lower point are specified on this screen and the values are inputted to update numerical data, the lines showing the updated range are displayed on an area display unit. Scale-up key is to scale up the area display unit of left side for easier checking, and it is switched over to the screen of FIG. 10(o). Registration key is to specify registration, and it specifies when data setting for registration has been completed. An area setting program of FIG. 20 is the program to control this screen.

Figure 20A:
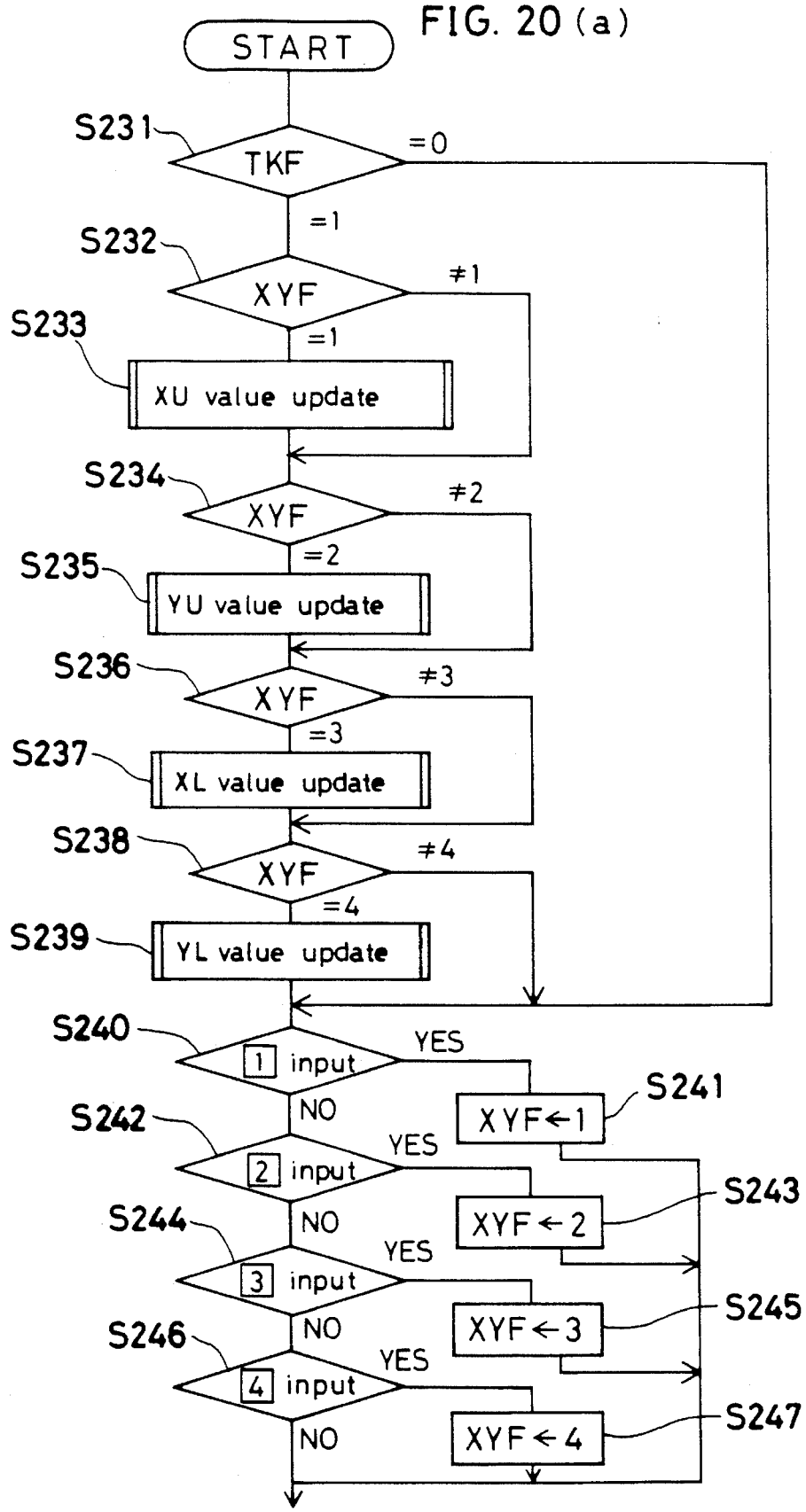
FIGS. 20(a) and 20(b) are a chart for an area setting program.
Figure 20B:
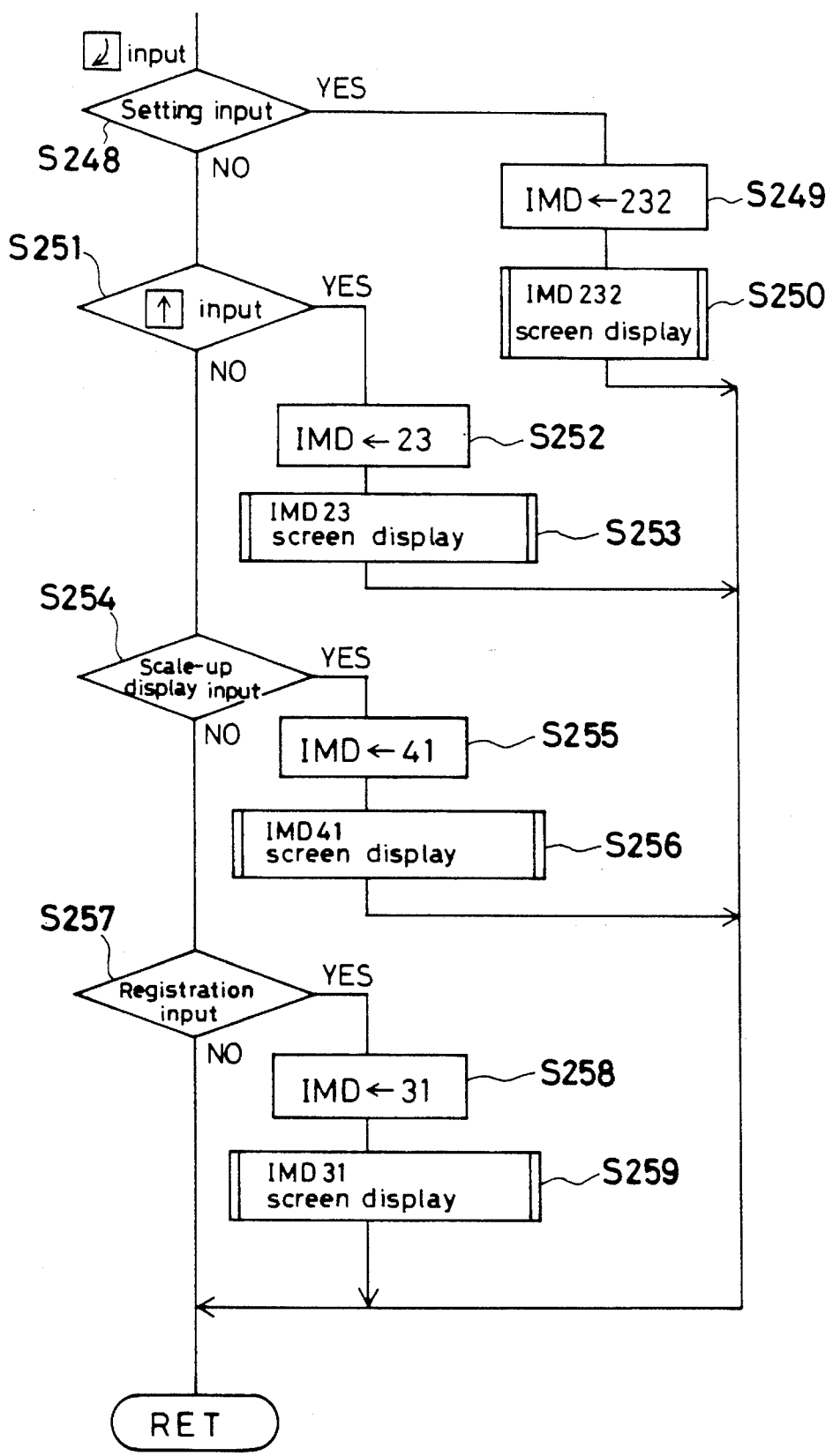
Figure 21:
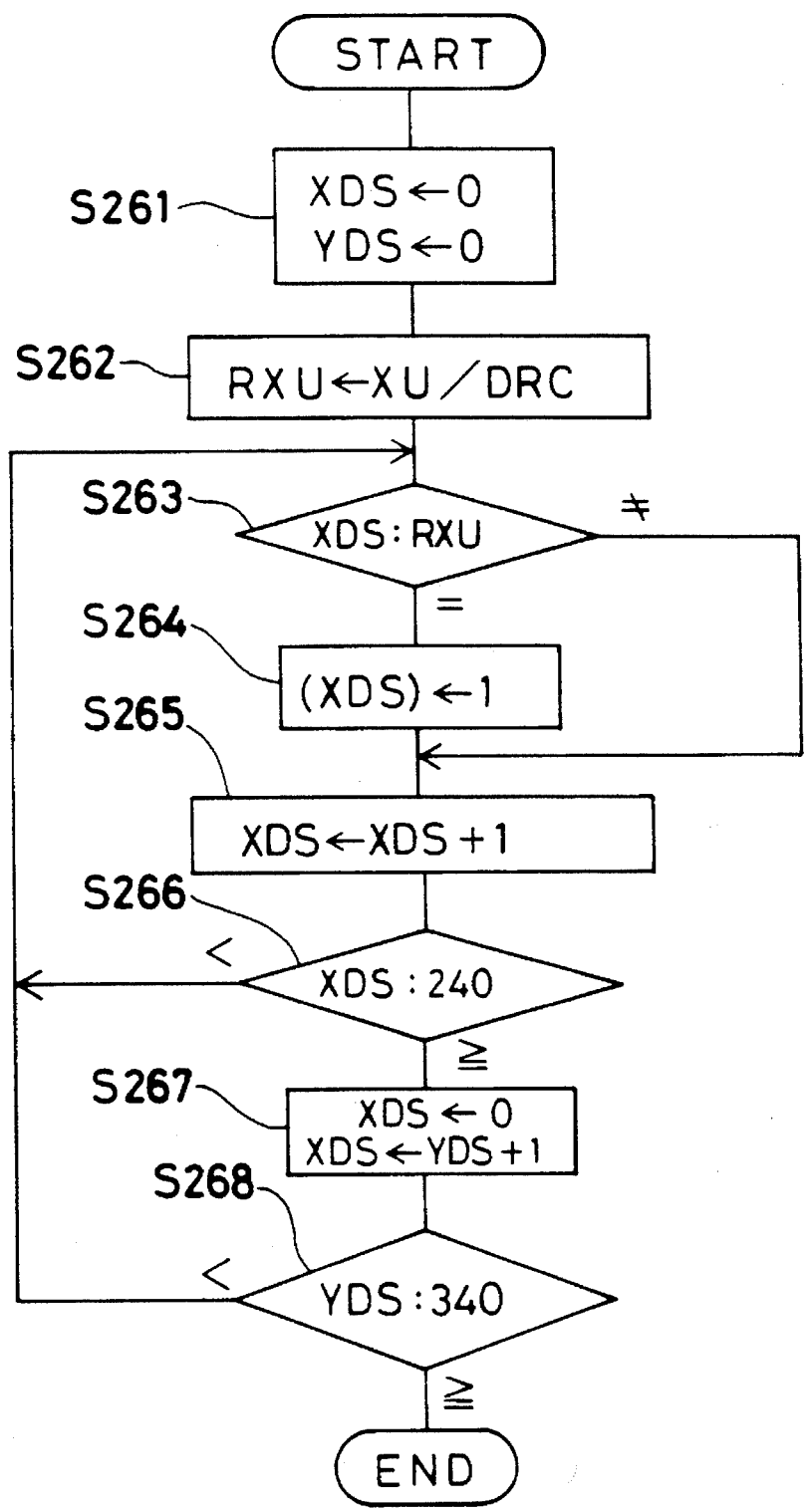
FIG. 21 is a chart for a display program of XU line.

In the area setting program, when coordinate items to be inputted are selected from the touch panel as shown in FIG. 20, coordinate data input flag (XYF) is set (steps S240–S247). Responding to ten-key input, values corresponding to coordinate data input flag are updated among the coordinates XU, YU, XL and YL (steps S231–S239). When the setting key, the scale-up key or the registration key is inputted, the input mode No. is rewritten to "23", "41" or "31" respectively, and the screen is switched over (steps S248–S259). During the updating, an area displaying manuscript area at left is entirely cleared for once, and manuscript frame and coordinate lines thus set are entered. In so doing, area display is correctly performed, and this contributes to the reduction of operation error. FIG. 21 shows a display program of XU line as an example to display coordinate lines. The other coordinate lines can be displayed in similar way.

Figure 10D:
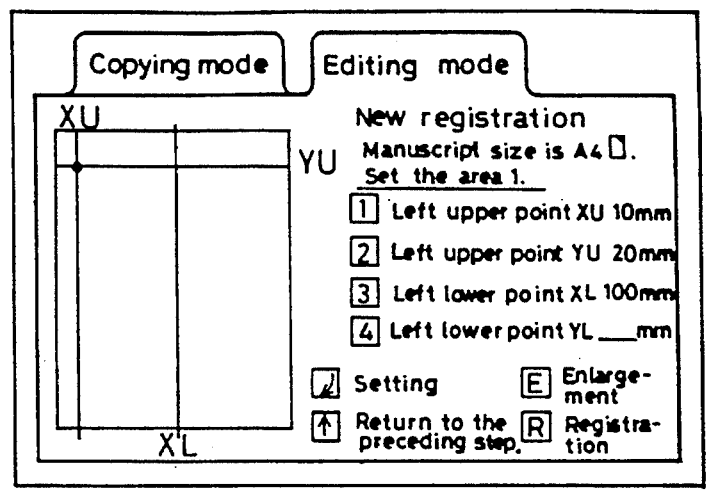
FIGS. 10(a) to 10(b) represent examples of screens displayed on an LCD display unit of the console panel.
Figure 10E:
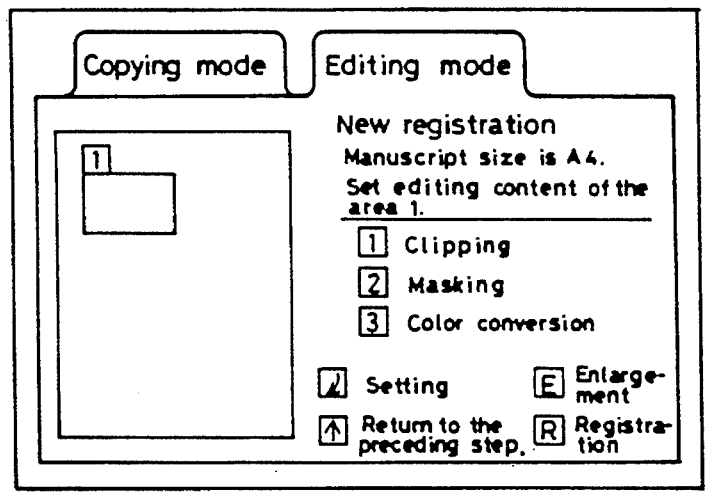
Figure 22:
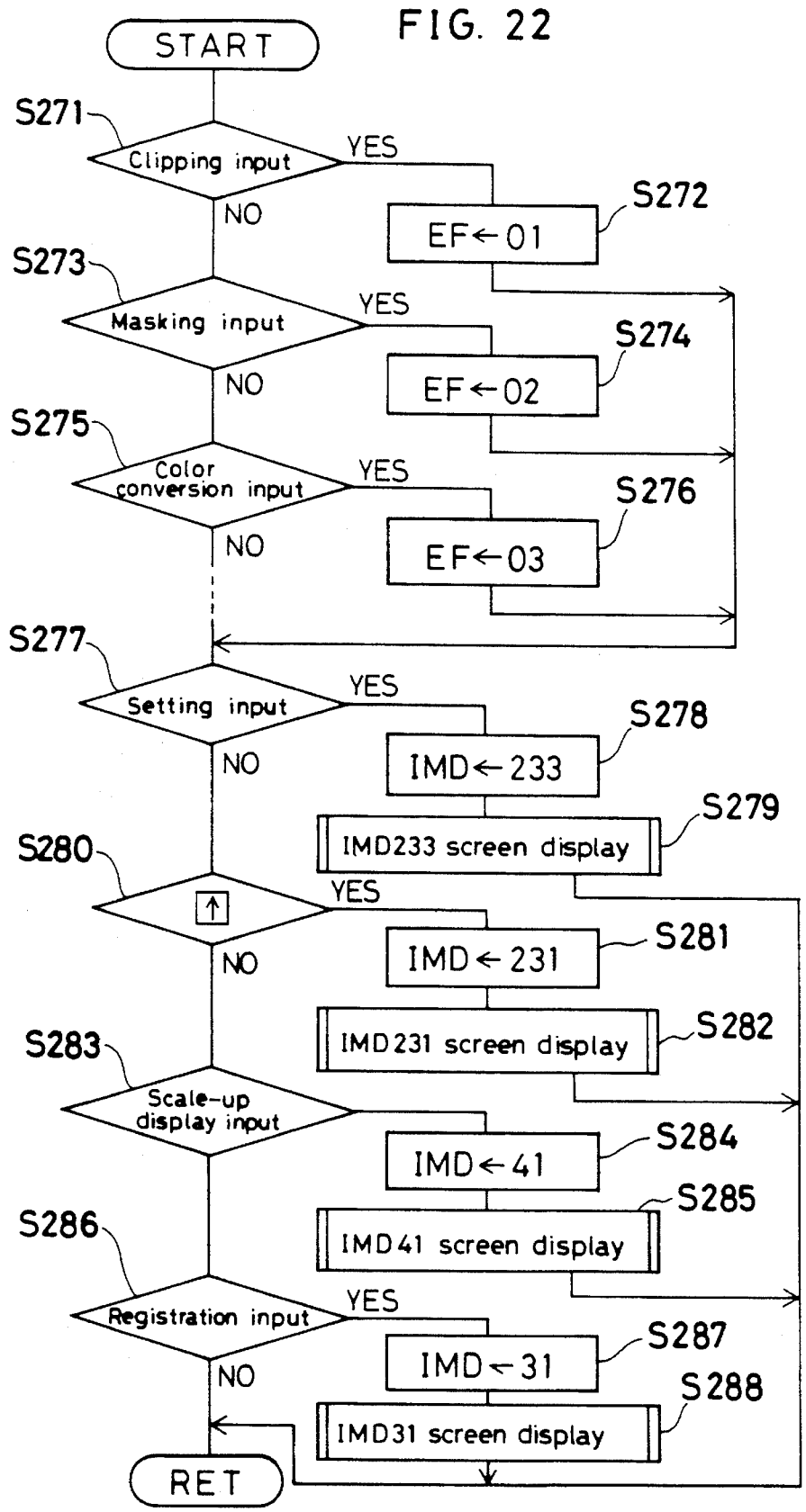
FIG. 22 is a chart for an editing content setting program.

When the setting key is pressed in the screen of FIG. 10(d), the screen is turned to a setting screen (IMD =232) of editing content to the setting of the area (1) of FIG. 10(e). FIG. 22 shows an editing content setting program for controlling this screen. In the screen of FIG. 10(e), editing content such as clipping, masking, color conversion, etc. is selected and the type of editing is set to register EF (steps S271–S276). When the setting key is pressed, the setting of the area (1) is completed, and content of the register EF is written in response to the area set by an editing content memory development program of FIG. 25 as described later in an area memory 61 corresponding to the area (1), and the screen is turned to the setting screen of the area (2). In this case, the area (1) set by a frame display program of FIG. 38 (described later) is displayed on the screen (IMD=233) of FIG. 10(g). It is needless to say that the area number may be displayed in the area or form or density of line may be changed. Areas 2–4 can be set by the same procedure when necessary.

Figure 10F:
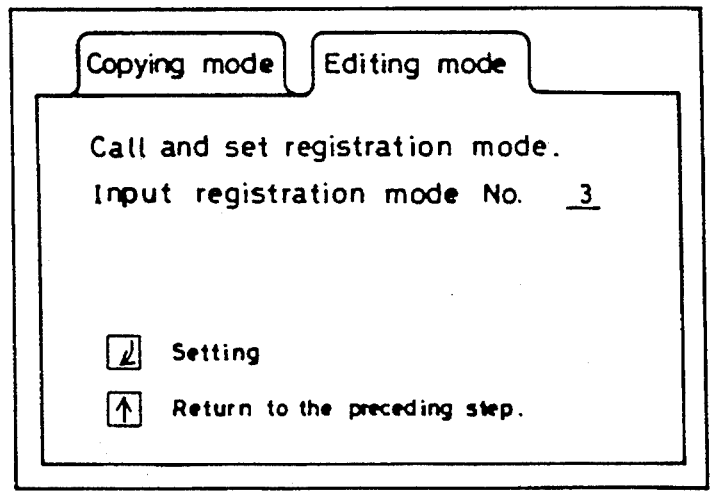
Figure 10G:
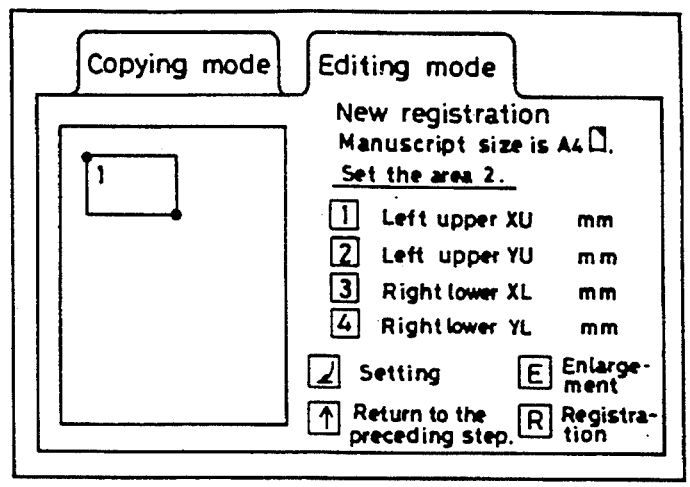
Figure 10H:
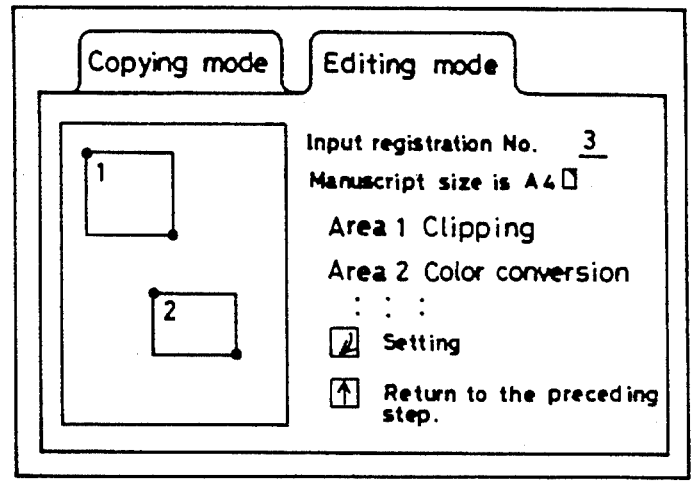
Figure 23:
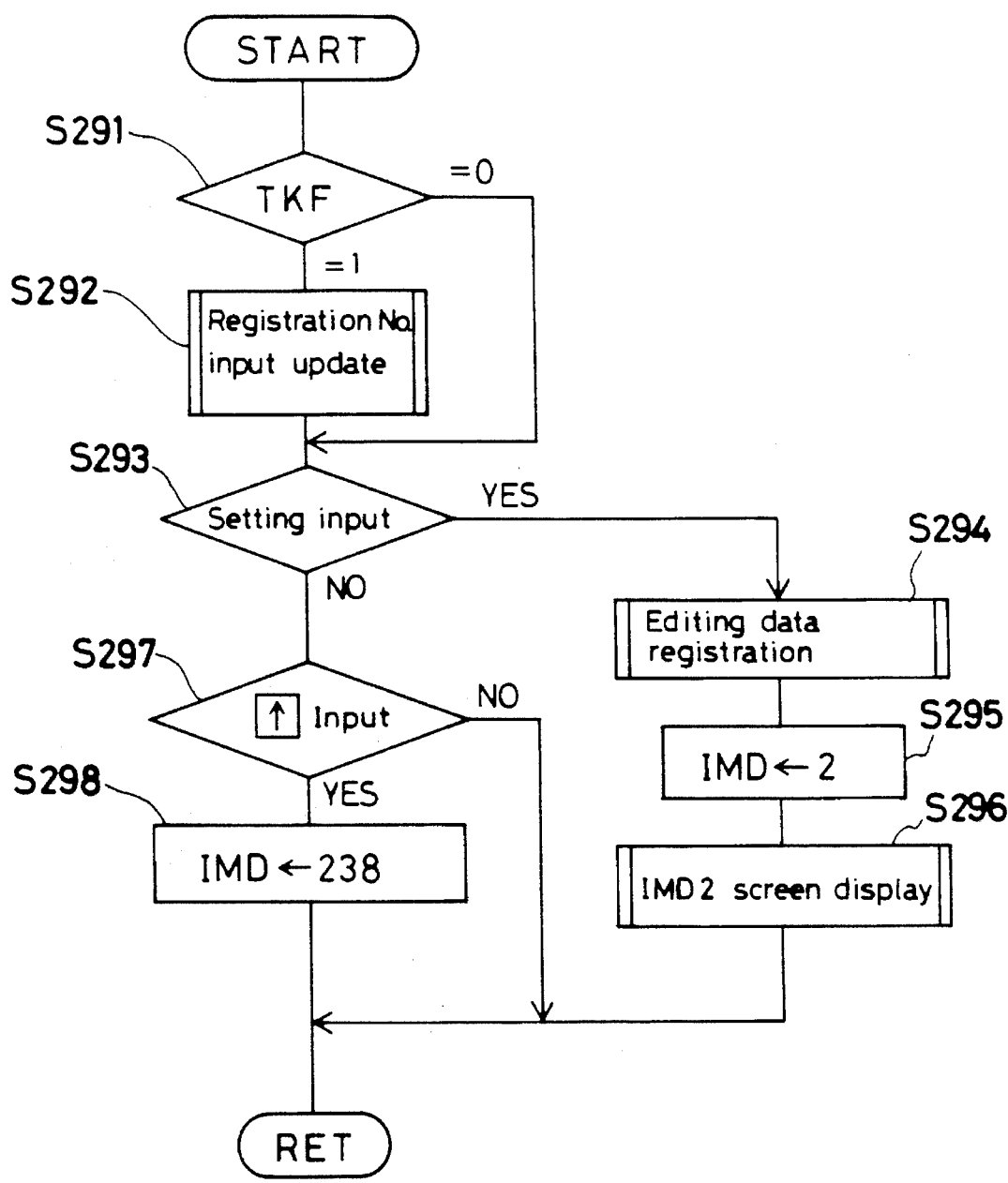
FIG. 23 is a chart for a registration program.

FIG. 10(h) shows the screen (IMD=41), which is switched over when the registration key is specified on the screens of FIGS. 10(c), (d) and (e). On this screen, manuscript size, its longitudinal and lateral directions, editing content for each area and area frame are displayed. In the present example, two areas are set, and dotted lines are used to display that two more areas can be set. One of the registration numbers which can be registered is displayed by default. It is possible to change the registration number by pressing ten-key. When the setting is pressed after the registration number has been inputted, it is returned to the initial screen (IMD=2) of the editing mode of FIG. 10(b). The registration program of FIG. 23 controls this screen, and the editing data are stored in a predetermined storage area of NVRAM 44 corresponding to each registration number (step S294). To return from this screen by one step, it is returned to the edit setting screen (IMD=235) of the area (4). In so doing, the screen is returned one by one.

Figure 24:
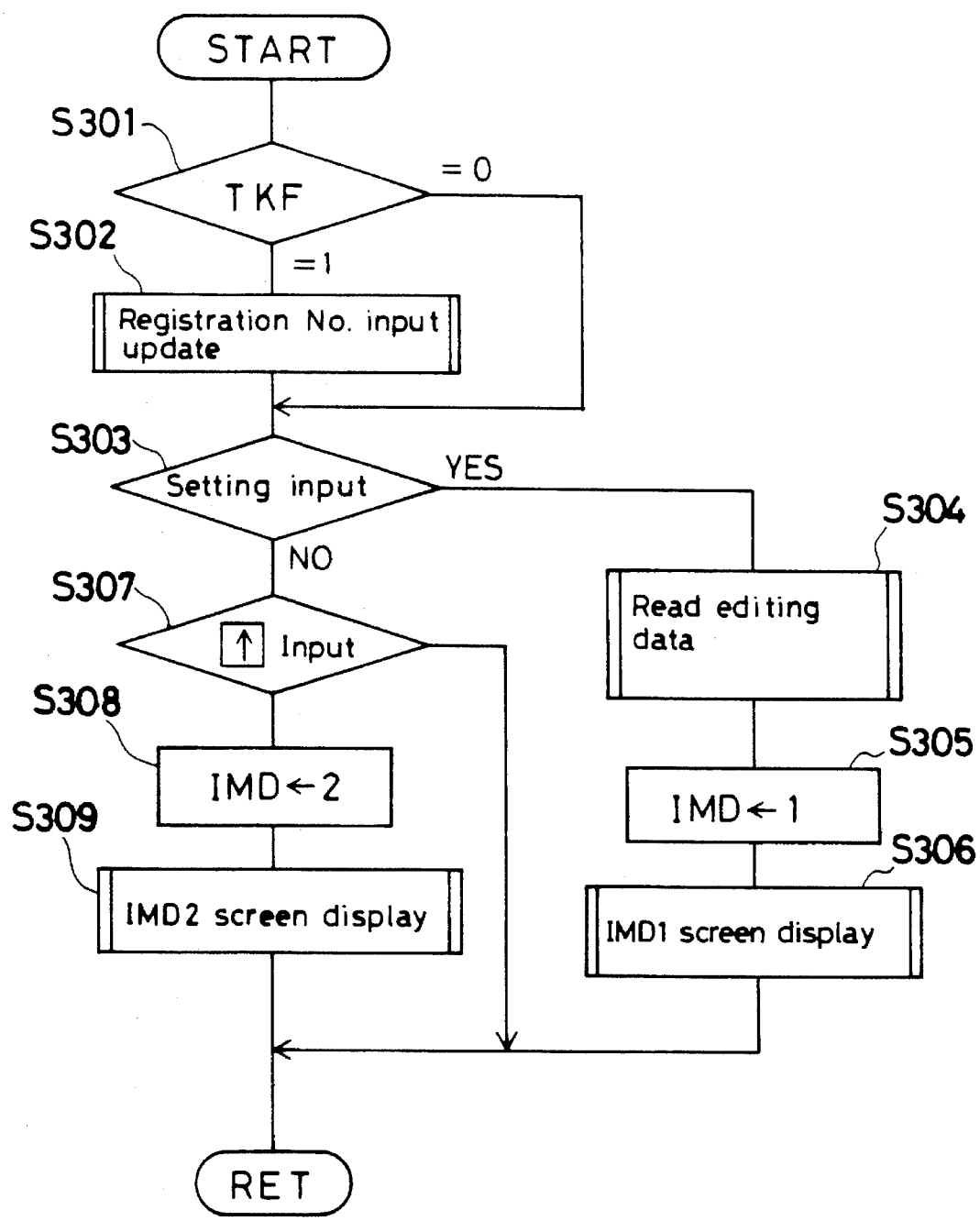
FIG. 24 is a chart for a registration calling program.
Figure 25:
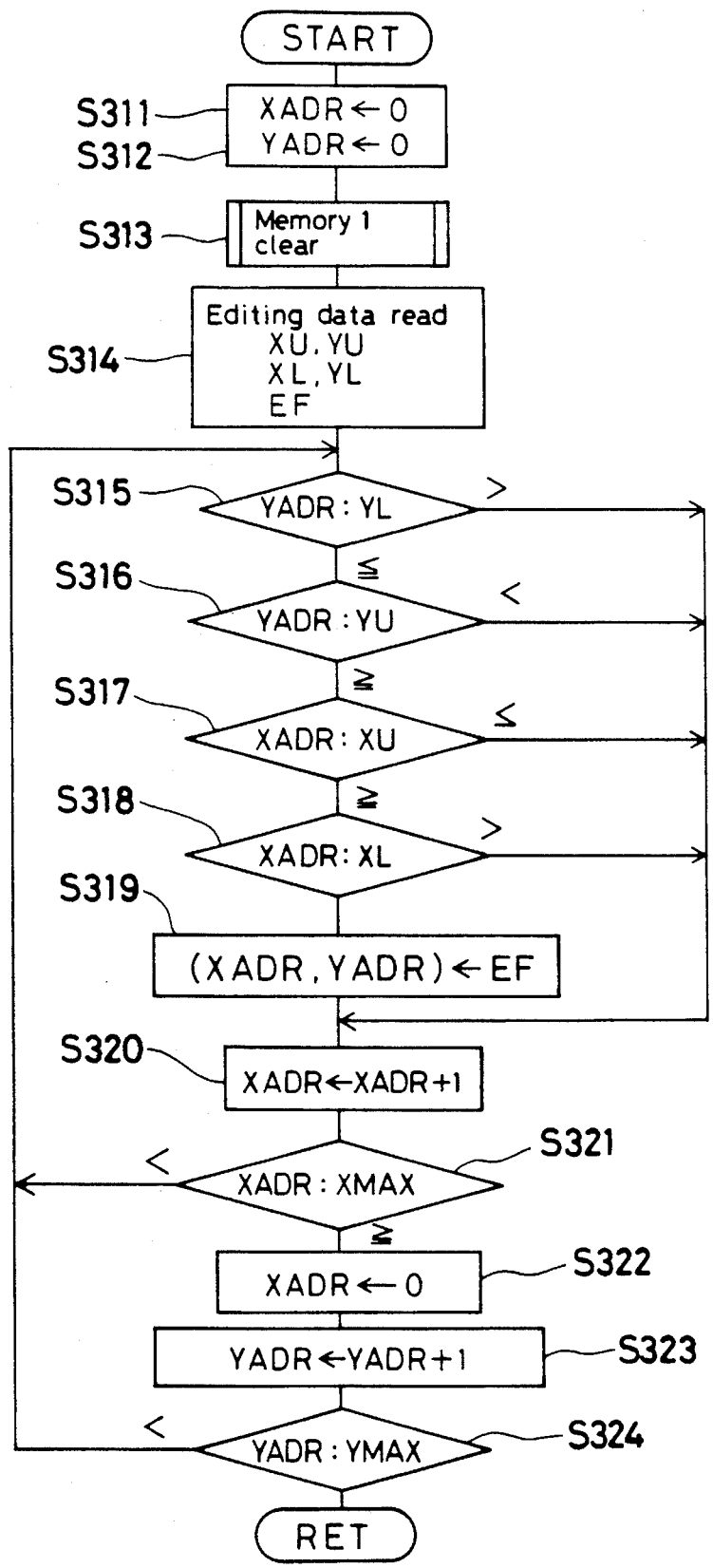
FIG. 25 is a chart for an editing content developing program.

FIG. 10(f) shows the screen (IMD=21), which is obtained when the mode is shifted to copying mode by inputting registration number after calling of the registered editing mode has been specified on the screen of the editing mode (IMD=2). On this screen, editing data are called from an address of NVRAM 44 corresponding to the registration number, which has been set and specified by registration calling program of FIG. 24, and each editing content is written on area memories 61–64 based on the editing data. Because memories are independent for each area, editing content can be deployed for each area independently. Because the area 61–64 have resolution of 100 spi, the editing content of the area can be written in the same clock as the image data if address is given with the address of the area memory as XY coordinates of the iamge data and if lower level 2 bits are omitted. FIG. 25 shows an editing content memory development program for writing editing content EF of the area (1) to editing memory. The editing content set on the register EF is written internally according to XY coordinates (XL, XU, YL, YU) of the area frame (steps S315–S324). The editing content of each area corresponding to the editing memory by this program is written for the other areas by the same procedure one after another, and area memories 61–64 are set. Then, it is shifted to the screen of FIG. 10(k).

Figure 10I:
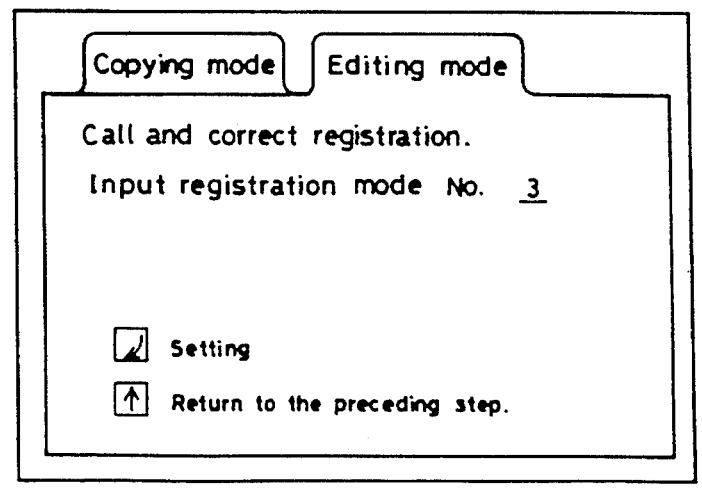
Figure 26:
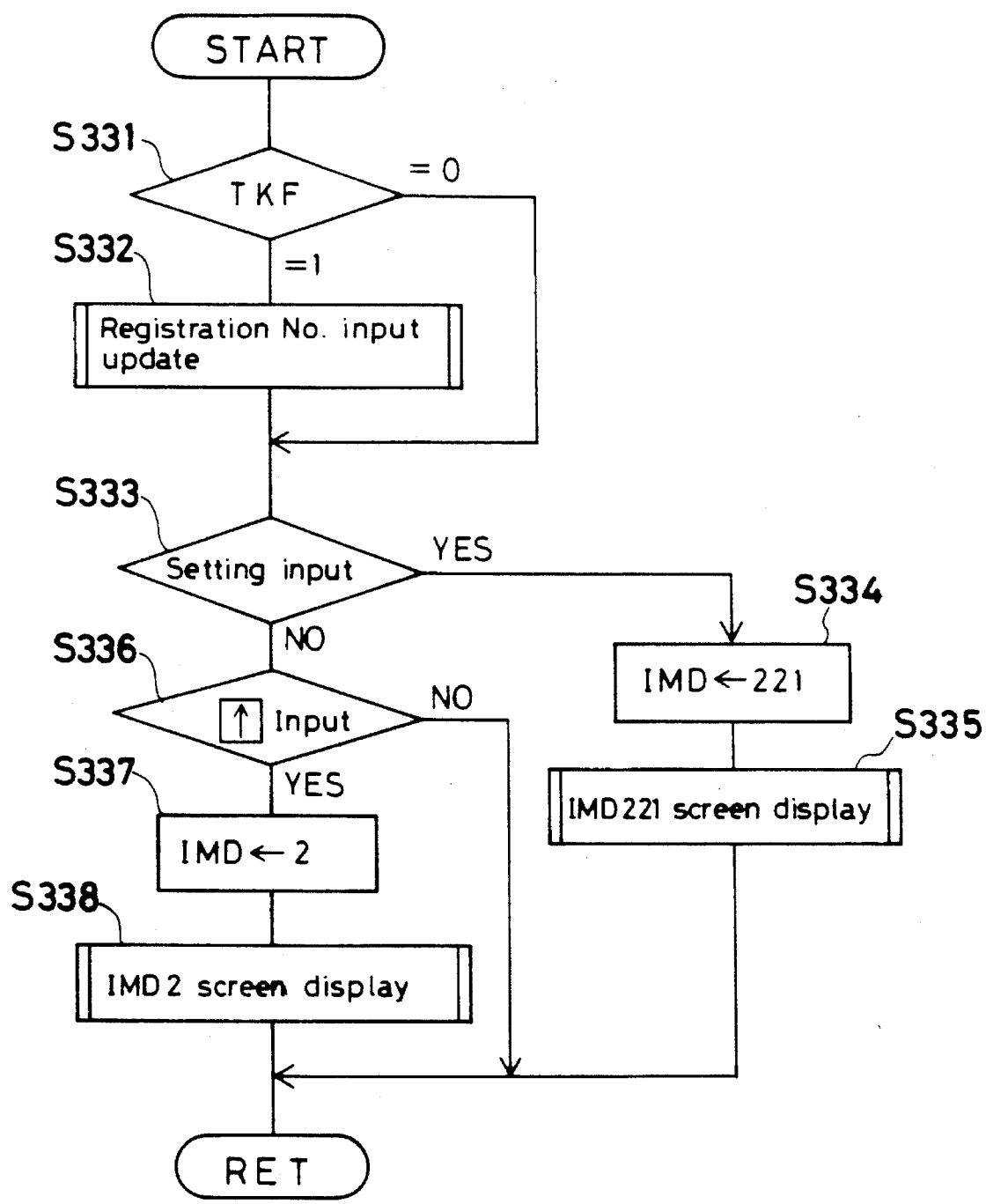
FIG. 26 is a chart for a correction program.

The screen (IMD=22) of FIG. 10(i) is displayed when "correction" is selected on the editing screen of FIG. 10(b). When registration number is inputted and set on this screen, it is shifted to the screen (IMD=221) of FIG. 10(j). The program of FIG. 26 is a program for controlling the corrected screen of FIG. 10(i). If the registration number is set, the editing content of this area is read from NVRAM 44 and is displayed on the screen (steps S331–S335).

Figure 10J:
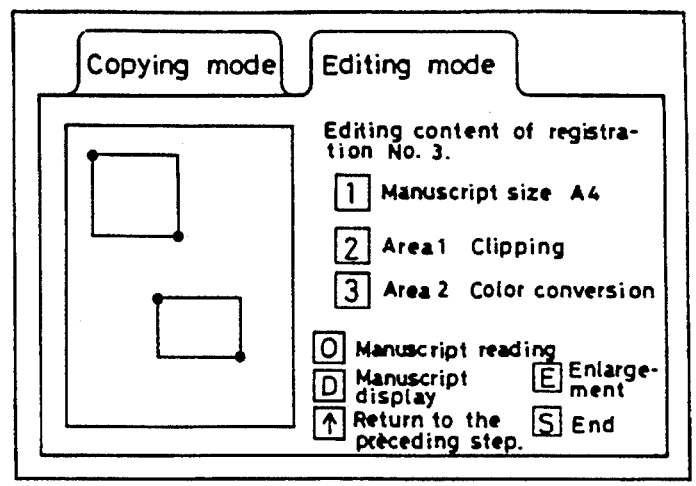
Figure 10K:
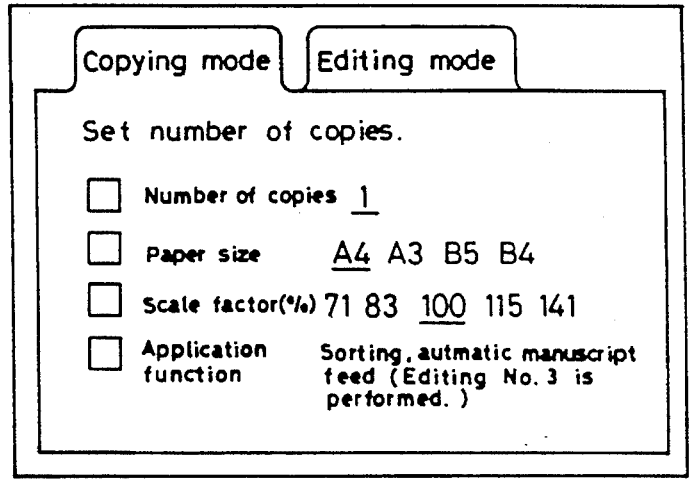
Figure 10L:
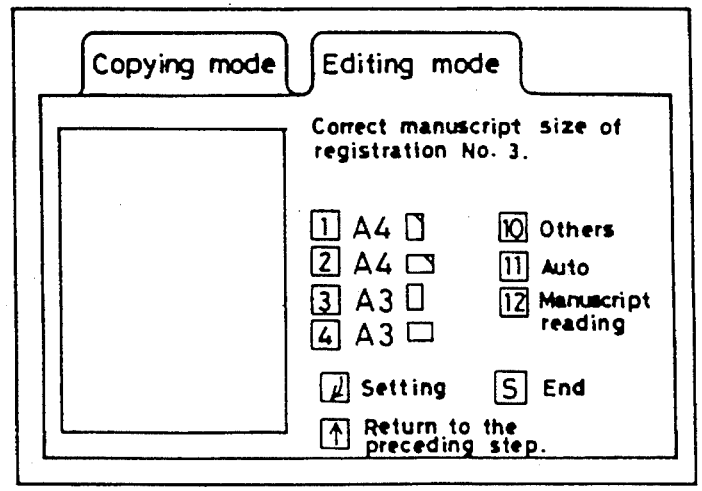
Figure 10M:
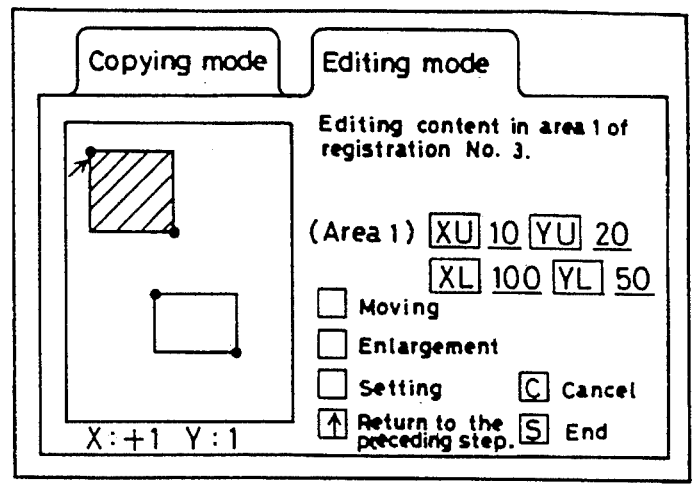
Figure 10N:
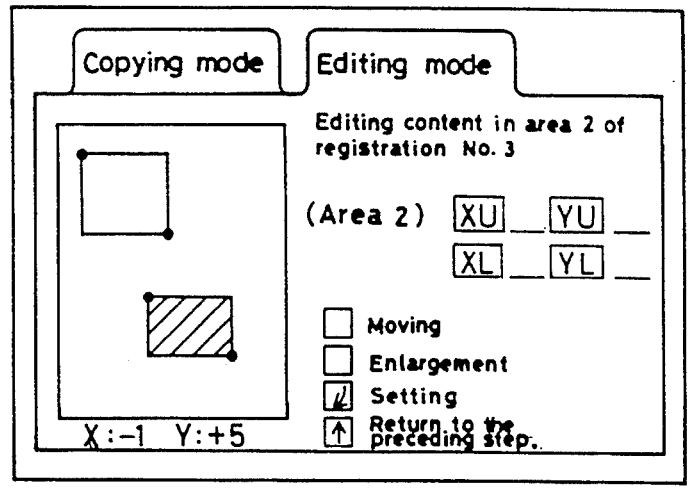
Figure 10O:
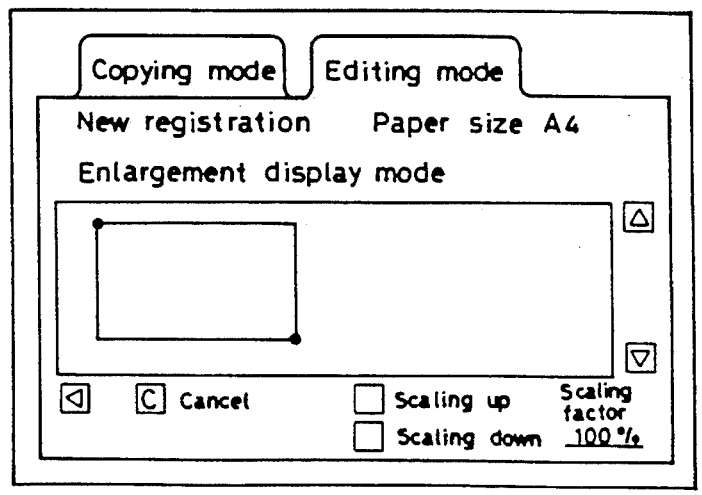
Figure 28:
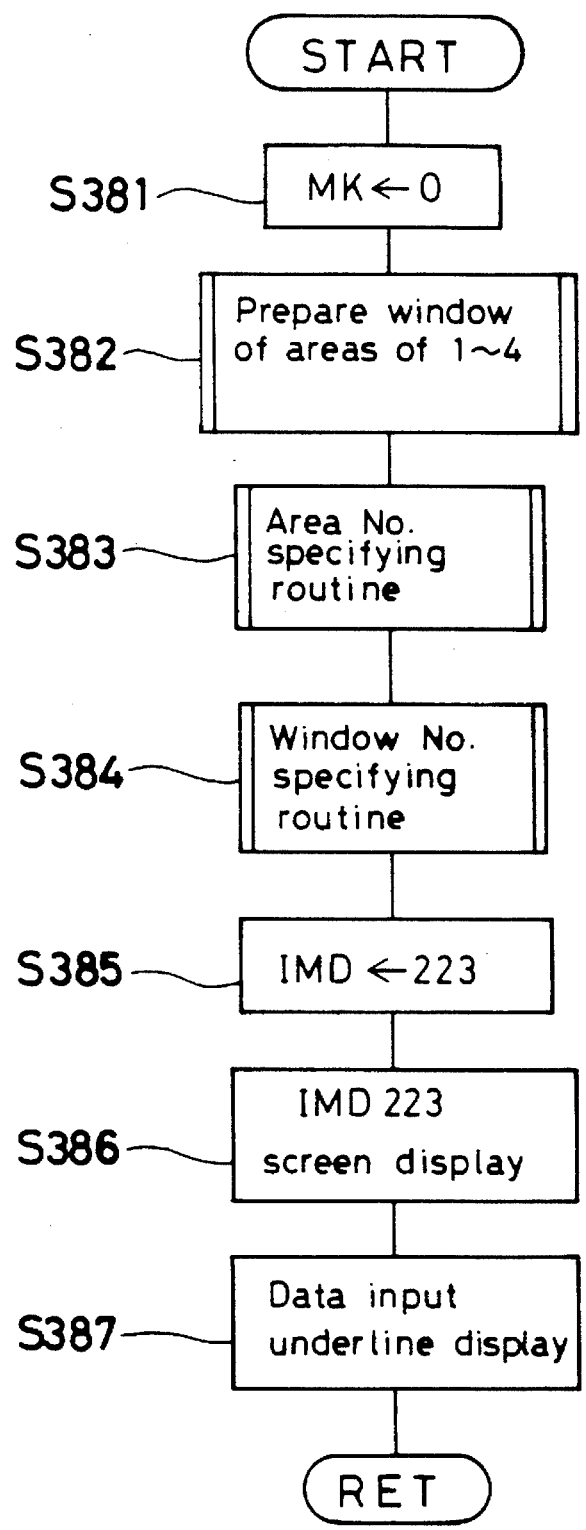
FIG. 28 is a chart for an area retrieval routine program.
Figure 29A:
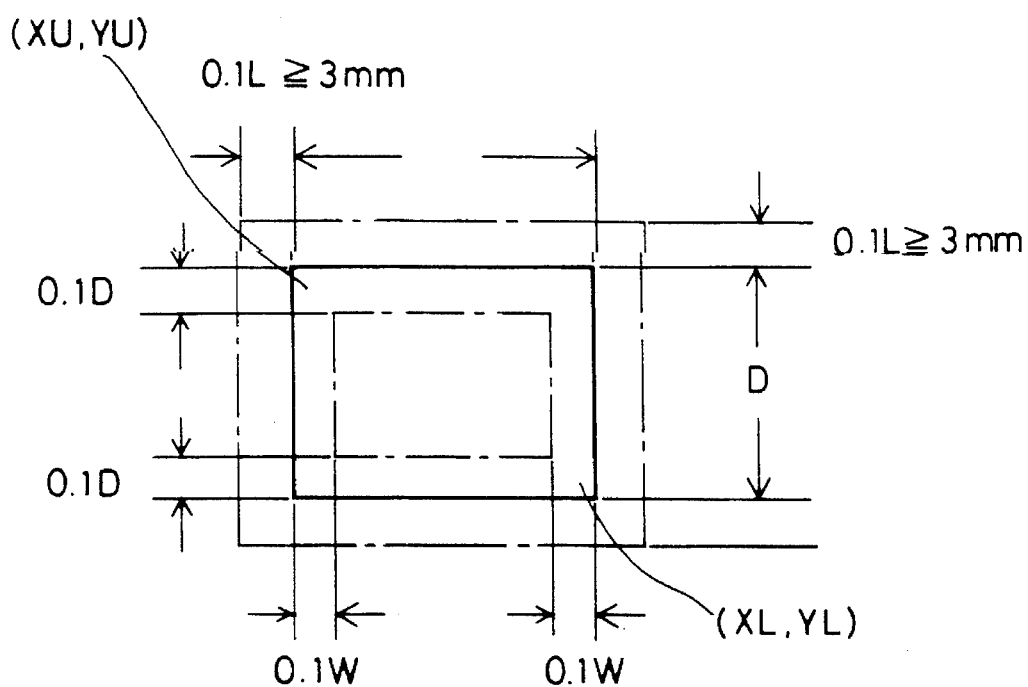
FIGS. 29(a) and 29(b) are charts for setting and division of an area.
Figure 29B:
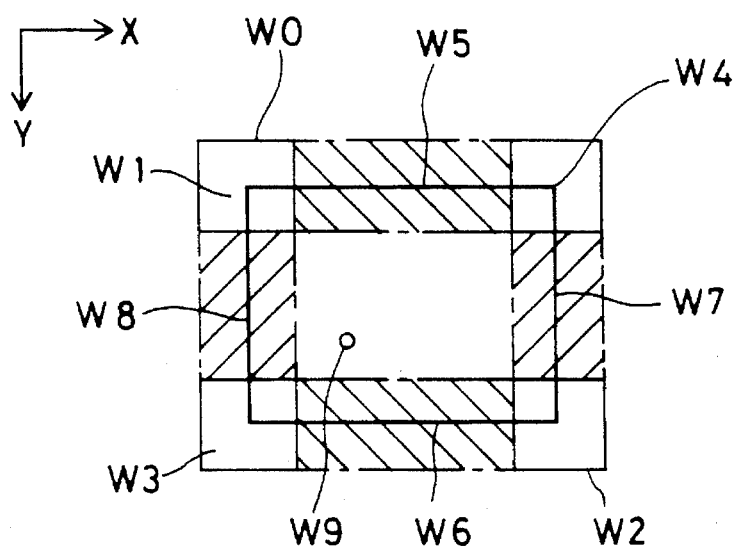

When manuscript size or correction item for the areas (1)–(4) are specified on the screen of FIG. 10(j), it is shifted to the screen of FIGS. 10(l)–(n). FIG. 10(l) is a screen (IMD=222) to correct the manuscript size, FIG. 10(m) is a screen (IMD=223) to correct the area (1), and FIG. 10(n) is a screen (IMD=223) to correct the area (2). Display control of these screens can be executed by the control program of FIG. 27. In this correction mode, mouse (track ball) is operated, and cursor display is used. For the cursor display, coordinates MX and MY of mouse input interrupt routine of FIG. 15 are used. In case there is a new input from mouse, cursor symbol (such as an arrow) is updated and displayed at the position of the coordinates (MX, MY) on display screen of the frame (step S342). In case mouse key (+ or −) is inputted, an area, to which the position of cursor display belongs, is retrieved (step S345). This retrieval is performed by an area retrieval routine program of FIG. 28. Each area is provided with a predetermined width having frame line as its center as shown in FIG. 29(a). Using the area of this width, 10 area divisions of W0–W9 are furnished as shown in FIG. 29(b). The relationship between the divisions and the areas is as summarized in Table 1.

TABLE 1

| Underline display | | | | Window | X coordinate | Y coordinate |
|---|---|---|---|---|---|---|
| (None) | | | | W0 | XU−x≦X≦XL+x | YL−y≦Y≦YU+y |
| XU | YU | | | W1 | XU−x≦X≦XU+x | YU−y≦Y≦YU+y |
| | | XL | YL | W2 | XL−x≦X≦XL+x | YL−y≦Y≦YL+y |
| XU | | | YL | W3 | XU−x≦X≦XU+x | YL−y≦Y≦YL+y |
| | YU | XL | | W4 | XL−x≦X≦XL+x | YU−y≦Y≦YU+y |
| | YU | | | W5 | XU+x<X<XL−x | YU−y<Y<YU+y |
| | | | YL | W6 | XU+x<X<XL−x | YL−y<Y<YL+y |
| | | XL | | W7 | XL−x<X<XL+x | YU+y<Y<YL−y |
| XU | | | | W8 | XU−x<X<XU+x | YU+y<Y<YL−y |
| XU | YU | | | W9 | XU+x<X<XL−x | YL+y<Y<YU−y |

Figure 30:
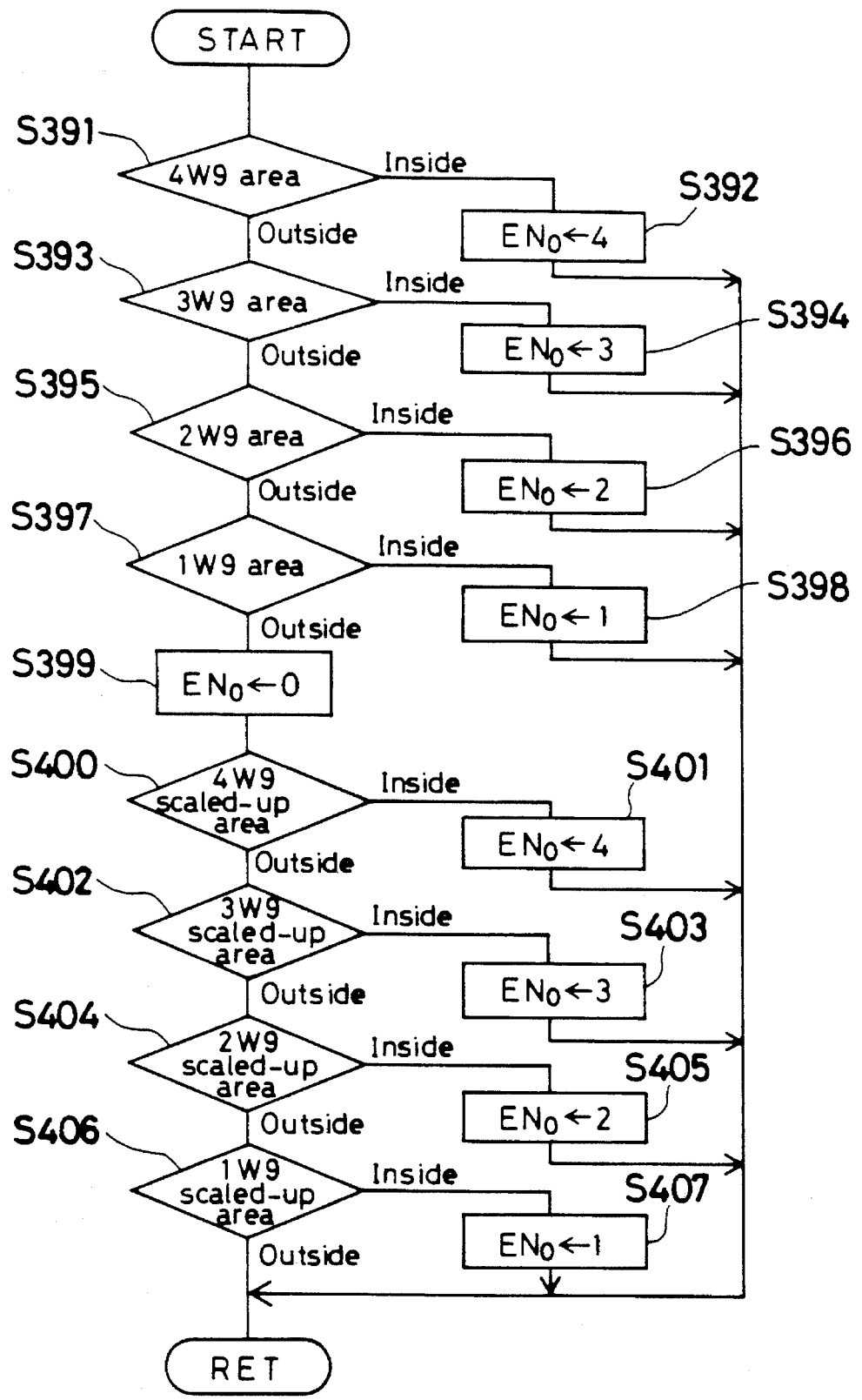
FIG. 30 is a chart for an area specifying sub-routine program.
Figure 31A:
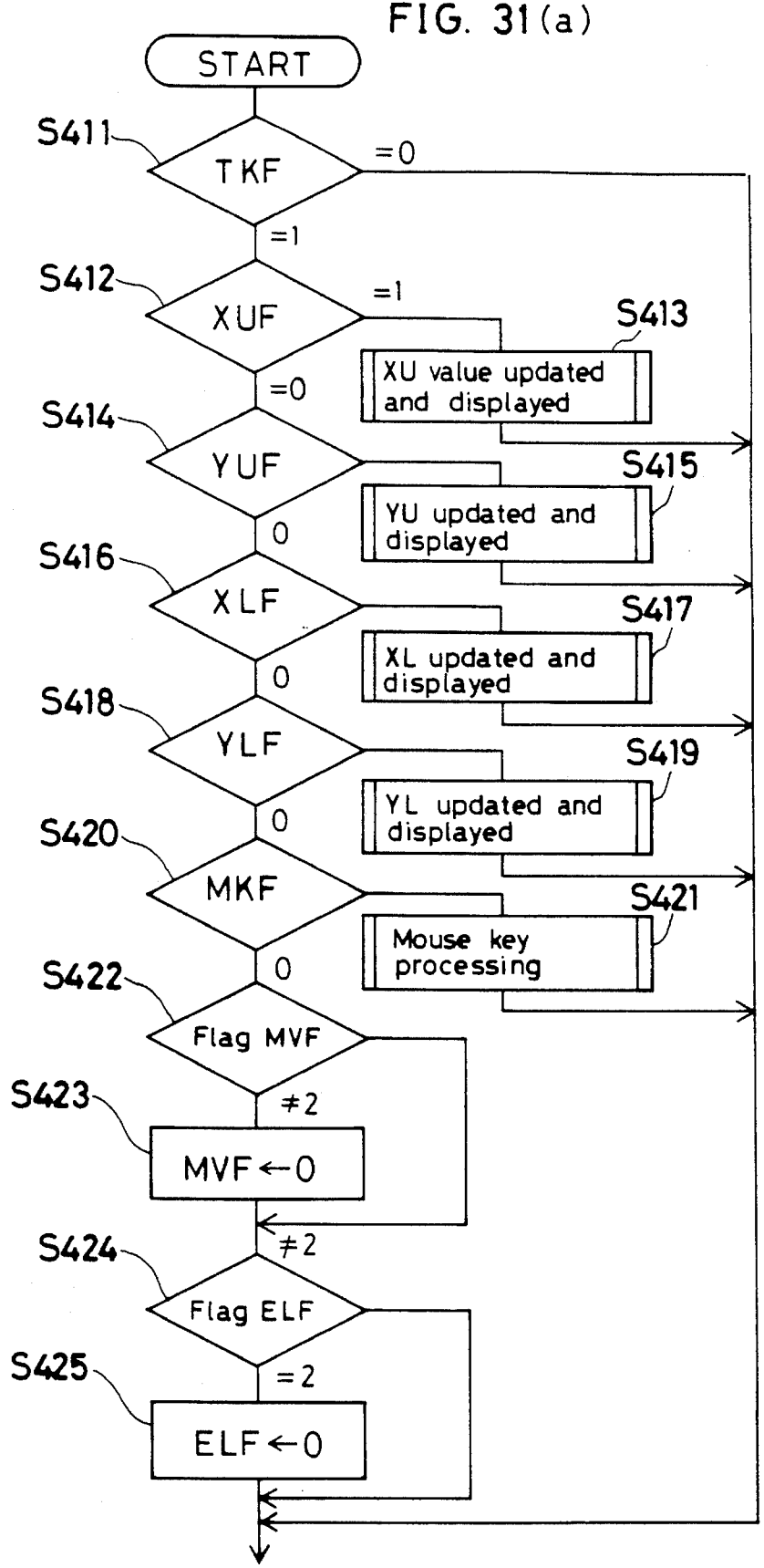
FIG. 31(a) to 31(b) are charts for a correction area data input program.
Figure 31B:
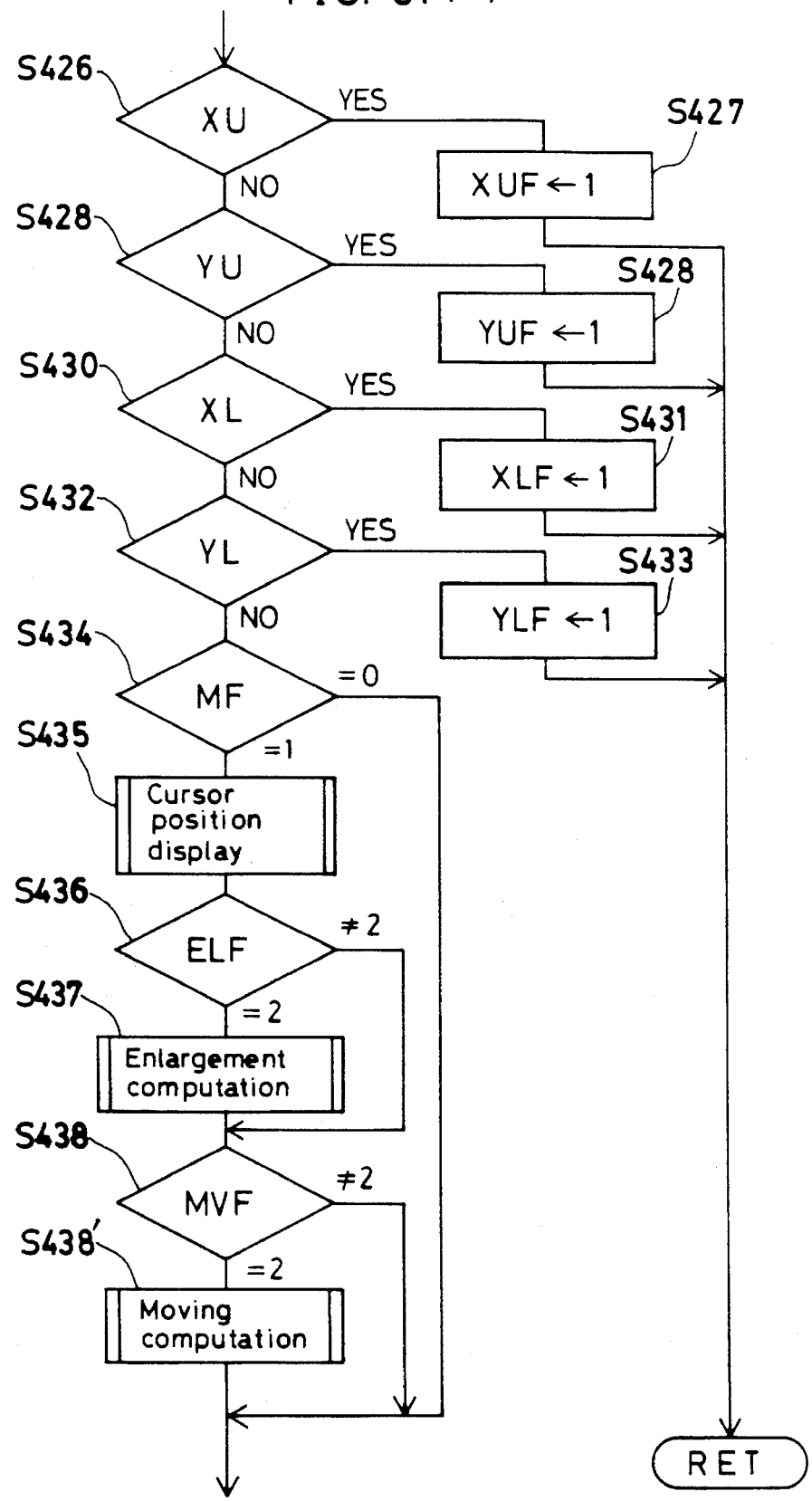
Figure 31C:
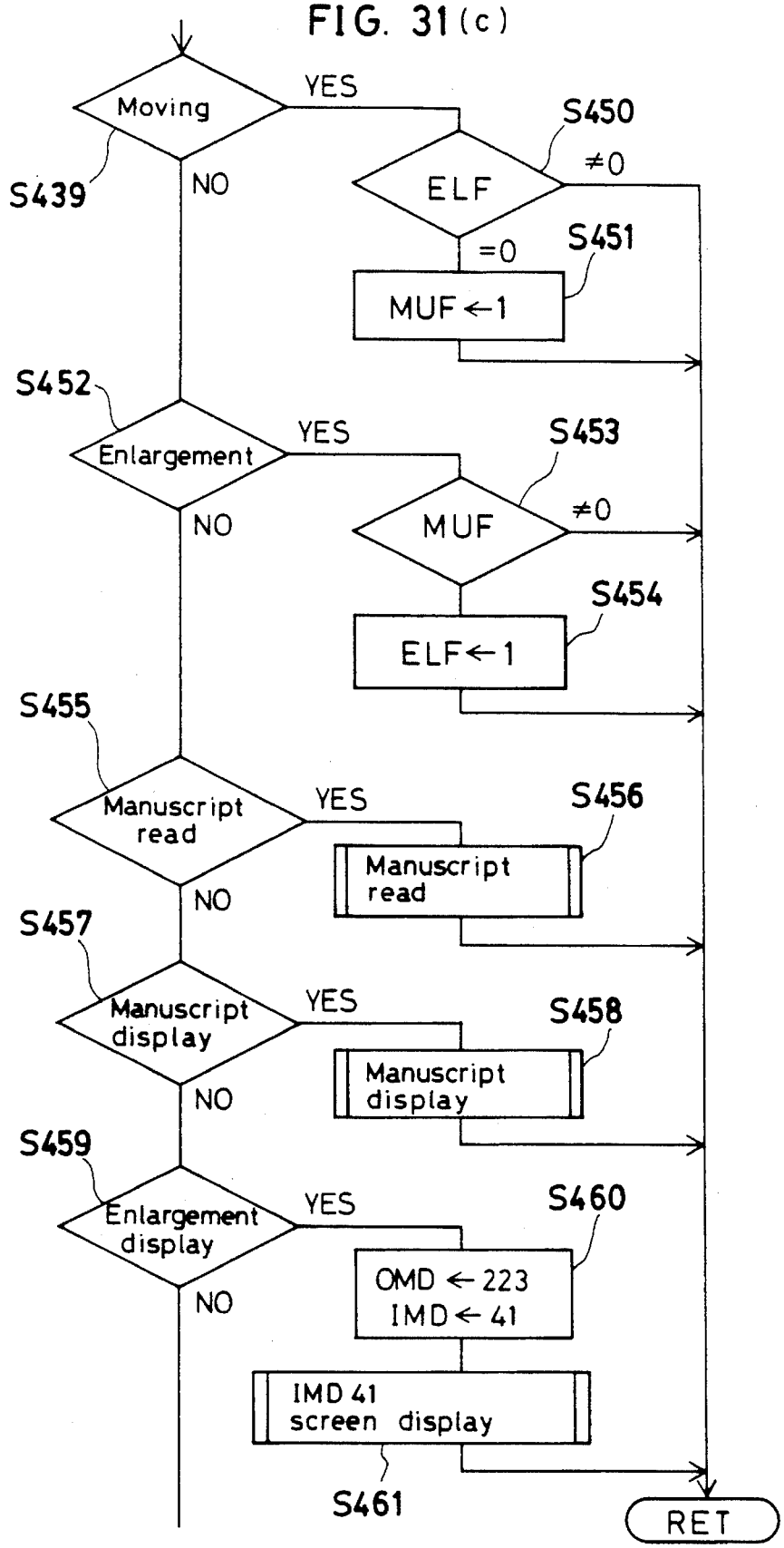
Figure 31D:
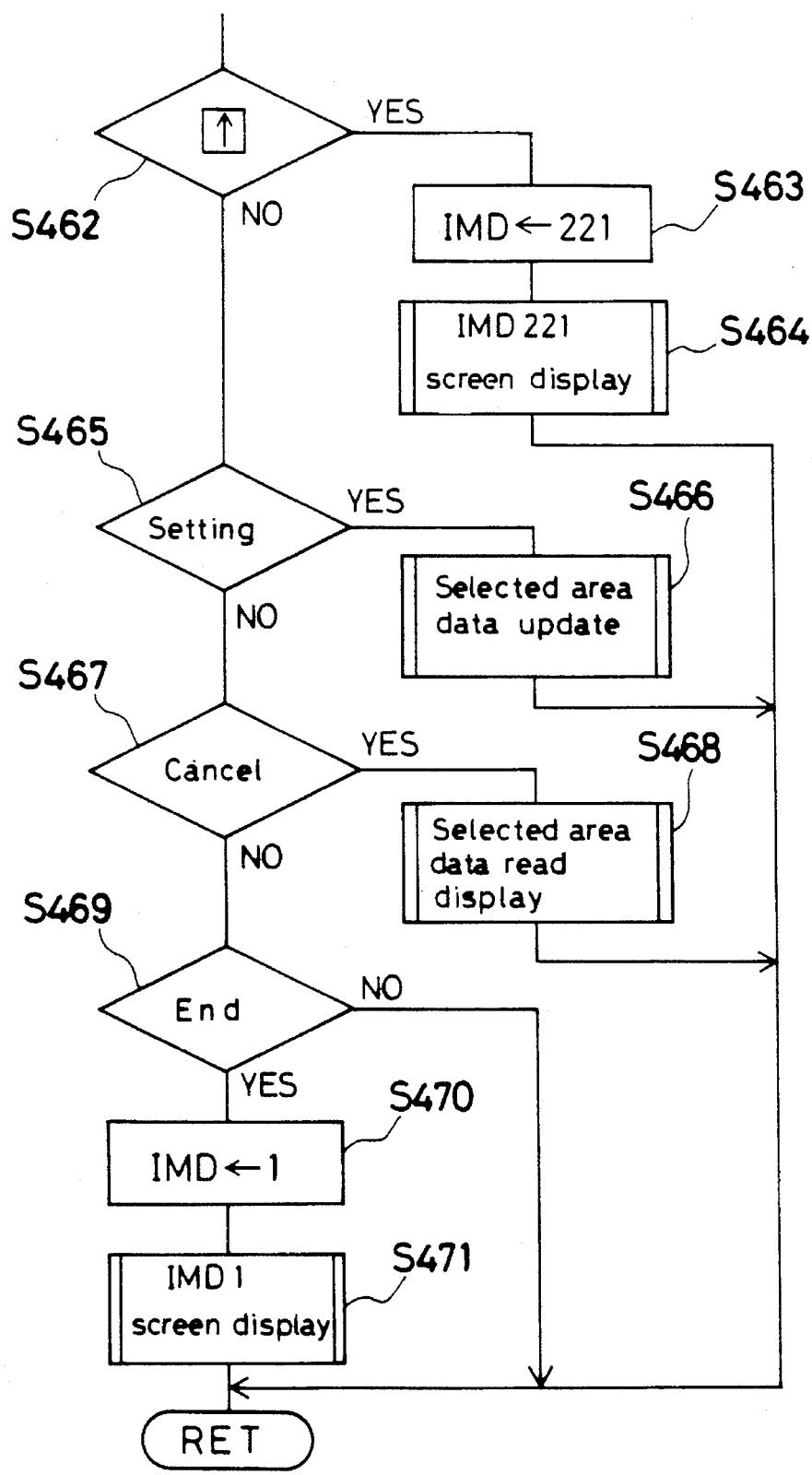

For example, when mouse key is pressed with cursor in an area W1, it is judged that upper left point (XU, YU) of the area has been selected. Similarly, in case mouse key is pressed with cursor in an area W6, it is judged that lower side of the area, i.e. YL, has been selected. In the area retrieval routine program, the area data for W0–W9 are prepared for each area as shown in FIG. 28 (step S382). Then, it is checked which area number has been selected, and to which of W0–W9 this area belongs (steps S343, S344). Based on the results, the area specified by frame display of the area is inversely displayed when it is returned to the screen of FIGS. 10(m) and (n) (steps S385, S386). Based on which of W0–W9 it belongs to, underline is written on numerical display portion of the data to be corrected (step S387). Table 1 shows numerical values of the data, for which underline is given in corresponding to the specified area of W0–W9. The area based on cursor position of the mouse is specified by an area specifying subroutine program of FIG. 30.

Figure 35:
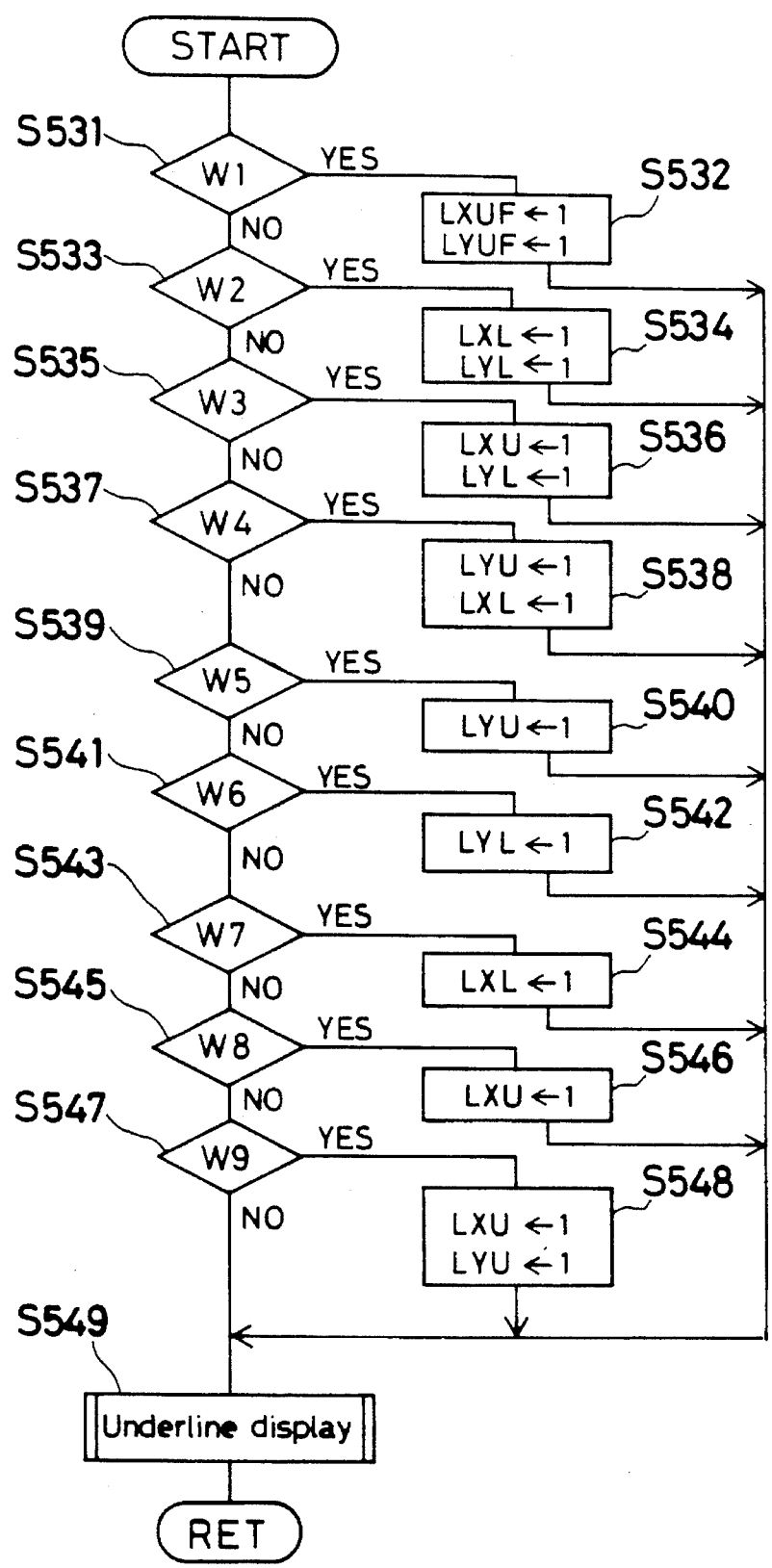
FIG. 35 is a chart for a window number specific routine program.

In the area specifying subroutine, the area, in whose frame the cursor is positioned (i.e. original area), is retrieved. Because the priority in case the areas interfere with each other is: areas (4)>(3)>(2)>(1), the areas are checked from the area (4), and the belonging area is set to an area flag ENO (steps S391–S399). If no belonging area can be found by this retrieval, the areas are checked one after another by the same procedure in W0 area (the largest area) of each area from the area (4) (steps S400–S407). Then, window No. specifying routine program of FIG. 35 is used to find out which area of the belonging area it belongs to. Depending on the belonging area, a flag showing the types of input data (XU, YU, XL, YL) corresponding to Table 1 is set, and underline is displayed on the display point of the corresponding data (steps S531–S549).

Figure 27A:
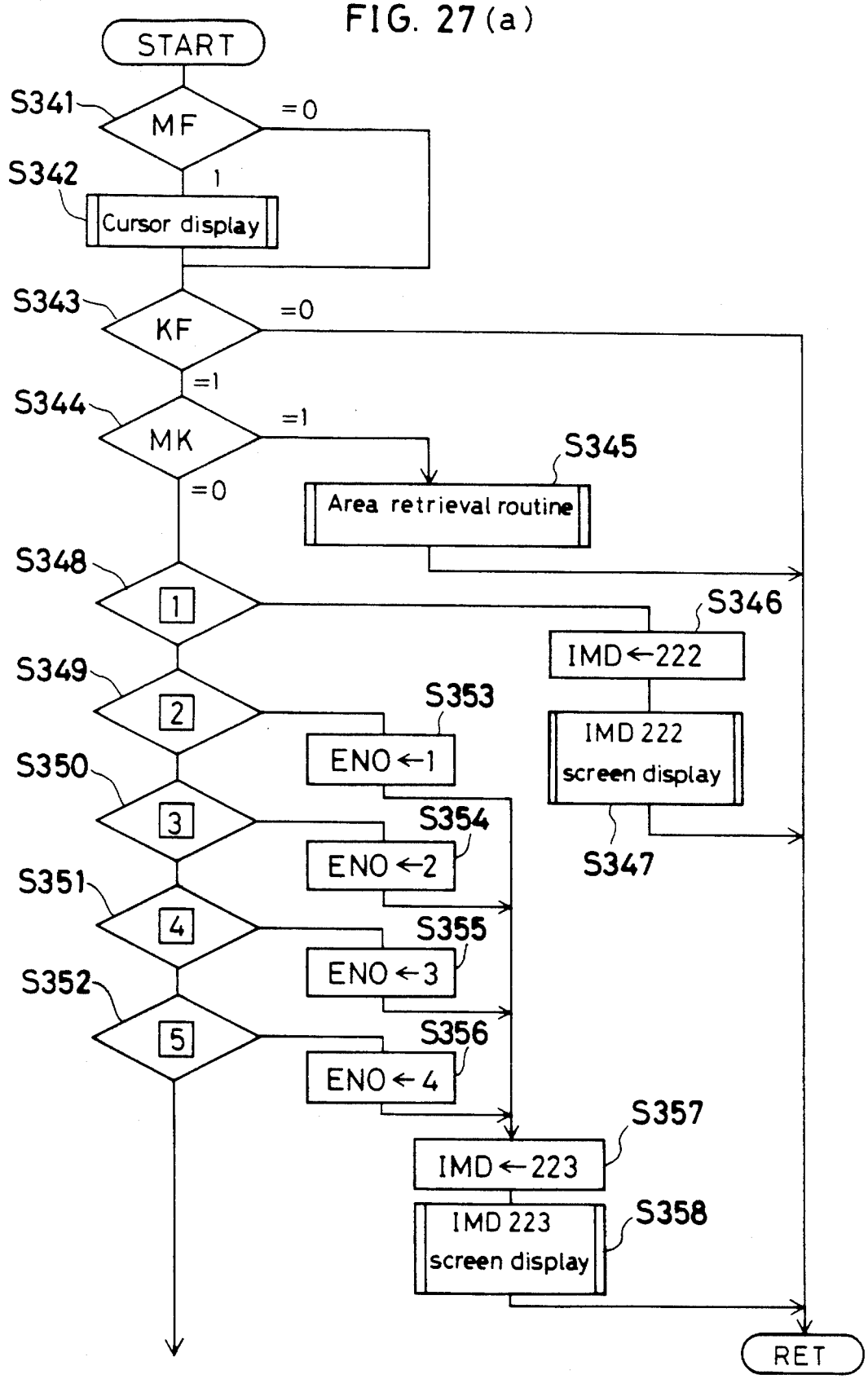
FIGS. 27(a) 27(b) are a chart for a screen display control program.
Figure 27B:
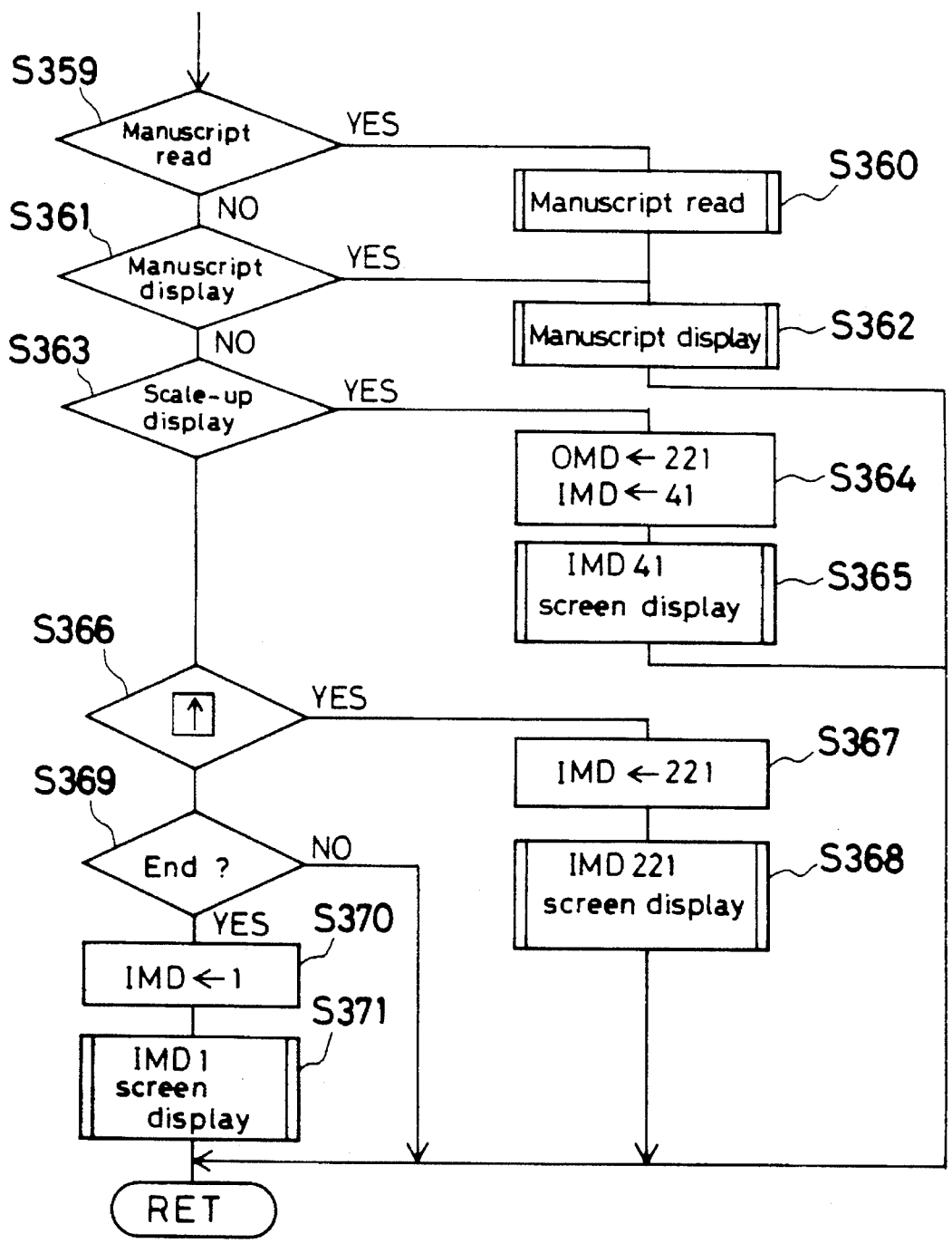
Figure 37:
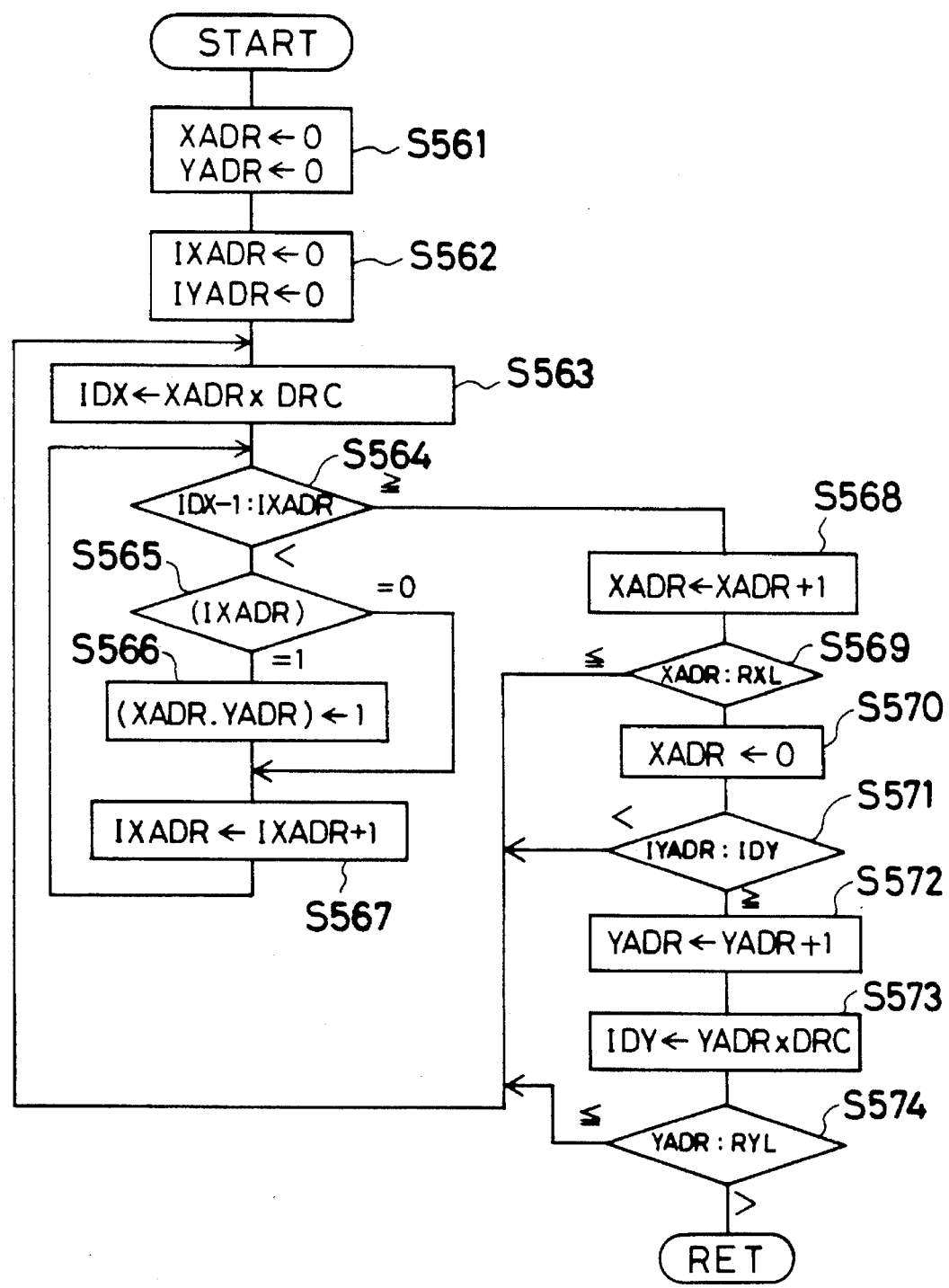
FIG. 37 is a chart for an image signal write program.

In the display control program of the screen of FIG. 10(j), the input mode number (IMD) is rewritten depending upon which of the items 1–5 (1–3 in the embodiment) has been selected on the display screen of FIG. 27, and correction screen of the manuscript size or correction screen of each area of FIGS. 10(m) and (n) are displayed (steps S341–S358). When the manuscript reading key is specified on these screens, the manuscript is scanned and the image data are stored in the image memory 71. By executing an image signal write program of FIG. 37 (steps S561–574), the manuscript image is overlapped on frame display portion of the area and displayed. In this case, the image data of the image memory 71 are scaled down in fast and slow scanning directions (X, Y) by scale factor DRc as obtained by the display scale factor computation program of FIG. 19, and the image data of a plurality of pixels are summed up by logical sum, and the result is written in RAM 45 for display. After the portion corresponding to the manuscript area of the display portion has been cleared for once, image data area is displayed. In so doing, it is possible to repeatedly display without being influenced by the previous display image even when the manuscript image is read again. If the manuscript display key is specified, the manuscript is not scanned, but the image data of the image memory are overlapped on frame display portion of the area and displayed (steps S359–S362). When scale-up display key is pressed, the frame display portion of the area is scaled up and displayed (steps S363–S365). This scale-up display can be easily carried out by replacing divisor (manuscript area) in the display scale factor computation routine program of FIG. 19 with the display size scaled up and by changing the size of frame display of the area. The scale factor of the display can be altered by changing the scale factor DRc through zooming operation depending upon scaling up/down key of the screen of FIG. 10(o). If the display goes beyond the range of the manuscript area, an offset is provided in the reading address of RAM 45 for display in the image or frame display in response to operation of Δ key. Thus, after the display has been cleared for once, scroll display can be performed by setting newly.

Figure 32:
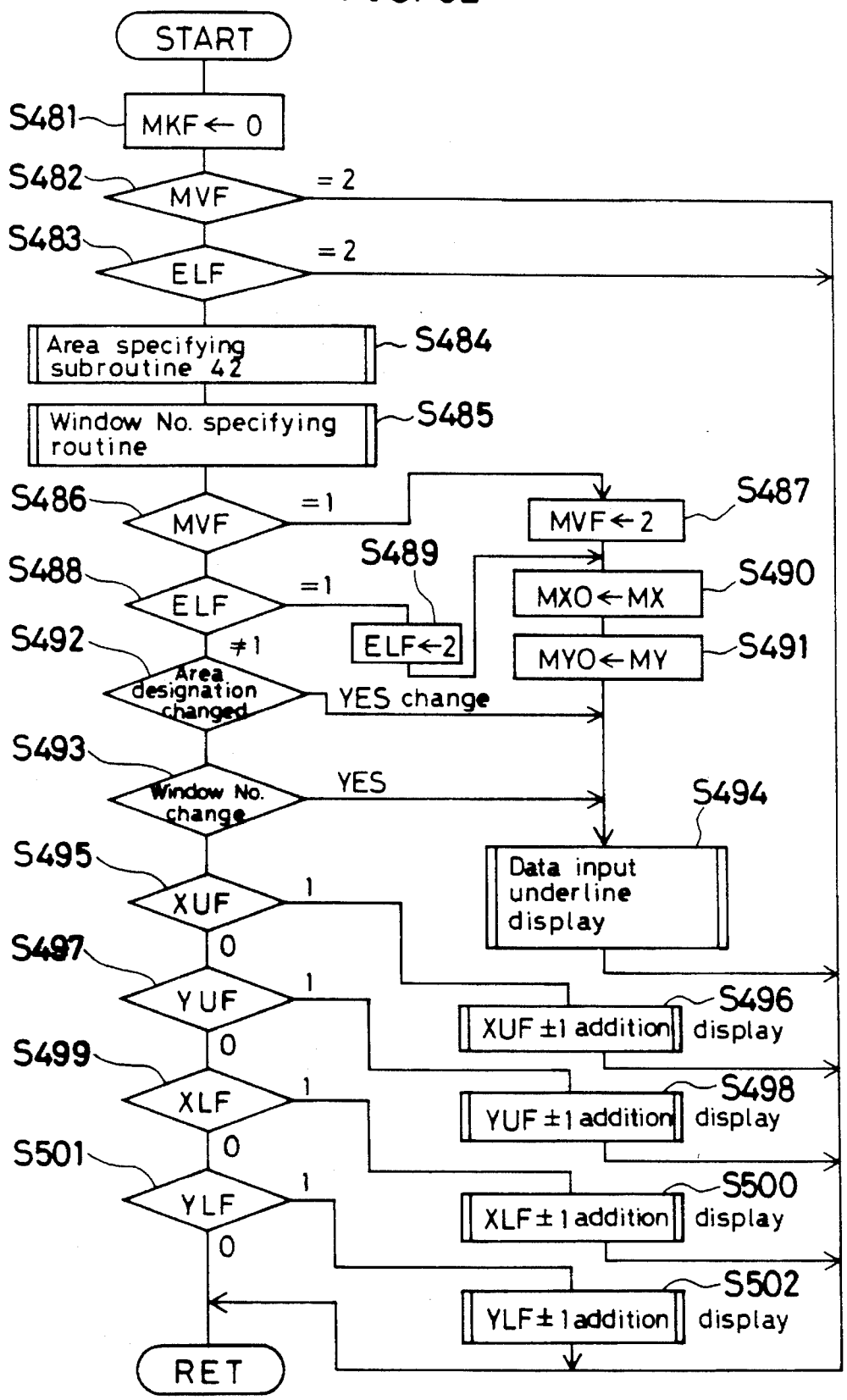
FIG. 32 is a chart for a mouse key processing program.

Area correction by correction screen of each area of FIGS. 10(m) and (n) can be controlled by the correction area data input program of FIG. 31. When data input items (XU, XL, YU, YL) are selected, the corresponding flag is set (steps S426–S433), and the corresponding data are updated according to key input, and the data are displayed (steps S411–S421). Moving is to move the position without changing the size of an area, and it is carried out by mouse. Extension is to change a portion of an area and to extend or reduce its range without moving the area, and mouse and mouse key are used (steps S437–S438). FIG. 32 shows a mouse key processing program for controlling input by the mouse key.

Figure 34:
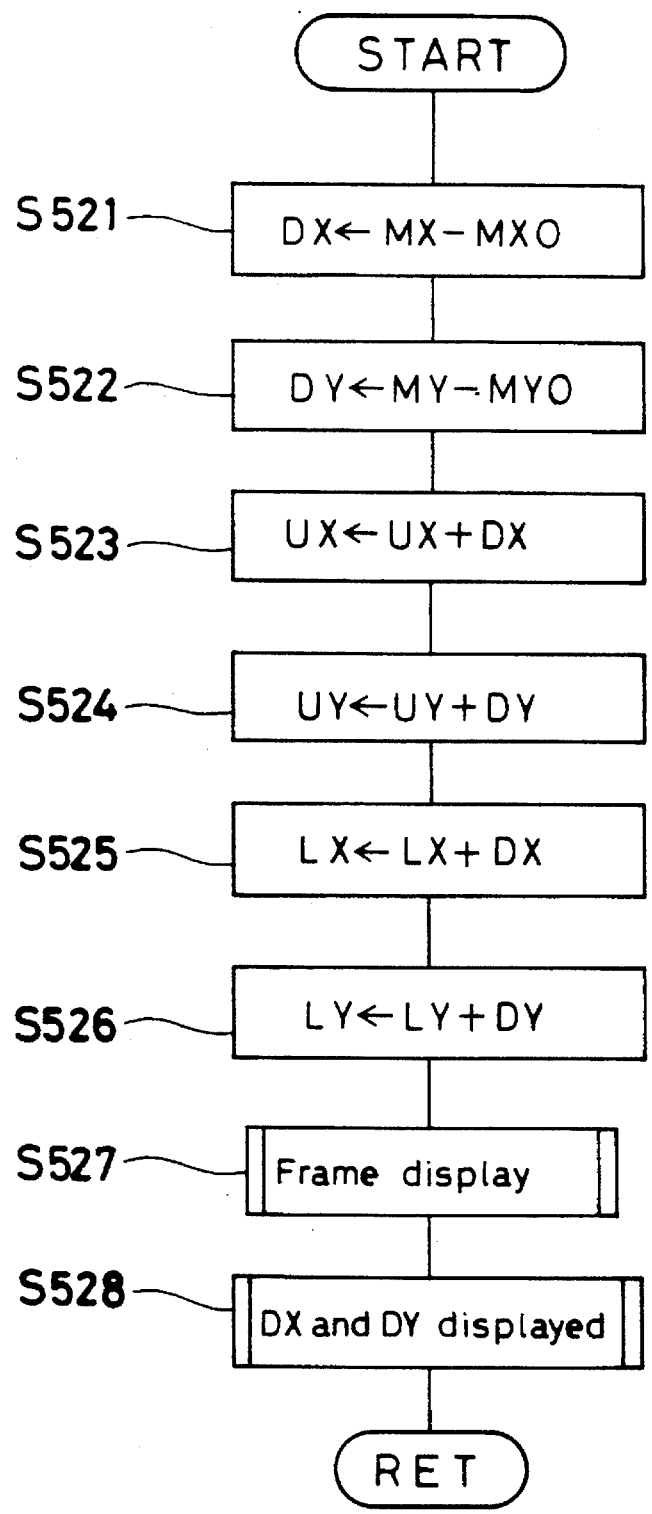
FIG. 34 is a chart for a movement processing computation program.

In the area correction program of FIG. 31, a moving flag (MVF) is set to 1 under the condition that an enlargement flag (ELF) is not set (steps S439, S450, S451). After the flag has been set, a predetermined area is selected by cursor, and mouse key is pressed. Then, in the mouse key processing program of FIG. 32, it is identified what position in which area (windows W0–W9) has been pressed (steps S484–S485). After the enlargement flag (ELF) has been set to 2, the coordinates of the cursor (MX0, MY0) at that position are stored (steps S486–S491), and movement of the coordinates by mouse is computed until mouse key is released next time in the area correction program of FIG. 31 (step S438). By adding this amount of movement by the movement processing computation program of FIG. 34 to all XY coordinates (UX, UY, LX, LY) in the selected area, it is possible to move the area at real time and to display the frame of the moved area (steps S521–S527). This amount of movement can be obtained by the difference between the initially stored coordinates (MX0, MY0) and the coordinates (MX, MY) of the present cursor position.

Figure 33:
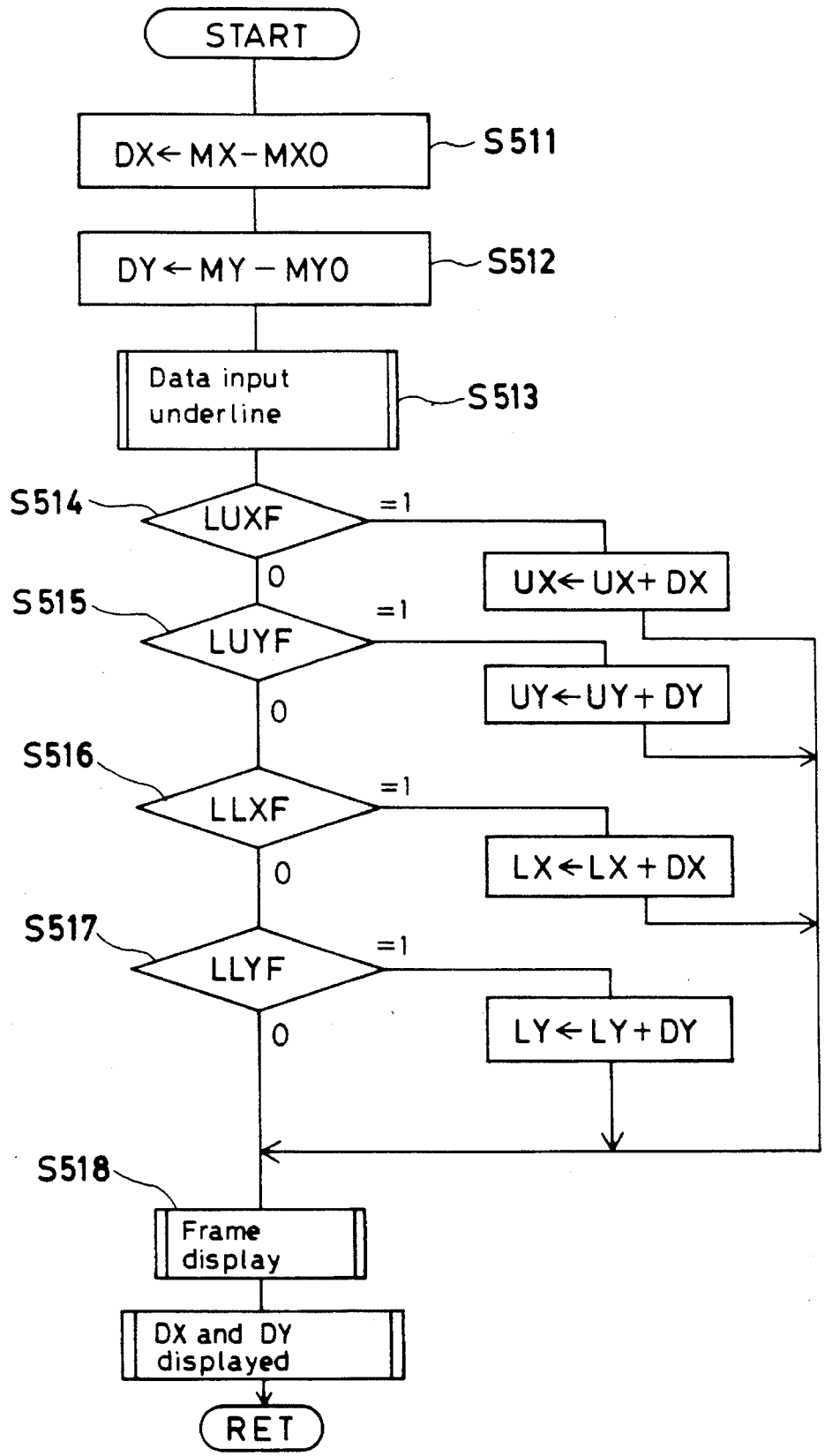
FIG. 33 is a chart for an enlargement computation program.

In case the enlargement flag (ELF) is set to 1 when movement flag is not set during enlargement, it turns to valid when mouse key is pressed, and only the data with underline as the items to be corrected to the selected area and its window are added or subtracted by movement of mouse cursor by an enlargement computation program of FIG. 33 and are displayed (steps S511–S578). When mouse key is released, the enlargement flag is reset. In these operations, the amounts of movement DX and DY of the mouse are displayed on lower portion of the manuscript area (steps S519 and S528).

In the mouse key processing program, it is checked whether area or data input position has changed each time the mouse key is pressed in the processing other than movement/enlargement processings as shown in FIG. 32 (steps S484, S485, S492, S493). If there is any change, the area or the data input display are updated (step S494). If no change, the data value is updated depending upon which of + or − mouse keys has been pressed. In this case, relative changes DX and DY of XY coordinates are displayed on lower portion of the manuscript area (steps S495–S502). As the result, it is possible to specify the changed data of the area by mouse and to slightly change the data by + or − switch operation. Mouse key switch may be combined with other switches, or area designation, editing content and numerical value input may be performed according to the frequencies of which input from the mouse key. The area is specified by mouse key in the above, but it is needless to say that the same effect can be obtained by operation of touch panel or operation of ten-key.

Figure 36:
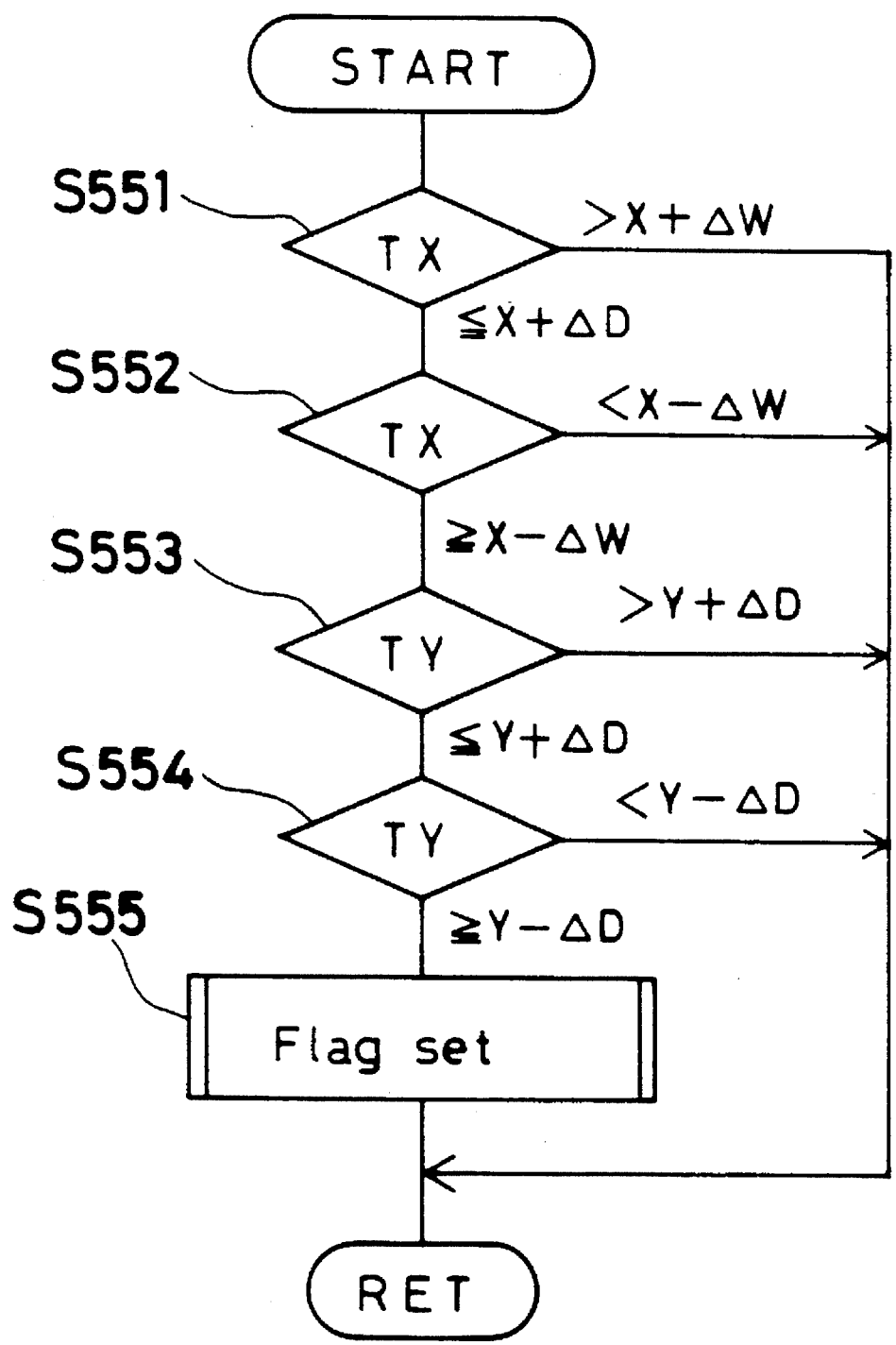
FIG. 36 is a chart for a touch key input check program.

The touch key input check program is to check whether a specific area has been operated on the touch panel as shown in FIG. 36 and to compare XY coordinates of the touch panel during operation with the coordinates of that specific area (steps S551–S555). The operation instruction by pressing the touch panel as described above can be checked by this touch key input check program for each instructed position.

Figure 19:
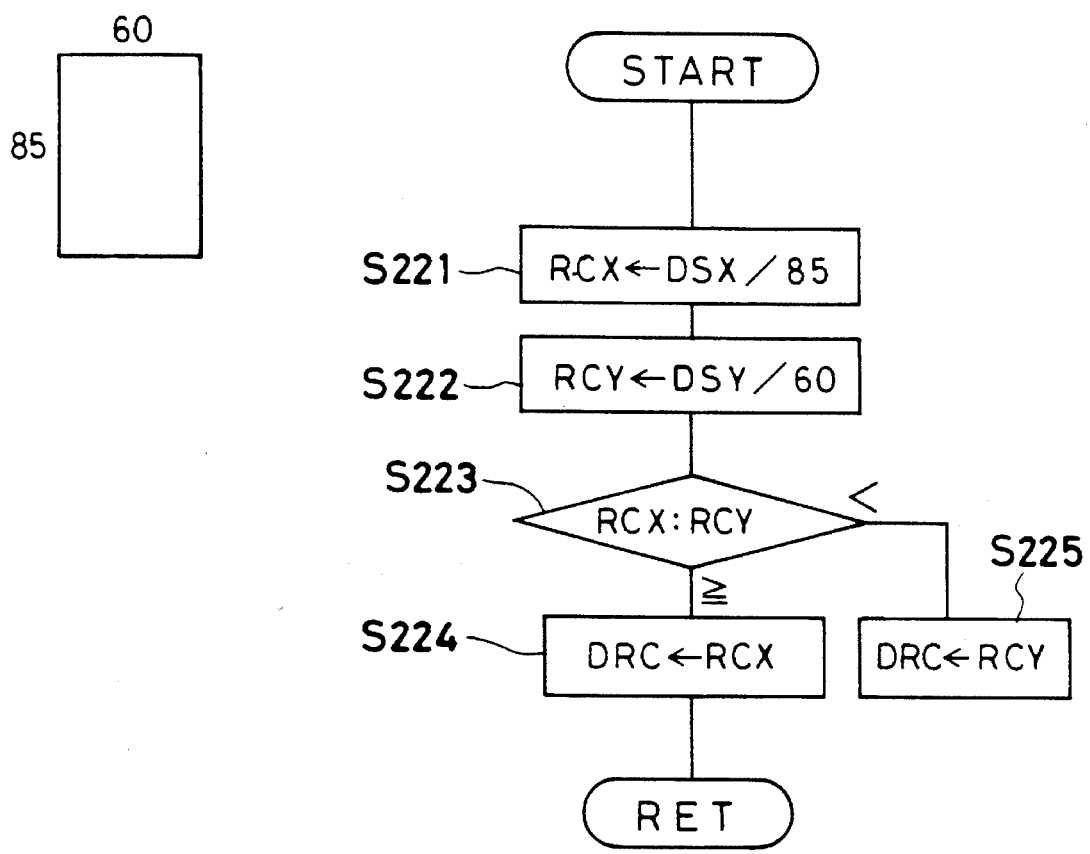
FIG. 19 is a chart for a display scale factor computation program.

The display scale factor computation program computes scale-down ratio necessary for display from manuscript size (DSX, DSY) as shown in FIG. 19 (steps S221, S222). From longitudinal and lateral scale-down ratio, the higher value is selected and the scale-down ratio is set to DRc (steps S223–S225). It is preferable to round off this scale-down ratio DRc and to turn it to an integer for easier processing. As already described, the image memory possesses A3 size information with resolution of 4 dots/mm, and the area of the frame of LCD display unit is 60×85 mm in size and has resolution of 4 dots/mm.

Figure 38:
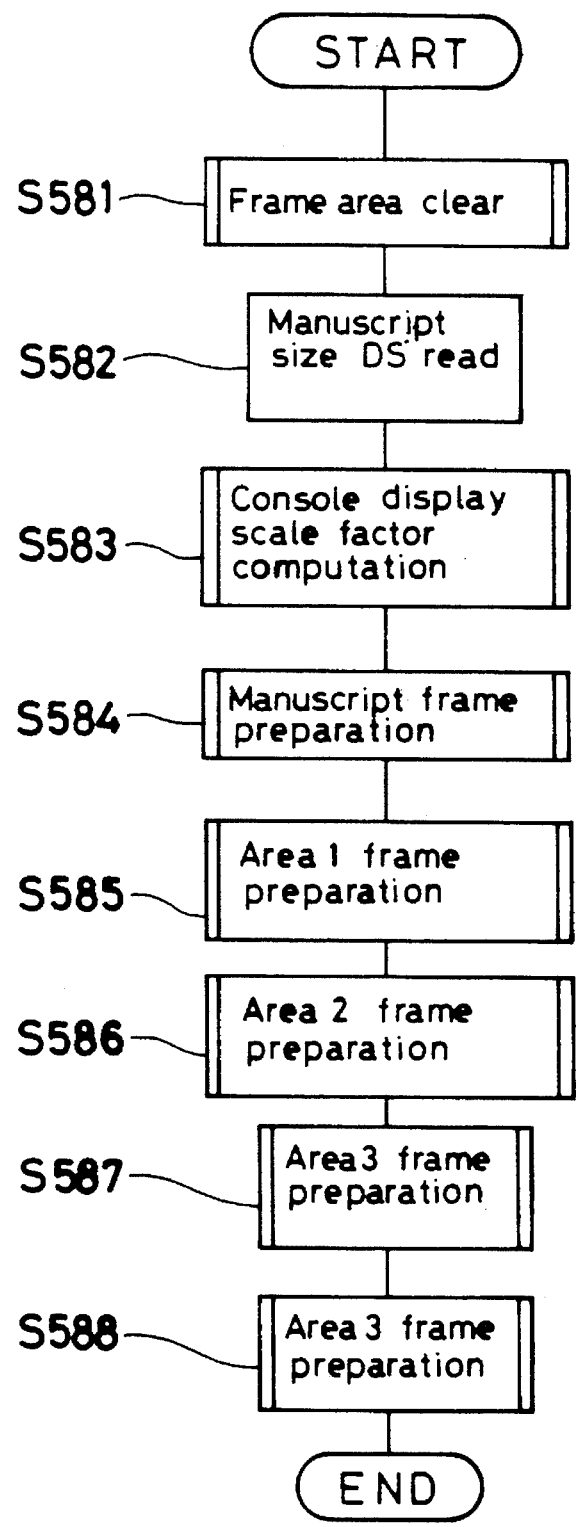
FIG. 38 is a chart for a frame display program.

The frame display program computes manuscript frame size according to the manuscript size as shown in FIG. 38 (steps S581–S583). The frame of each area is written by the area frame preparation program in the order of: manuscript frame, areas (1), (2), (3) and (4) (steps S584–S588). For the areas not yet set, only the area with frame display already set can be used by writing default value (such as 0) in advance.

Figure 39:
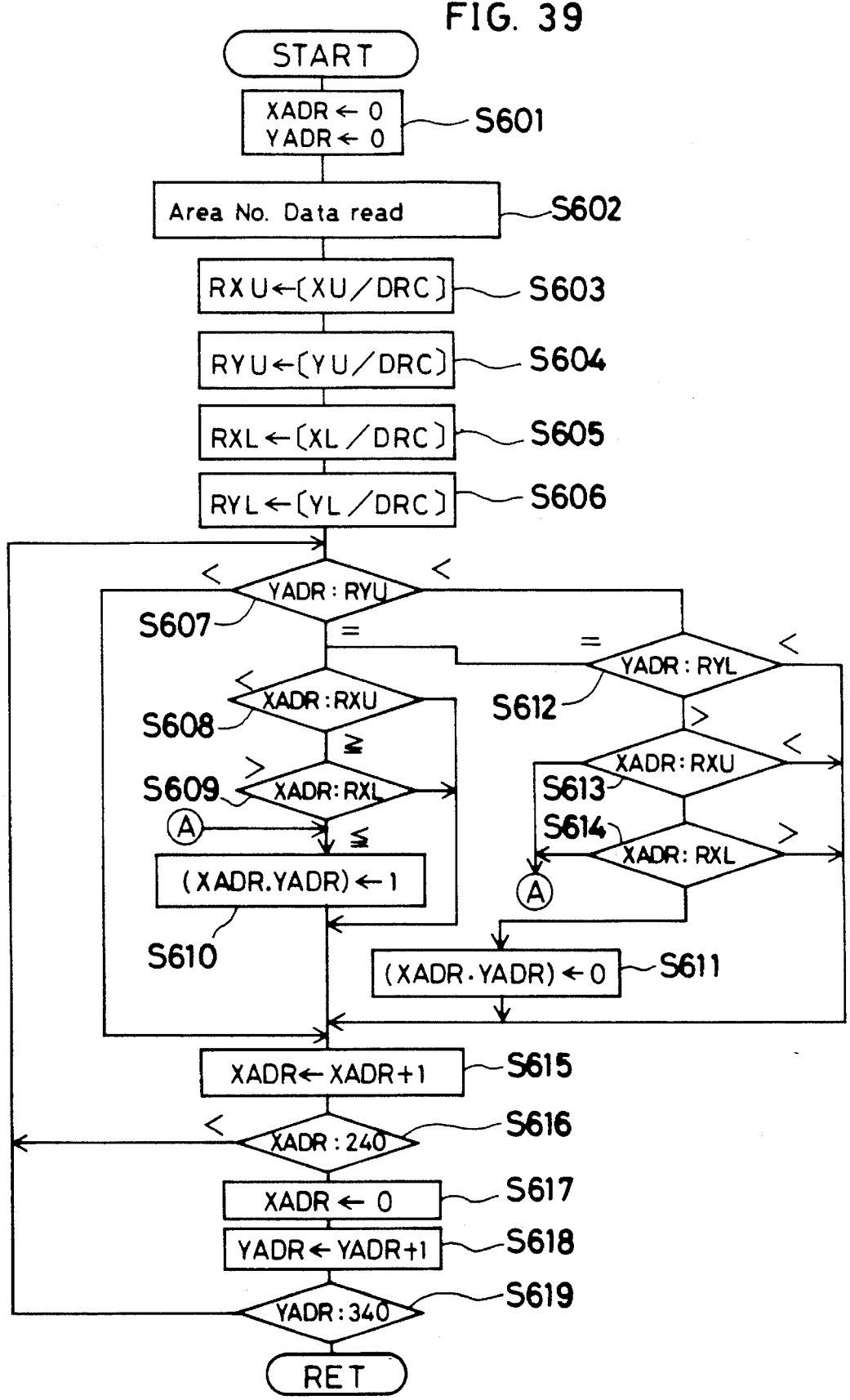
FIG. 39 is a chart for an area frame preparation program.

The area frame preparation program writes frame of each area as shown in FIG. 39. Each data of the initially given area are calculated with scale-down factor DRc for displaying on the manuscript area of LCD display unit 47, and it is obtained by frame address of RAM 45 for display (steps S609–S606). Next, addresses (XADR, YADR) of the area for manuscript on RAM 45 for display are sequentially scanned, and 1 is written on an address corresponding to this frame address, and 0 is written to the other addresses (steps S607–S620). In this case, the region outside the frame is left unchanged, and 1 is written on the frame, and 0 is written within the frame. By a program (not shown similar to FIG. 39 (to turn 0 of the step S611 to 1), is written within the selected frame. By displaying this area inversely, display of a portion overlapping an area, which has already been written and has lower priority, is erased to follow the priority in case of area instruction interference. For example, if a white line (forcibly whitened) of 1 dot in width is written along each frame, it is possible to more clearly display intersection points with frames of the other areas. Intermediate gradation or halftone pattern may be written in the selected area. Further, frame thickness or dotted line may be discriminatively displayed for each area.

The present invention is not limited to the above embodiment, and it will be apparent to those skilled in the art that many changes and modifications can be made without departing from the spirit or scope of the invention as set forth herein. For example, description has been given in the above embodiment, using bit map display and character display, whereas other display unit may be used provided that the manuscript and the editing area are overlapped and displayed even with lower resolution and positional relationship between the manuscript and the editing area can be approximately confirmed. Or, the manuscript may be displayed by binarized image, and longitudinal and lateral lines may be displayed in form of network so that the approximate positional relationship with manuscript can be confirmed, and the manuscript image may be omitted. If the image is displayed in multicolor using a color display unit, it is possible to display more information and to improve the maneuverability. Mouse is used to move cursor and to perform area selection and to instruct correction, while a touch panel may be attached on display and operation using the touch panel may be adopted instead of mouse. The correction amount is displayed in numerical value in the above on character display but the portion not displayed in the area to be corrected may be used as in the case of display of editing content, or the editing content may be displayed on character display.

As it is evident from the above description, the image processing system according to the present invention comprises image processing means for editing and outputting image information based on editing instruction by setting the editing instruction on area and content for edit processing, input means for inputting setting and correcting information of the editing instruction, and display means for displaying area and content of the editing instruction for image information and setting and corrected screen. To these means, edit processing means is used to control display screen of the display means by processing setting of editing instruction and correction information inputted from the input means by edit processing means, and the editing instruction is set on the image processing means. Thus, it is possible to display by overlapping the editing area on manuscript image and to display the editing content by instructing its position and to easily confirm the position and content of the editing. Also, because the display of the area can follow up the instruction for correction, it is easier to confirm the correction content and to reduce specifying error in correction of the editing area. Further, because specific position of the area can be specified and correction content can be selected, it is easier to instruct correction and to improve maneuverability.

In particular, the display means display the area in selected status in a display mode different from the other area, and this makes it easier to display the selected status more clearly. Because the content of editing instruction and correction content are displayed in the area where the area to be corrected is not displayed, the area and the content of the correction can be displayed without overlapping on the same screen. Further, because the content of editing instruction and the content of correction are displayed only for a certain period of time, it is possible to reduce the time to exclusively use the screen for content display.

Moreover, image memorizing means are provided for picking up and storing image information of the manuscript from the image processing means, and the display means overlapping it on the editing instruction and displays. This makes it much easier to confirm the editing content on the image information. The display means for this purpose consists of a bit map display for displaying editing instruction by overlapping it on image information of the manuscript and a character display for displaying numerical values and characters. Because correction amount of the area is displayed on the character display, it is easy to confirm the status on the image information and correction amount by concrete numerical values on the image information. Edit processing means determines the position instructed from the input means to an area displayed by the display means and the content of correction of the editing instruction by the number of specifying. Also, the area display by the display means is divided in longitudinal and lateral directions, and each area is processed in response to the movement of side, angle and the whole area. Thus, operation can be simplified and maneuverability can be improved.

In an inputting, processing and outputting system of image information, there are provided image input means for reading a manuscript and for picking up image information, image processing means for edit processing by inputting image information from the image input means, image output means for outputting by inputting image information after edit processing from the image processing means. To such inputting, processing and outputting system, there are provided editing content input means for inputting content and correction of edit processing, editing area input means for inputting area of edit processing, edit memorizing means for memorizing editing information, which consists of content and area of the edit processing, display memorizing means for memorizing by developing editing information of the image information on a bit map, display means for displaying the bit map of the display memorizing means, and edit processing means, which newly sets content and area of the edit processing based on the input of each input means and corrects the editing information read from edit memorizing means, and memorizes the editing information on the edit memorizing means and, further develops and memorizes it on the bit map of the display memorizing means and setting the editing information memorized in the edit memorizing means on the image processing means. Thus, it is possible to design the function to set the editing information by separating from the inputting, processing and outputting system of image information, and also to easily cope with the new edit processing because a part of the editing information already memorized can be corrected according to the manuscript.

What we claim is:

1. An image processing system with editing functions and editing and outputting image information obtained by reading a manuscript, comprising:

image processing means for performing said edit processing on the image information obtained by reading the manuscript, based on editing instruction including an area and a content of said edit processing, and for outputting the edit processed image information;

input means for inputting setting information for said editing instruction and correction information for correcting said edit instruction;

image memory means for developing and storing the edit processed image information and developing and storing the area of said edit processing on the developed and stored image information;

display means including a display control unit for displaying said content of said editing instruction, content of the correction information, the developed and stored image information with the developed and stored area thereon, and the developed and stored image information with the developed and stored area corrected; and edit processing means for processing said setting information and said correction information of said editing instruction inputted from said input means, for controlling said display control unit of said display means, and for transmitting said corrected editing instruction to said image processing means, whereby said display means overlaps and displays said area and said corrected area with said developed and stored image information that is displayed by said display means, with said corrected area being displayed on said developed and stored image information that is displayed by said display means.

2. An image processing system according to claim 1, wherein said display means displays said area in selected status in a display mode different from other areas.

3. An image processing system according to claim 1, wherein said display means displays content of said editing instruction and content of said correction on a display area where said area of said edit processing is not displayed.

4. An image processing system according to claim 1, wherein said display means displays content of said editing instruction and content of said correction only for a certain period of time.

5. An image processing system according to claim 1, wherein said display means is provided with a bit map display unit for overlapping and displaying said area on said image information and a character display unit for displaying numerical values and characters, and wherein the content of correction in said area is displayed on said character display unit.

6. An image processing system according to claim 1, wherein said edit processing means determines content of said correction of said editing instruction based on positions and number of instructions instructed from said input means to the area displayed by said display means.

7. An image processing system according to claim 1, wherein said edit processing means forms an area of said edit instruction displayed by said display means by dividing it in longitudinal and lateral directions, and corrects and processes each said area in response to movement of side, angle and said area.

8. An image processing system with editing functions and for performing edit processing and outputting image information obtained by reading a manuscript, comprising:

image input means for obtaining image information by reading said manuscript;

image processing means for performing said edit processing on said image information from said image input means;

image output means for outputting image information after edit processing by said image processing means;

editing content input means for inputting content of said edit processing and content of correction;

editing area input means for inputting an area of said edit processing;

edit memory means for storing editing information, consisting of said content and said area of said edit processing;

display memory means for developing and storing said area of said editing information to a bit map on said image information developed and stored after being obtained from said image input means;

display means for displaying said bit map of said display memory means; and edit processing means for performing new setting processing of said content of said edit processing and said area of said edit processing based on each input of each of said input means and for correcting the editing information read from said edit memory means, for storing said editing information in said edit memory means, for developing and storing said area on said bit map of said image information developed and stored in said display memory means, and for sending said editing information stored in said edit memory means to said image processing means.

* * * * *